(12) United States Patent
Arikawa et al.

(10) Patent No.: US 7,372,804 B2
(45) Date of Patent: May 13, 2008

(54) MULTIPLEX COMMUNICATION SYSTEM AND METHOD

(75) Inventors: Toshiaki Arikawa, Tokyo (JP);
Ryuuichi Ikematsu, Tokyo (JP);
Shigekazu Harada, Tokyo (JP);
Hajime Ishikawa, Tokyo (JP);
Takahide Sugita, Tokyo (JP);
Hidetoshi Shinoda, Tokyo (JP)

(73) Assignee: NEC Corporation, Tokyo (JP)

( * ) Notice: Subject to any disclaimer, the term of this patent is extended or adjusted under 35 U.S.C. 154(b) by 1051 days.

(21) Appl. No.: 10/335,951

(22) Filed: Jan. 3, 2003

(65) Prior Publication Data

US 2003/0133712 A1    Jul. 17, 2003

(30) Foreign Application Priority Data

| Jan. 11, 2002 | (JP) | ............................. 2002-004768 |
| Mar. 8, 2002 | (JP) | ............................. 2002-063944 |
| Apr. 18, 2002 | (JP) | ............................. 2002-116008 |
| Sep. 4, 2002 | (JP) | ............................. 2002-259403 |

(51) Int. Cl.
*G01R 31/08* (2006.01)
(52) U.S. Cl. ....................................... 370/217; 370/225
(58) Field of Classification Search ................ 370/217, 370/221, 225, 285; 398/2
See application file for complete search history.

(56) References Cited

U.S. PATENT DOCUMENTS

| 5,081,619 | A |   | 1/1992 | Nagata |         |
| 5,275,712 | A |   | 1/1994 | Hetrick |         |
| 5,784,547 | A | * | 7/1998 | Dittmar et al. | ................. 714/4 |
| 5,802,263 | A | * | 9/1998 | Dittmar et al. | ................. 714/4 |
| 5,892,893 | A | * | 4/1999 | Hanf et al. | .................... 714/3 |
| 6,061,156 | A |   | 5/2000 | Henmi |         |
| 6,097,516 | A |   | 8/2000 | Almstrom |         |

(Continued)

FOREIGN PATENT DOCUMENTS

CN    1170485 A    12/1995

(Continued)

OTHER PUBLICATIONS

Ellinas et al.; Automatic protection switching for link failures in optical networks with bi-directional links; Global Telecommunications Conference, 1996. GLOBECOM '96. Communications: The Key to Global Prosperity vol. 1, Nov. 18-22, 1996 pp. 152-156 vol. 1.*

(Continued)

*Primary Examiner*—Edan Orgad
*Assistant Examiner*—Salman Ahmed
(74) *Attorney, Agent, or Firm*—Foley & Lardner LLP

(57) ABSTRACT

Disclosed are the multiplex communication system and the method therefore. A fault detection part of a duplex switching device detects it as generation of fault when recognizable signals are not detected from a connected line within a prescribed time. When the fault detection part detects the generation of fault in the present system line, the line switching part switches the lines from the present line to the standby line to perform communication between a terminal device and another terminal device therethrough. Also, the fault detection part notifies the generation of fault to the other duplex switching device after a prescribed switching protection time has passed from the time of the fault detected by the fault detection part, so the selection of the lines becomes consistent.

26 Claims, 36 Drawing Sheets

U.S. PATENT DOCUMENTS

| | | | |
|---|---|---|---|
| 6,115,831 A * | 9/2000 | Hanf et al. .................... | 714/43 |
| 6,122,753 A | 9/2000 | Masuo et al. | |
| H1882 H * | 10/2000 | Asthana et al. ............. | 370/503 |
| 6,173,411 B1 * | 1/2001 | Hirst et al. ..................... | 714/4 |
| 6,442,694 B1 * | 8/2002 | Bergman et al. .............. | 726/22 |
| 6,477,288 B1 | 11/2002 | Sato | |
| 6,493,341 B1 * | 12/2002 | Datta et al. .................. | 370/392 |
| 6,631,134 B1 * | 10/2003 | Zadikian et al. ....... | 370/395.21 |
| 6,639,893 B1 * | 10/2003 | Chikenji et al. ............ | 370/217 |
| 6,885,632 B1 * | 4/2005 | Mattson ...................... | 370/216 |
| 6,912,671 B2 * | 6/2005 | Christensen et al. .......... | 714/25 |
| 6,975,811 B1 * | 12/2005 | Kakizaki et al. ............... | 398/2 |
| 6,977,886 B2 * | 12/2005 | Tada .......................... | 370/216 |
| 7,050,468 B2 * | 5/2006 | Seto et al. .................. | 370/535 |
| 7,085,225 B2 * | 8/2006 | Schaller et al. ............. | 370/217 |
| 2001/0026384 A1 | 10/2001 | Sakano et al. | |
| 2002/0034259 A1 * | 3/2002 | Tada .......................... | 375/295 |
| 2002/0194547 A1 * | 12/2002 | Christensen et al. .......... | 714/43 |
| 2003/0112746 A1 * | 6/2003 | Schaller et al. ............. | 370/216 |
| 2005/0147087 A1 * | 7/2005 | Sternagle .................... | 370/352 |
| 2005/0157707 A1 * | 7/2005 | Sternagle .................... | 370/352 |
| 2006/0080469 A1 * | 4/2006 | Coward et al. ............. | 709/250 |

FOREIGN PATENT DOCUMENTS

| | | |
|---|---|---|
| EP | 0456206 A2 * | 11/1991 |
| EP | 0920152 A2 * | 6/1999 |
| JP | 02-131040 | 5/1900 |
| JP | 02-141041 | 5/1990 |
| JP | 03-104366 | 5/1991 |
| JP | 04-020029 | 1/1992 |
| JP | 04-068932 | 3/1992 |
| JP | 04-127630 | 4/1992 |
| JP | 04-192654 | 7/1992 |
| JP | 05-250200 | 9/1993 |
| JP | 06-066763 | 3/1994 |
| JP | 06-197044 | 7/1994 |
| JP | 07-030572 | 1/1995 |
| JP | 08-116332 | 5/1996 |
| JP | 09-046735 | 2/1997 |
| JP | 10-224828 | 8/1998 |
| JP | 10-285174 | 10/1998 |
| JP | 10-303869 | 11/1998 |
| JP | 10-336079 | 12/1998 |
| JP | 10-336320 | 12/1998 |
| JP | 11-150511 | 6/1999 |
| JP | 2000-004216 | 1/2000 |
| JP | 2000-156681 | 6/2000 |
| JP | 02-224531 | 9/2000 |
| JP | 2000-269890 | 9/2000 |
| JP | 2000-269974 | 9/2000 |
| JP | 2001-044958 | 2/2001 |
| JP | 2001-156758 | 6/2001 |
| JP | 2001-285323 | 10/2001 |
| JP | 2001-285323 A | 10/2001 |
| JP | 2001-298461 | 10/2001 |
| WO | WO97/42729 * | 11/1997 |
| WO | WO 98/21853 | 5/1998 |
| WO | WO00/76147 A1 * | 12/2000 |

OTHER PUBLICATIONS

Neusy et al.; Availability analysis of optical shared protection rings for long haul networks; Optical Fiber Communication Conference, 1999, and the International Conference on Integrated Optics and Optical Fiber Communication. OFC/IOOC '99. Technical Digest vol. 1, Feb. 21-26, 1999 pp. 176-179 vol. 1.*

Ellinas et al.; Protection Cycles in Mesh WDM Networks; IEEE Journal on Selected Areas in Communications, vol. 18, No. 10, Oct. 2000.*

* cited by examiner

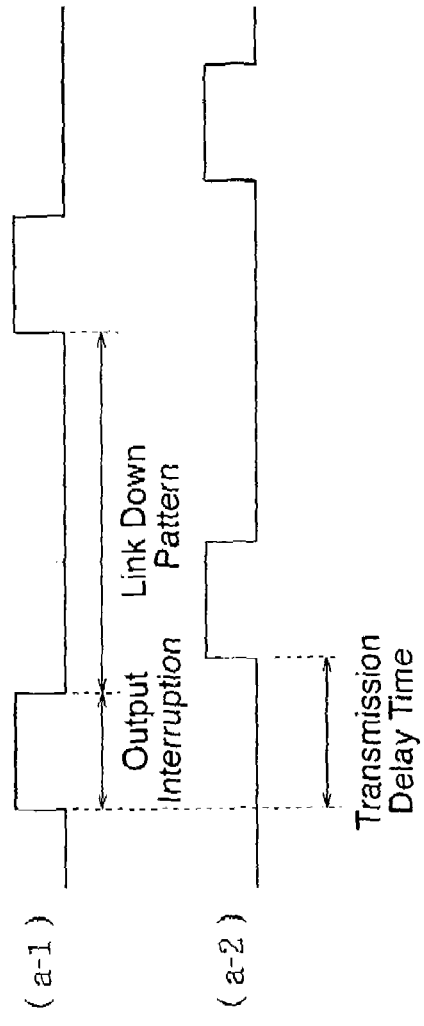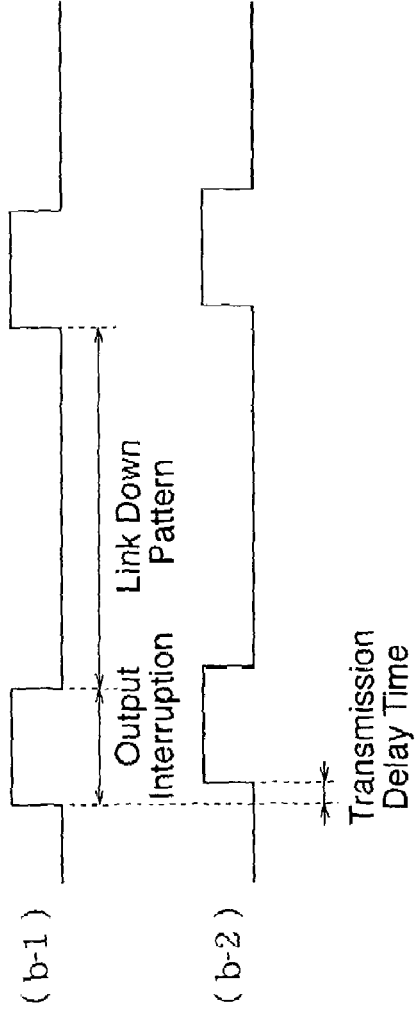
FIG.4(a)
FIG.4(b)

| Row | Event sequence |
|---|---|
| 105g: Transmission Device 103B Transmission Path Side Input | Interruption of Input (Loss Of Signal : LOS) |
| 105m: Transmission Device 103B Terminal Side Output | Interruption of Output (Loss Of Signal : LOS) |
| 105r: Duplex Switching Device 102B C-port Output | Interruption of Output (Loss Of Signal : LOS) |
| 105n: Duplex Switching Device 102B A-port Output | Output Interruption → Link Down Pattern → Output Interruption |
| 105h: Transmission Device 103A Transmission Path Side Output | Reception Fault Notification Packet → Link Down Notification Packet → Reception Fault Notification Packet |
| 105d: Transmission Device 103A Terminal Side Output | Output Interruption → Link Down Pattern → Output Interruption |
| 105b: Duplex Switching Device 102A C-port Output | Interruption of Output (Loss Of Signal : LOS) |
| 105c: Duplex Switching Device 102A A-port Output | Output Interruption → Link Down Pattern → Output Interruption |
| 105g: Transmission Device 103A Transmission Path Side Output | Reception Fault Notification Packet → Link Down Notification Packet → Reception Fault Notification Packet |

| Address | Bit Position | Types of Interface |
|---|---|---|
| 4h | 7~3 | Undefined |
| | 2 | OC48 long reach |
| | 1 | OC48 intermediate reach |
| | 0 | OC48 short reach |
| 5h | 7 | Undefined |
| | 6 | OC12 single mode long reach |
| | 5 | OC12 single mode intermediate reach |
| | 4 | OC12 single mode longe reach |
| | 3 | Undefined |
| | 2 | OC3 single mode long reach |
| | 1 | OC3 single mode intermediate reach |
| | 0 | OC3 single mode long reach |
| 6h | 7~4 | Undefined |
| | 3 | 1000BASE-T |
| | 2 | 1000BASE-CX |
| | 1 | 1000BASE-LX |
| | 0 | 1000BASE-SX |
| 7h~Ah | 7~0 | Fiber Channel Type Displayed |

*FIG.19*

| Address | Value | Transmission Code in Interface |
|---------|-------|-------------------------------|
| Bh | 00h | Undefined |
| | 01h | 8B10B |
| | 02h | 4B5B |
| | 03h | NRZ |
| | 04h | Manchester |
| | 05h~FFh | Undefined |

MULTIPLEX COMMUNICATION SYSTEM AND METHOD

BACKGROUND OF THE INVENTION

1. Field of the Invention

The present invention relates to a line switching system, an optical transmission switching device, a multiplex system and an Ethernet redundant method and the system, which are best applicable to a multiplex communication, specifically, to communication using Ethernet®.

2. Description of the Related Art

When achieving the multiplex communication, a line switching system is employed in which a plurality of lines are provided within the communication system and switching of the line (communication path) to be used is performed when, for example, a communication fault is generated in some part of the line.

As an example of a conventional data transmission system, there is a system comprising, in order to improve the reliability of the transmission, a present system line which is regularly used for communication and the standby system line, in which the line is switched to be used for the communication.

For example, a transmission system using Ether frame is less expensive compared to SONET/SDH (Synchronous Optical Network/Synchronous Digital Hierarchy) and has been largely used for LAN. The capacity of the transmission suing the Ether frame has been increased to meet the need of the times and the transmission capacity by one line has been rapidly increasing. Generation of a fault in such interface means interrupting a large amount of data so that the damage is enormous. In a network built by using a router, in general, there is a method in which the transmission path is switched by using a routing protocol when there is a fault.

A wavelength multiplex optical communication system disclosed in Japanese Patent Application Laid-open No. 11-50511 applied earlier by the applicant of this application comprises: as a present optical transmission system and a standby optical transmission system, an optical transmission system, respectively, in which a wavelength multiplex optical communication device having a transmission part and a reception part of wavelength multiplex signal light is placed through an optical transmission line. The reception part of the wavelength multiplex optical communication device comprises an alarm circuit for outputting an alarm signal when the signal light is not normally received, and an attenuator for attenuating the wavelength multiplex signal light when receiving the alarm signal outputted from the alarm circuit.

Thereby, all the light signals which are wavelength-multiplexed are automatically switched to the other transmission path so that it is possible to achieve maintenance and restoration work more rapidly compared to that of the related art.

However, in the above-described conventional system in which the transmission path is switched using the routing protocol, it requires rerouting of the lines to the other line by a router or the like. Thus, it takes an incredibly longer time from the detection of a fault to the completion of switching compared to a duplex switching by a protocol with a function of switching the lines such as SONET/SDH. Therefore, an enormous amount of notification is o be lost during the time.

If there is a switching system as that in SONET/SDH to be applied at the point of transmitting the Ether frame, however, there is no such system in the standard of Ethernet®. That is, in the case of achieving communication using a protocol without the function of switching the lines, it is time-consuming to perform duplex switching. Further, if a new protocol is provided to achieve this, it becomes incompatible in regards to interface.

A subject has been raised on how to achieve duplication of the line in the interface having no duplex switching protocol without changing a basic protocol in a network device. By defining a new protocol and terminating at a switching point, the interface becomes incompatible and the specification needs to be changed by each device. Further, by terminating the protocol, the device becomes complicated thereby increasing the price.

Further, the wavelength multiplex optical communication system disclosed in Japanese Patent Application No. 11-150511 utilizes the line-switching function of the protocol so that it is not applicable to the protocol with no line-switching function.

Furthermore, conventionally, there are also problems in regards to an optical transmission switching device, a multiplex system, and Ethernet system, respectively, used in a multiplex communication.

SUMMARY OF THE INVENTION

A first object of the present invention is to provide a line switching system and the method, which can achieve switching of lines at a high-speed even in a system in which communication is achieved using a protocol without a switching function of lines without adding expensive hardware.

A second object of the present invention is to provide a line switching system and the method, which can achieve switching of lines at a high-speed even in a system in which communication is achieved using a protocol without a switching function of lines without changing the basic protocol in the network.

Further, a third object of the present invention is to provide an optical transmission switching device, a multiplex system, an Ethernet redundant method and the system, which are best applicable to a multiplex communication.

BRIEF DESCRIPTION OF THE DRAWINGS

FIGS. 4(a) and 4(b) are waveform charts for describing the relations between a transmission delay time, output interruption time, and a link down pattern transmission time in the line switching system;

FIG. 9 is an illustration showing an example of transmission data from each device to a connected line at the time of the alarm transfer shown in FIG. 3;

FIG. 10 is an illustration showing an example of transmission data from each device to a connected line at the time of the alarm transfer shown in FIG. 5;

Figure 11:
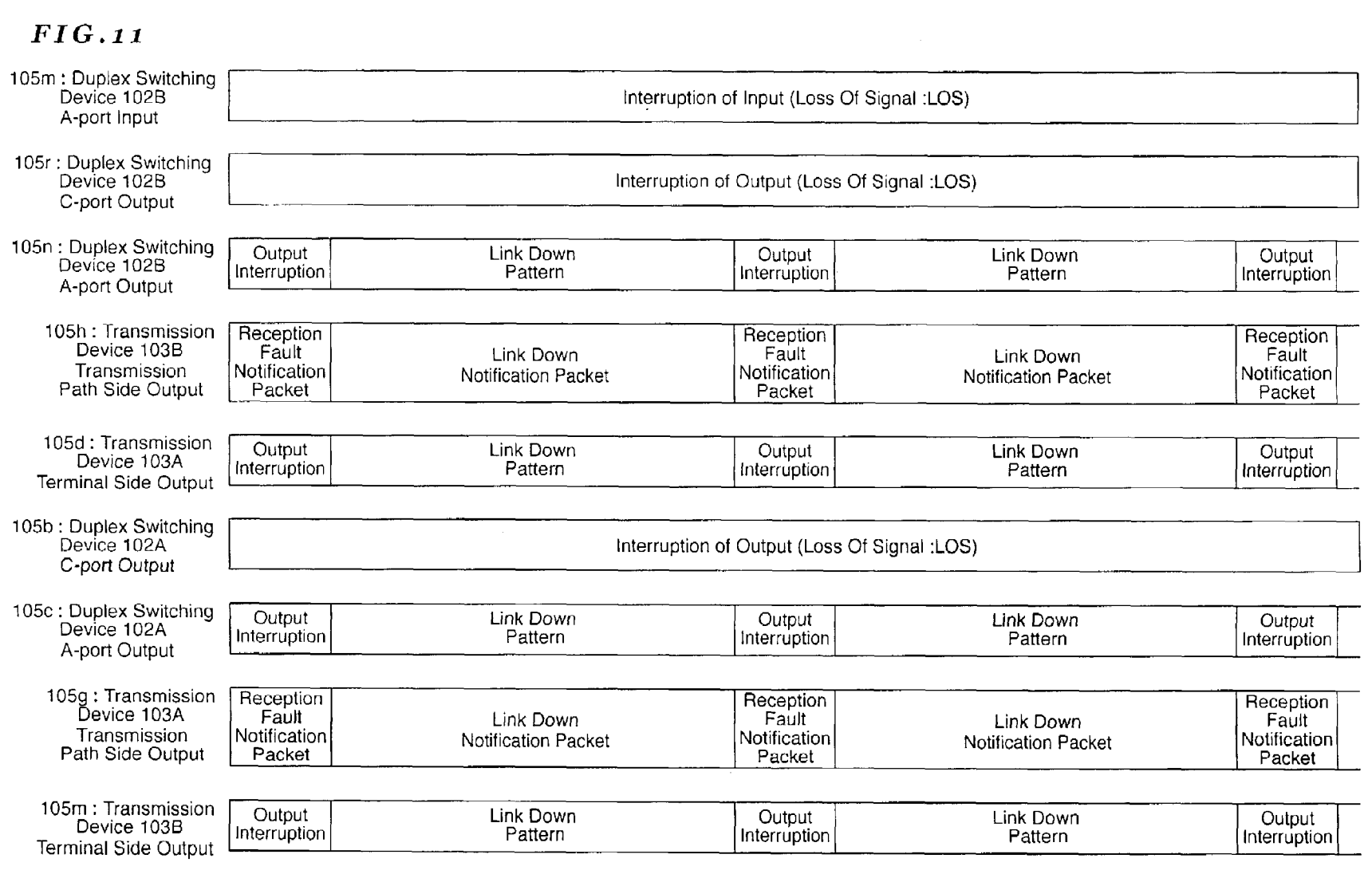

FIG. 11 is an illustration showing an example of transmission data from each device to a connected line at the time of the alarm transfer shown in FIG. 6;

FIG. 18 is an illustration showing a table of SFP interface types;

FIG. 19 is an illustration showing a table of SFP transmission code types;

DETAILED DESCRIPTION OF THE PREFERRED EMBODIMENTS

Figure 1:
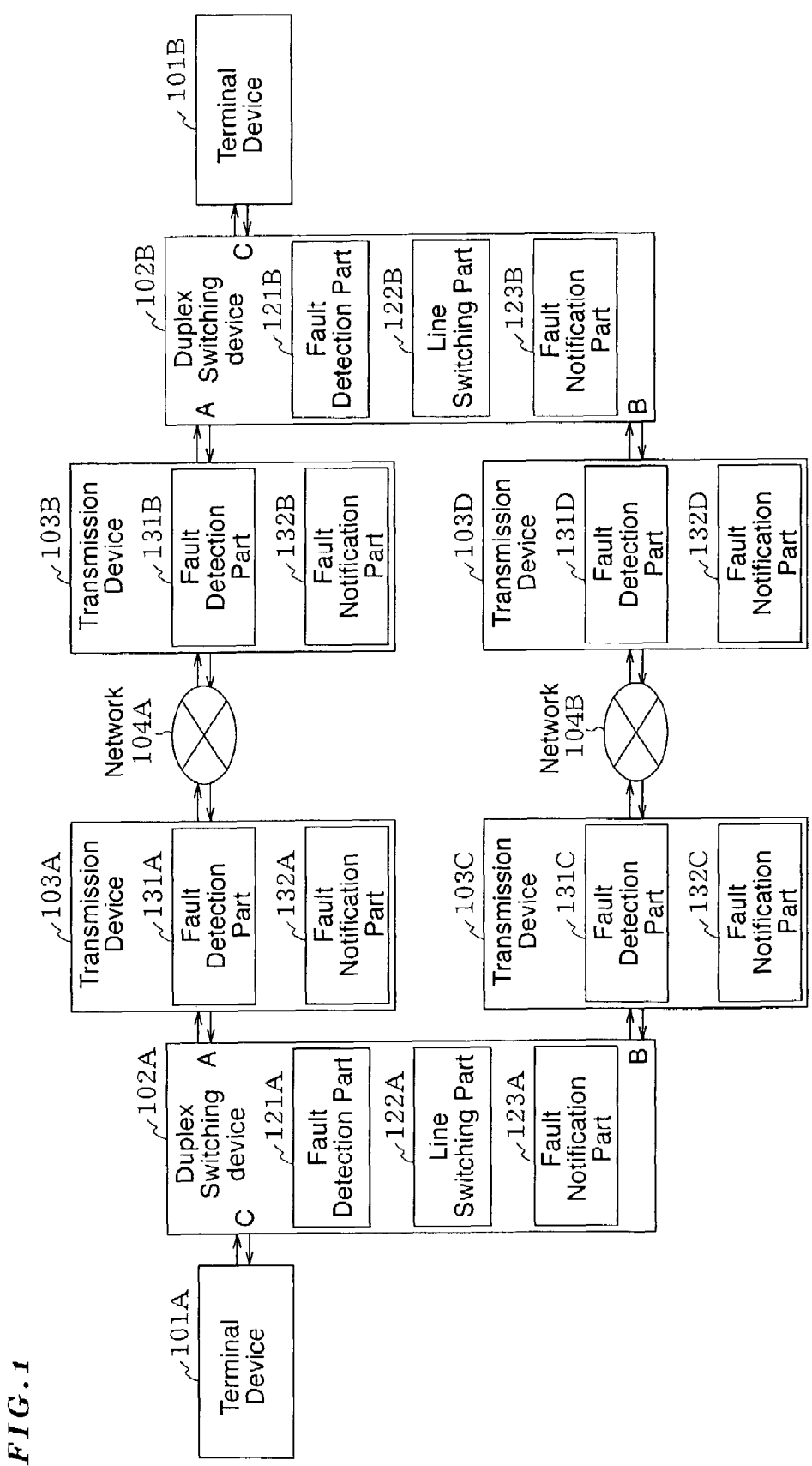
FIG. 1 is a block diagram showing an example of the configuration of a line switching system according to an embodiment of the present invention.

First, a line switching system in a multiples communication system according to the present invention will be described. The line switching system comprises a plurality of terminal devices and a plurality of line switching devices. In the system, at least one terminal device is connected to one line switching device and one line switching device is connected to another line switching device via a present line (line used for the present communication) and a standby line (standby system line), and one terminal device is connected to another terminal device prescribed beforehand to be capable of communication via a line switching device and a present line so that communication is achieved using a protocol without a line switching function. The standby line is a line replaceable with the present line. The line switching device of the system comprises: a fault detection unit for detecting generation of a fault through checking whether or not a recognizable signal is detected from a line within a prescribed time; and a line switching unit for, when the fault detection unit detects generation of a fault in the present line, switching the present line with the fault detected by the fault detection unit to the standby line which can be replaced with the present line thereby to perform communication between the terminal device and another terminal device prescribed beforehand.

It is desirable that the line switching unit switches the line after a switching protection time has passed from the detection of a fault by the fault detection unit.

Further, it is desirable to comprise a fault notification unit for notifying generation of fault to another line switching device when the generation of fault is detected in the fault detection unit.

Also, the lines used for connecting each device are full duplex lines (line achieved by full-duplex system) composed of a transmission line and a reception line. The fault notification unit may comprise: a function of, when a fault is detected in one of the lines out of the full duplex lines by the fault detection unit, notifying the fault using the other line of the full duplex lines.

Further, the fault notification unit may comprise a function of notifying a fault by periodically repeating interruption of signal output and transmission of a link down pattern for downing the link in a protocol. Also, in a period in the periodical repeat, time for transmitting the link down pattern may be set longer than time for interrupting output.

Further, it may comprise at least one transmission device capable of achieving a long distance communication between a terminal device and another terminal device, which is provided in each of the present line and the standby line in a line switching device. Also the transmission device may comprise: a transmission-side fault detection unit for detecting generation of a fault when a recognizable signal is not detected from the line within a prescribed time or by receiving notification of a fault generation; and a transmission-side fault notification unit for notifying the generation of fault when the transmission-side fault detection unit detects the generation of fault.

Also, the transmission-side notification unit may have a function of: notifying the generation of fault to a line switching device by interrupting signal output; and notifying for a transmission device by periodically transmitting a reception fault notification packet and a link down notification packet. Also, in a period in the periodical transmission of the notification, time for transmitting the link down notification packet maybe set longer than time for transmitting the reception fault notification packet.

Further, the detection of a fault through receiving notification of the fault generation transmitted from the transmission-side fault detection unit may be achieved by receiving the reception fault notification packet or/and receiving a link down notification packet.

Also, when the fault detection unit detects a fault generated in between a terminal device and a line switching device nearest to the terminal device, the fault notification unit may transmit a link down pattern to a transmission line.

In a line switching method for performing line switching in a multiplex communication system, at least one terminal device is connected to one line switching device and one line switching device is connected to another line switching device via a present line and a standby line; one terminal device is connected to another terminal device prescribed beforehand to be capable of communication via a line switching device and a present line so that communication is achieved using a protocol without a line switching function; and the standby line is a line replaceable with the present line. The method comprises: a fault detection step for detecting generation of a fault through checking whether or not a recognizable signal is detected from a line within a prescribed time; and a line switching step for, when the fault detection unit detects generation of a fault in the present line, switching the present line with the fault detected by the fault detection unit to the standby line which can be replaced with the present line thereby to perform communication between the terminal device and another terminal device prescribed beforehand.

In the line switching step, it is desirable that the line is switched after a switching protection time has passed from the detection of a fault by the fault detection unit.

Also, it is desirable that the method further comprises a fault notification step for notifying generation of a fault to another line switching device when the generation of a fault is detected in the fault detection unit.

Further, the lines used for connecting each device may be full duplex lines (line achieved by full-duplex system) composed of a transmission line and a reception line. Also, in the fault notification step, when a fault is detected in one of the lines out of the full duplex lines by the fault detection step, the fault may be notified using the other line of the full duplex lines.

Further, it is desirable that, in the fault notification step, a fault may notified by periodically repeating interruption of signal output and transmission of a link down pattern for downing the link in a protocol; and in a period in the periodical repeat, time for transmitting the link down pattern may be set longer than time for interrupting output.

Further, at least one transmission device capable of achieving a long distance communication between a terminal device and another terminal device may be further provided in each of the present line and the standby line in a line switching device. Also, the method may comprise a transmission-side fault detection step for detecting generation of a fault by the transmission device when a recognizable signal is not detected from the line within a prescribed time or by receiving a notification of a fault generation; and a transmission-side fault notification step for notifying the generation of fault when the generation of fault is detected in the transmission-side fault detection step.

In the transmission-side fault notification step, a line switching device may be notified by interruption of signal output; and a transmission device may notified by periodical transmission of a reception fault notification packet and a link down notification packet. In a period in the periodical transmission of notification, time for transmitting the link down notification packet may be set longer than time for transmitting the reception fault notification packet.

The detection of a fault through receiving notification of the fault generation in the transmission-side fault detection step may be achieved by receiving the reception fault notification packet or/and receiving a link down notification packet.

Further, when a fault generated in between a terminal device and a line switching device nearest to the terminal device is detected in the fault detection step, a link down pattern may be transmitted to a transmission line in the fault notification step.

Next, a specific example of the line switching system and the method according to the invention will be described in detail by referring to FIG. 1 to FIG. 13.

As shown in FIG. 1, the line switching system according to an embodiment comprises terminal devices 101 (101A, 101B), duplex switching devices 102 (102A, 102B), transmission devices 103 (103A, 103B, 103C, 103D), and networks 104 (104A, 104B) It is built through connecting the terminal device 101A to the duplex switching device 102A, the terminal device 101B to the duplex switching device 102B, and also connecting between the duplex switching device 102A and the duplex switching device 102B via a present system line (present line) used for the present communication and the standby system line (the standby line which is replaceable with the present line) In between the duplex switching devices 102A and 102B, that is, between the present system line and the standby system line, the transmission devices enabling a long-distance communication between the terminal device 101A and the terminal device 101B are provided. The transmission devices 103A and 103B are connected to the present system line and the transmission devices 103C and 103D are connected to the standby system line, respectively.

In the embodiment as shown in FIG. 1, the network 104A is connected between the transmission device 103A and the transmission device 103B, and the network 104B is connected between the transmission device 103C and the transmission device 103D, respectively. The network 104A and the network 104B may simply be relay networks and the structure within each network is not an issue. Further, it is also possible to directly connect between the transmission device 103A and the transmission device 103B, and between the transmission device 103C and the transmission device 103D without having the networks 104A and 104B provided in between.

The line switching system according to the embodiment uses a line switching method (duplex switching method) with the on-signal state being the trigger. The system comprises: the terminal device 101A and the terminal device 101B for transmitting and receiving data; the duplex switching devices 102 (102A, 102B), which judge the line state of data from the terminal device 101A and the terminal device 101B on the transmission side based on the presence of the reception signal and, when it judges that there is no reception of signal due to a fault generated in the line, select the line system with no fault; and transmission devices 103 (103A, 103B, 103C, 103D) for transmitting the notification to an opposing station (duplex switching device) via the network 104.

The duplex switching devices (line switching devices) 102 (102A, 102B) comprise fault detection parts 121 (121A, 121B) for detecting generation of a fault in the line, line switching parts 122 (122A, 122B) for switching the line to be used, and fault notification parts 123 (123A, 123B) for notifying the generation of the fault.

The fault detection parts 121 detect the generation of fault through checking whether or not a recognizable signal is detected from the connected line within a prescribed time. The generation of fault, for example, is an incommunicable state caused by cut in the cable.

The line switching parts 122 switch the present line to the standby line thereby to achieve the communication between the terminal device 101A and the terminal device 101B when the fault detection parts 121 detect the generation of fault in the present system line.

Further, the fault notification parts 123 notify the generation of fault to the other duplex switching device when the fault is detected in the fault detection parts 121.

Transmission devices 103 (103A, 103B, 103C, 103D) comprise fault detection parts 131 (131A, 131B, 131C, 131D) for detecting generation of fault and fault notification parts 132 (132A, 132B, 132C, 132D) for notifying the detected generation of fault.

The fault detection parts (transmission side fault detection unit) 131 detect the generation of fault due to the fact that a recognizable signal from the line is not detected within a prescribed time or receiving notification on the generation of fault.

Also, the fault notification parts (transmission-side fault notification unit) 132 notify (transfer the alarm) the generation of fault when the fault detection parts 131 detect the fault.

The above-described networks 104A and 104B are communication networks for transmitting notification using transmission devices. Examples may be SONET/SDH and the like.

The example of the configuration shown in FIG. 1 shows a simplified configuration in bilateral symmetry with respect to the network as the point of symmetry. In the following, it will be described by referring to the state where the transmission devices are directly connected to each other with the network 104 being omitted.

As for the transmission devices 103, the ones to be provided on A-side (the present system line side) selected by the duplex switching device 102A and the duplex switching device 102B are to be the transmission device 103A and the transmission device 103B, and the ones to be provided on B-side (the standby system line side) are to be the transmission device 103C and the transmission device 103D. The four transmission devices are provided in different area but are the same devices.

The above-described transmission devices 103 (103A, 103B, 103C, 103D), when detecting line fault at the network connecting point, a fault in the transmission devices themselves, and a fault at the connecting points between with the duplex switching device 102A and the duplex switching device 102B, notify the generation of fault through interrupting the output of signals to the duplex switching device 102A and the duplex switching device 102B, thereby triggering the duplex switching device 102A and the duplex switching device 102B to perform judgment for switching.

Further, the above-described terminal devices 101, the duplex switching devices 102, and the transmission devices 103 comprises a communication part (not shown), respectively, thereby enabling communication between the connected devices described above.

Next, the duplex switching devices 102 (102A, 102B) will be described by referring to FIG. 2. The duplex switching devices 102 (102A, 102B) have a function of switching the line from the present system line to the standby system line to be used for the communication between the terminal device 101A and the terminal device 101B.

The duplex switching devices 102 (102A, 102B) comprise a C-port 126$h$ on the terminal side for connecting the terminal devices, an A-port 126$f$ on the transmission path side for connecting the transmission device on the present system line, and a B-port 126$g$ on the transmission path side for connecting the standby system line, and achieve duplex system switching through judging the line state of the A-port 126$f$ and the B-port 126$g$ on the transmission path side.

Further, the above-described fault detection parts 121 comprise fault detection circuits (121$f$, 121$g$, and 121$h$) provided for each port. The above-described line switching parts 122 comprise a switch 150 and a switching control circuit 160. The above-described fault notification parts 123 comprise output control circuits (123$f$, 123$g$, 123$h$) provided for each port.

The input side of the C-port 126$h$ on the terminal side comprises an input terminating part 124$h$ for terminating the signal inputted from the C-port 126$h$ and a fault detection circuit 121$h$ for detecting the fault from the received data, and is connected to the switch 150 which selects the transmission path.

There is a switching control circuit 160 provided for judging the line state of data transmitted from the A-port 126$h$ on the transmission path side and the B-port 126$g$ on the transmission path side. The switch 150 for selecting the line (selection system) used for communication between the terminal device 101A and the terminal device 101B is controlled based on the result judged by the switching control circuit 160. Data from the selection system (line) is outputted from the C-port 126$h$. The output side of the C-port 126$h$ comprises an output control circuit 123$h$ for controlling the output of the C-port through monitoring the fault state on the line side and an output terminating part 125$h$ for terminating the output signal.

The inside structures of the input terminating part 124$h$ and the output terminating part 125$h$ vary depending on whether the interface between the devices is optical or electrical. However, in any case, it can judge the fault state by detecting the loss of the signal (the state where there is no changing point for a prescribed period or longer) and the same configuration can be achieved as the block. In other words, by changing the input terminating part 124$h$ and the output terminating part 125$h$, it is possible to achieve an optical communication or electrical communication between the devices. The same is true for the input terminating parts 124 and the output terminating parts 125 in the A-port and B-port.

The input side of the A-port 126*f* on the transmission side comprises an input terminating part 124*f* for terminating the signal inputted from the A-port 126*f* and a fault detection circuit 121*h* for detecting the fault from the received data, and is connected to the switch 150 which selects the transmission path. The output side of the A-port 126*f* comprises an output-control circuit 123*f* for controlling the output of the A-port through monitoring the fault state on the line side and an output terminating part 125*f* for terminating the output signal.

Also, the input side of the B-port 126*g* on the transmission path side comprises an input terminating part 124*g* for terminating the signal inputted from the B-port 126*g* and a fault detection circuit 121*g*, and is connected to the switch 150 which selects the transmission path. The output side of the B-port 126*g* comprises an output control circuit 123*g* for controlling the output of the B-port through monitoring the fault state on the line side and an output terminating part 125*g* for terminating the output signal.

The control terminal 127 is connected to a switching control circuit 160 of the duplex switching devices 102 (102A, 102B) and is used for monitoring the state of the duplex switching devices 102 and for outputting a forcible switching instruction.

Now, the outline of the above-described line switching system according to the embodiment will be described.

The embodiment provides a method of performing an automatic switching of the lines to the standby line with no fault at a point of detecting a fault when the line is duplicated to a present system line and a standby system line in a system with a line-duplex structure such as the interface of SONET/SDH having no switching protocol.

In other words, it is a system comprising a present system line and a standby system line which can be switched. The system, even when it is built to achieve communication using a protocol without a function of switching the lines, can achieve switching of the lines remarkably faster than that of the case using a routing protocol, e.g., as fast as the rate not much slower than that of the case achieved by a protocol with a function of switching the lines such as SONET/SDH when the fault is detected. As the system for performing communication using a protocol without the function of switching the lines, it is applied to a network using Ethernet® devices and the like which transmit data using Ether frame and the like.

The embodiment, as shown in FIG. 1, is applied to the case of duplex structure in which the duplex switching device 102 is provided in between the transmission device 103 and the terminal device 101 and notification is transmitted by the transmission device 103 via two-system lines of a present system line and a standby system line. In the embodiment, when a line fault is generated, it does not change the protocol between the transmission device 103 and the terminal device 101 but uses a line switching method using the non-signal state as the trigger for switching the lines. In the method, an alarm for the line fault is transferred and notification on the generation of line fault is transmitted from the transmission device 103 to the terminal device 101 through interruption of the signal (interrupting the output of signal). The state is detected by the duplex switching device 102 provided between the transmission device 103 and the terminal device 101 as the trigger for switching.

Figure 3:
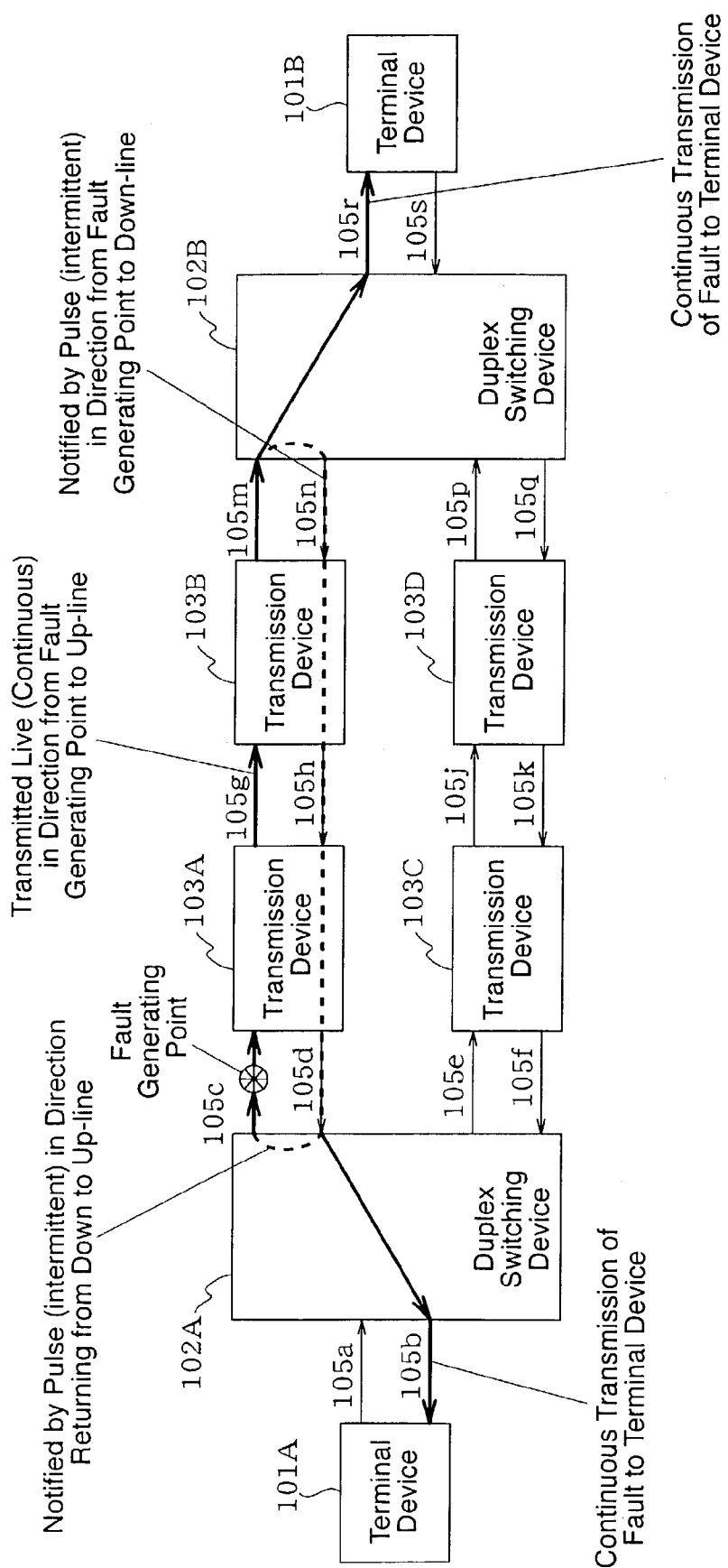
FIG. 3 is a block diagram showing an example of the outline of an alarm transfer method when a fault is generated in a line 105c in the line switching system.
Figure 5:
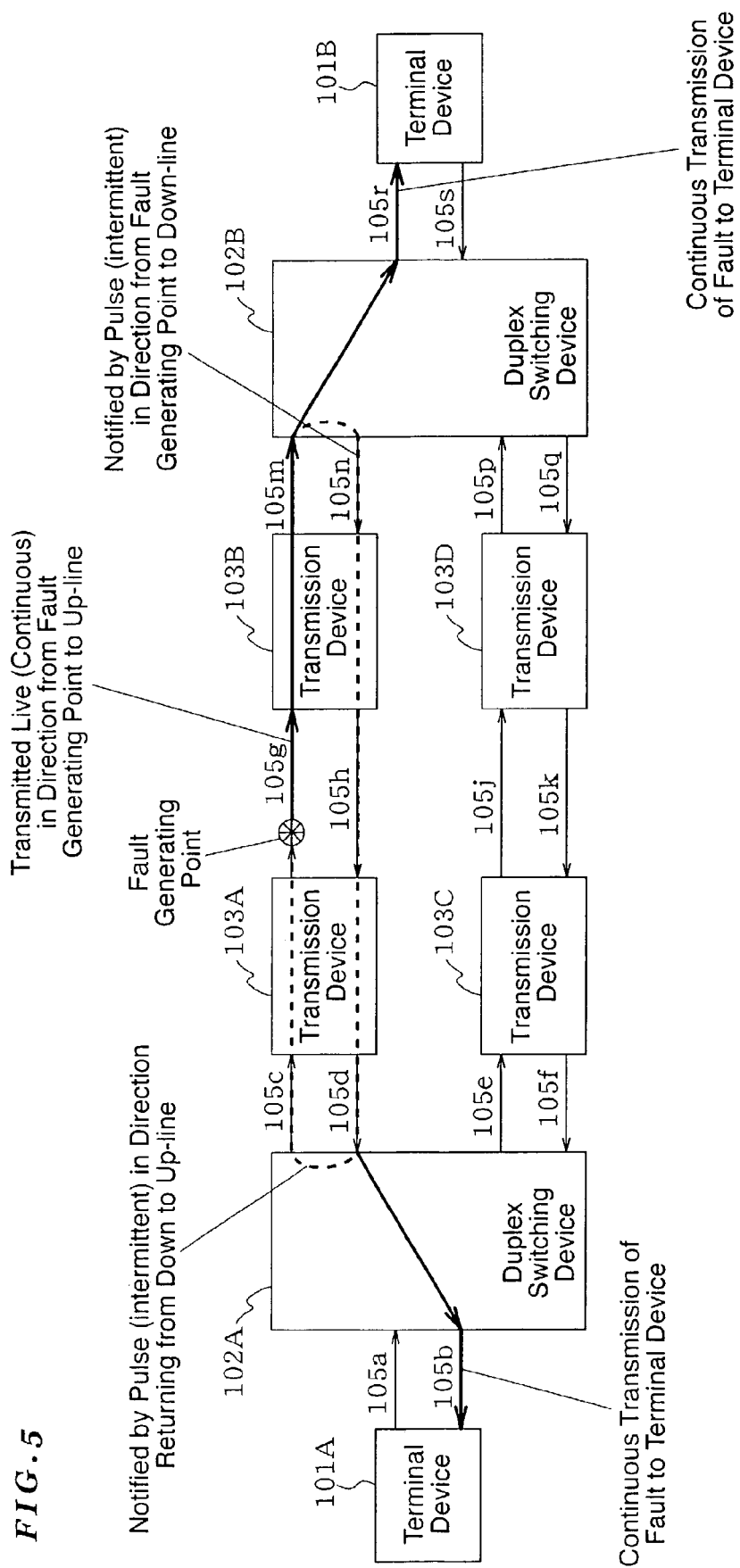
FIG. 5 is a block diagram showing an example of the outline of an alarm transfer method when a fault is generated in a line 105g in the line switching system.
Figure 6:
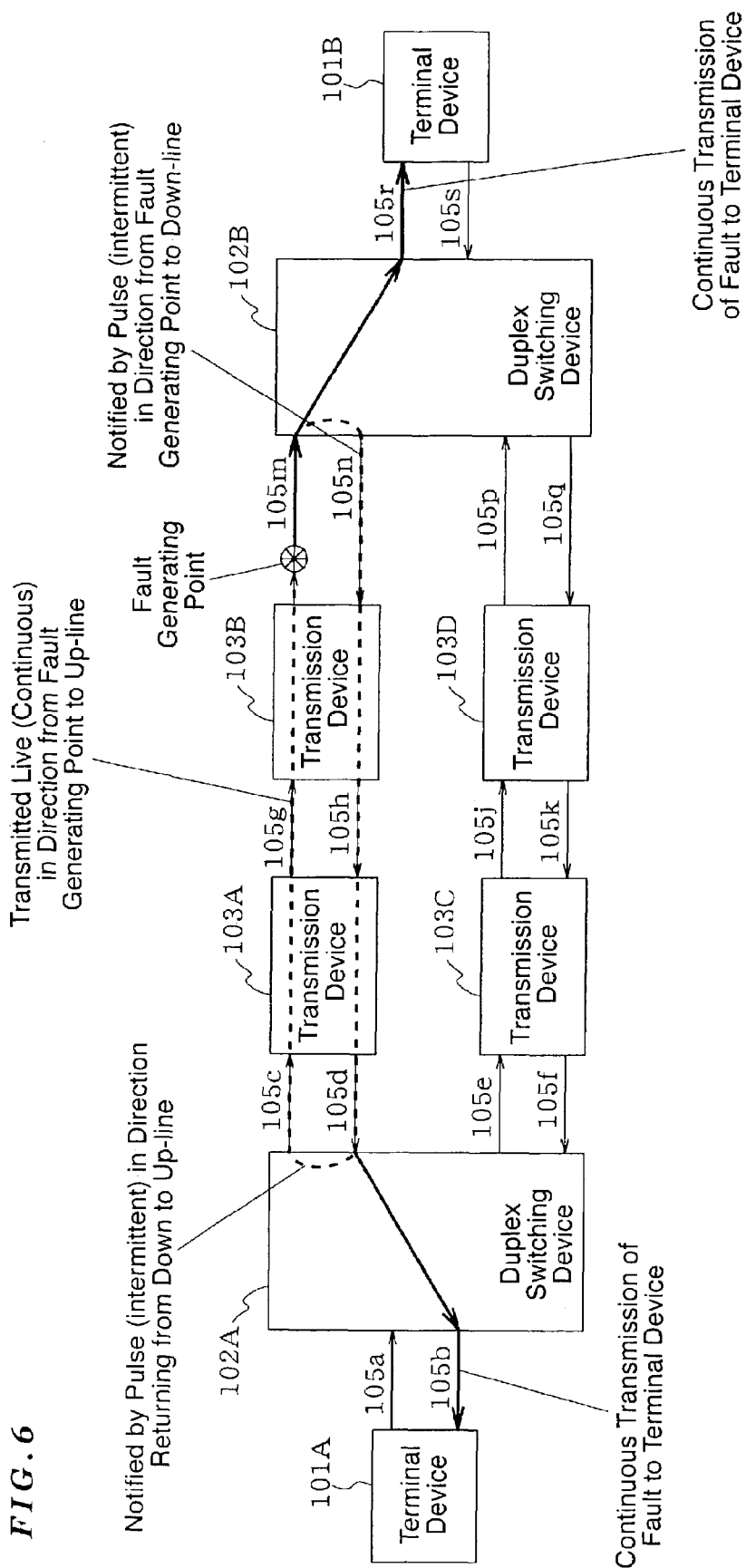
FIG. 6 is a block diagram showing an example of the outline of an alarm transfer method when a fault is generated in a line 105m in the line switching system.

When a line fault is generated, as shown in FIG. 3, FIG. 5 and FIG. 6, from the fault point towards the data transmission direction, notification on the fault state (non-signal state) is always transmitted to the transmission device 103, the duplex switching device 102, and the terminal device 101 on the opposing side so that the duplex switching device 102 can recognize the generation of fault. When the duplex switching device 102 detects the fault, it transmits the notification on the fault state (non-signal state) to the down-route line (the line towards the reverse (the other) direction of the line with a fault out of the full duplex line). The notification is sent out intermittently through alternately transmitting the signal-down state and signal-up state from the duplex switching device 102 to the transmission device 103, to the transmission device 103 on the opposing side, and to the duplex switching device 102 on the opposing side. The duplex switching devices 102 on both stations recognize the generation of fault with no inconsistency. In the description of the present invention, the route from the fault generating point to the duplex switching device on the opposing side is defined to be an up route and the reverse direction from the duplex switching device to the duplex switching device on the opposing station is defined to be a down route.

It has been described that the signal for notifying the generation of fault is to be transmitted to the down-route line. The lines used for connecting in between each device in the line switching system according to the embodiment are full duplex lines consisting of a transmission line and a reception line. Thus, when a fault is detected in one of the full duplex lines, the signal is transmitted (notified) using the other line out of the full duplex lines.

Figure 7:
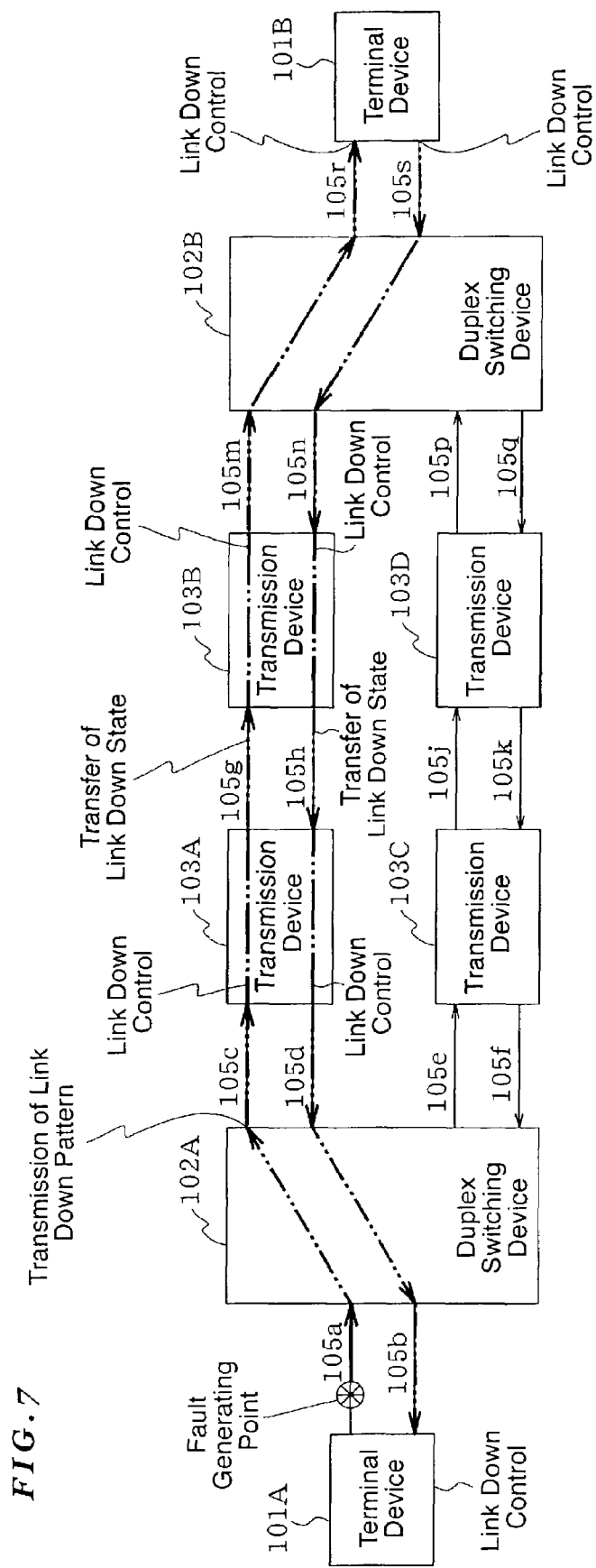
FIG. 7 is a block diagram showing an example of the outline of an alarm transfer method when a fault is generated in a line 105a in the line switching system.
Figure 8:
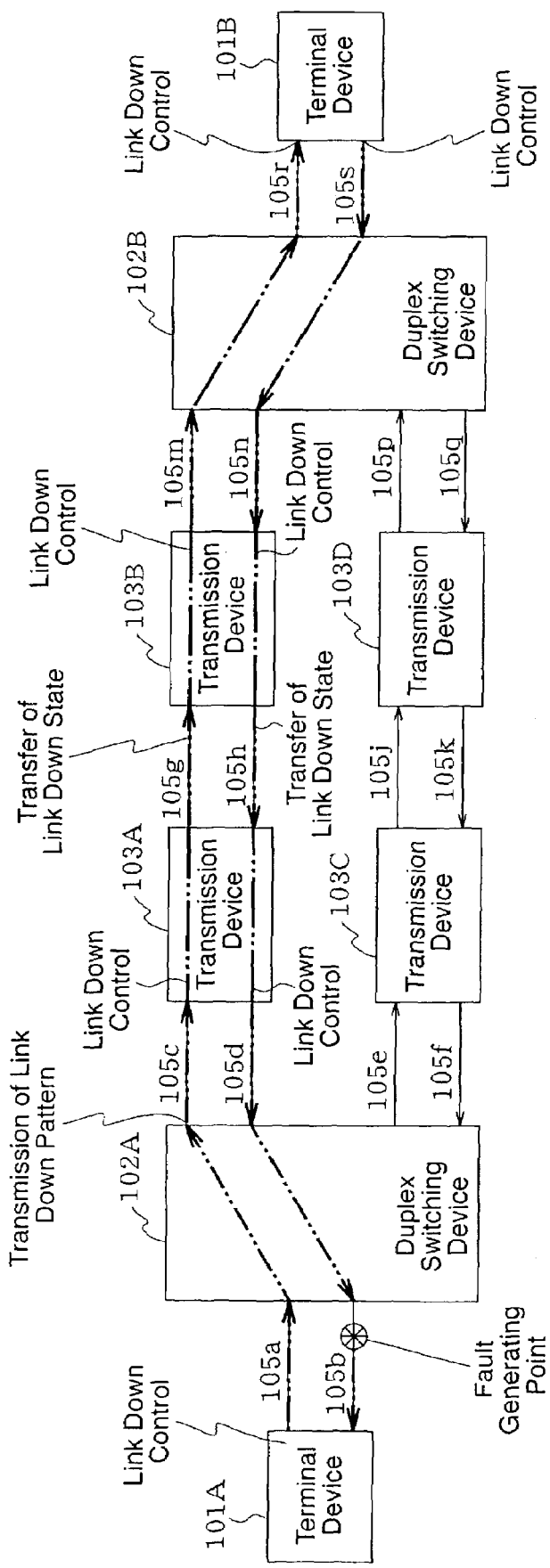
FIG. 8 is a block diagram showing an example of the outline of an alarm transfer method when a fault is generated in a line 105b in the line switching system.

When a fault is generated in a part (section) between the terminal device 101 and the duplex switching device 102 where the line is not duplicated, as shown in FIG. 7 and FIG. 8, the link of the terminal device on the opposing station is downed through transmitting a link-down pattern to the opposing station of the line selected by the duplex switching device 102. At this time, switching operation is not performed.

The alarm transferred from the fault generating point to the down-route direction is transmitted intermittently as described. Thus, the route of the transferred alarm (notification on the generation of fault) becomes a loop shape. However, when the fault is restored, the alarm transfer in the down-route direction is intermittently performed so that the route is interrupted thereby restoring to the normal state.

When a fault is generated, an alarm notification is transferred to the duplex switching device 102 so that it operates so as to select the line with no fault. Therefore, when there is a fault continued to be generated in one system only (either one of the present system line or the standby system line), the duplex switching device 102 on the opposing side continues to select the same system. Further, when a fault is generated in both systems (both the present system line and the standby system line), or when the fault on the port-A side is restored, it has a function of selecting the consistent system by the duplex switching devices 102 on the opposing stations through always selecting the port-A side when the faults in both systems are restored.

As in the Ethernet®, when a link is established by a protocol between the transmission device 103 and the terminal device 101, it is necessary to terminate the protocol at the connecting point. If a MAC terminating function for terminating the protocol is provided in the duplex switching device 102, the scale of the hardware becomes large so that the price of the device itself increases. In order to cope with the problem, MAC termination is not performed in the duplex switching device 102, and uses a system in which the duplex switching device 102 is provided as if it is a transmission path and judgment for switching is performed through monitoring the input of the signal and the non-signal state. Therefore, with the line switching system according to the embodiment, it is possible to achieve the duplex switching device itself at a low cost.

Further, the duplex switching device 102 has a function of forcibly switching the line to be used through selecting a switching system device. As the forcible switching system, a method is used in which a forcible switching is performed through generating a false optical loss state (no output state) for the originally selection system (the line used at present) so that the switching operation starts as in the case of the actual switching. Thus, in the embodiment, the forcible switching function can be achieved without providing another judging circuit for switching.

Also, switching is performed by monitoring the fault state of the line to be switched to, so that it is possible to avoid the cut in the line after the switching caused by a fault in the line to be switched to.

Further, the duplex switching device 102, when the power source is supplied, continues the interruption of output to the standby line side (B-port side) longer than that of the present line side (A-port side) at the time of initially booting the device. Thereby, when the initial booting is completed, it starts to operate by selecting the A-port side as long as there is no fault generated in the present line (the line on the A-port side).

Therefore, when the power source is supplied, the duplex switching device 102 selects the same system (the line to be used) between the duplex switching devices of both stations so as to avoid the state continuing to select the different system (line).

In recent years, the rate of interface between the devices has been improved along the increase in the capacity of communication. Conventionally, the transmission device is a multiplex device with SONET/SDH and a duplex method used in SONET/SDH has been applied when duplicating the line. However, a high-speed interface in the standard of Ethernet® has been introduced and it has been more frequently used in the section of transmission device between the terminal device. In this case, it is possible to use the line using Ethernet® through duplicating it into a present system line and a standby system line. However, the interface of Ethernet does not have a duplex switching protocol like the conventional SONET/SDH interface so that a method has been employed in which the communication route (the line used for communication) is reset in the host routing protocol. With this method, it takes incredibly longer time from the generation of fault to switching the line to the standby system line compared to the duplex switching by a protocol having a function of switching the line such as SONET/SDH, thereby loosing a large amount of data. The invention is to achieve high-speed duplex switching in the interface of Ethernet® without a function of switching the line through using the non-signal state in the section between the transmission device and the terminal device as the switching trigger without changing the protocol.

As a function required for the transmission device 103, there is a function of interrupting the output of the terminal device side (the line connected to the duplex switching line 102) when there is a fault generated. Further, the duplex switching device 102 is provided between the terminal device 101 and the transmission device 103 thereby to leave the switching processing itself to the duplex switching device. Therefore, the terminal device 101 and the transmission device 103 normally operate even when the line is not duplicated (the case with present line only) and, in the case of duplicating the line afterwards, it can be achieved by adding a transmission device and a duplex switching device for the standby system line.

When fabricating the duplex switching device 102, the hardware becomes complicated if switching is achieved by performing the termination including the protocol. As a result, the price of the duplex switching device 102 is increased. In order to solve this, switching of the line to the standby system line is achieved through simply judging whether or not the input signal is interrupted (non-signal state). The duplex switching device 102 has a configuration comprising a detection circuit for detecting the interruption of the input signal (non-signal state) and a selector switch for system selection thereby achieving the hardware with a simple structure.

In the embodiment, when detecting a fault generated on the transmission path is detected, an alarm is transferred to the terminal device 101 side for triggering the line switching. If only the trigger is supplied, a fault is generated in a plurality of points. Thus, when it is restored, the different systems (selected line) may be selected between both duplex switching devices so that self-restoring may not be achieved. During the fault, it is necessary to keep detecting the fault in the duplex switching device on both stations. Therefore, the transmission device 103 detecting the generation of fault needs to transfer the alarm to the duplex switching device 102 on both stations.

Transferring of the alarm to the transmission device 103, the duplex switching device 102, and the terminal device 101 at the time of a fault can be achieved through notifying the state of fault. The duplex switching device 102 achieves switching of the duplex line by switching the system (the line to be used) after detecting the fault. Also, it is necessary to transfer the alarm to the duplex switching device on the opposing station thereby to give a switching trigger to the notified duplex switching device. In other words, the fault detected by either one of the duplex switching device needs to be alarm-transferred to the opposing duplex switching device.

It is not possible to recognize the whereabouts the fault is generated when the alarm is being transferred. Thus, the duplex switching device on the opposing station transfers the alarm to the opposing device when detecting a fault. In this alarm-transfer method, the alarm transfer is performed from the fault generating point as the starting point and loops between with the opposing duplex switching device thereby to be transferred to the fault generating point. If the fault detected by the duplex switching device is transferred as it is towards the opposing duplex switching device, the alarm transfer is continued without a break of the fault even at the point where the fault is restored. Thus, it cannot break the endless loop of the alarm. In order to solve this, when transferring the alarm for the fault detected by the duplex switching device to the opposing duplex switching device, interruption of signal (non-signal state) and the link down pattern are transmitted periodically thereby to intermittently transfer the alarm. Thereby, it prevents the endless loop of the alarm transfer when the fault is restored.

Further, in the line switching system according to the embodiment, when there is a fault generated in both duplex lines and becomes incapable of communication, the duplex switching devices on both stations are to select the system on the A-port side. Therefore, it can be operated in such a manner that both stations always select the same system when it is restored from the fault.

If there is no such function for selecting the A-port side when it is incapable of communication, there may be cases where both stations select different systems depending on the timing by which double faults are generated. When the faults are restored from that state simultaneously, the devices continue to operate while keep selecting the different systems, so that it becomes impossible to break from the state. In order to solve the problem, the duplex switching device 102 according to the embodiment operates to select the A-port at the time of double faults. Also, it is booted through generating a false fault for the B-port so that the A-port is to be selected when the power source is supplied to the device. Thus, the devices can be started to operate by selecting the same active system (the lines to be used).

Next, operation of the line switching system according to the embodiment will be described.

First, the basic operation will be described by referring to FIG. 1. Data from the terminal device 101A is transmitted to the duplex switching device 102A. The duplex switching device 102A always monitors the state of signals transmitted from the A-port and B-port connected to the transmission path at all times. When there is no fault generated in the system (line), which is selected at present, the duplex switching device 102A continues to select the present system and switches the line when there is a fault generated in the system selected at present.

The generation of fault is detected through judging whether or not the data inputted to the A-port and B-port of the duplex switching device 102A is interrupted. In other words, the fault detection part 121A judges it as a generation of fault when a recognizable signal from the line is not detected for a prescribed time. The prescribed time may be longer than the maximum value of the continued state of time where the signal is interrupted by a protocol. Also, it may be the time obtained by adding time for confirming the error to the maximum value.

The line is switched when it is judged that the fault is continued even after the switching protection time has passed. In the duplex switching device 102A, when there is a fault generated in the input of either the A-port or the B-port connected to the transmission path, the generation of fault is also notified to the opposing connected device. The alarm is transferred to the duplex switching device 102B on the opposing station side via the transmission device 103A and the transmission device 103B, or via the transmission device 103C and the transmission device 103D.

Figure 9:
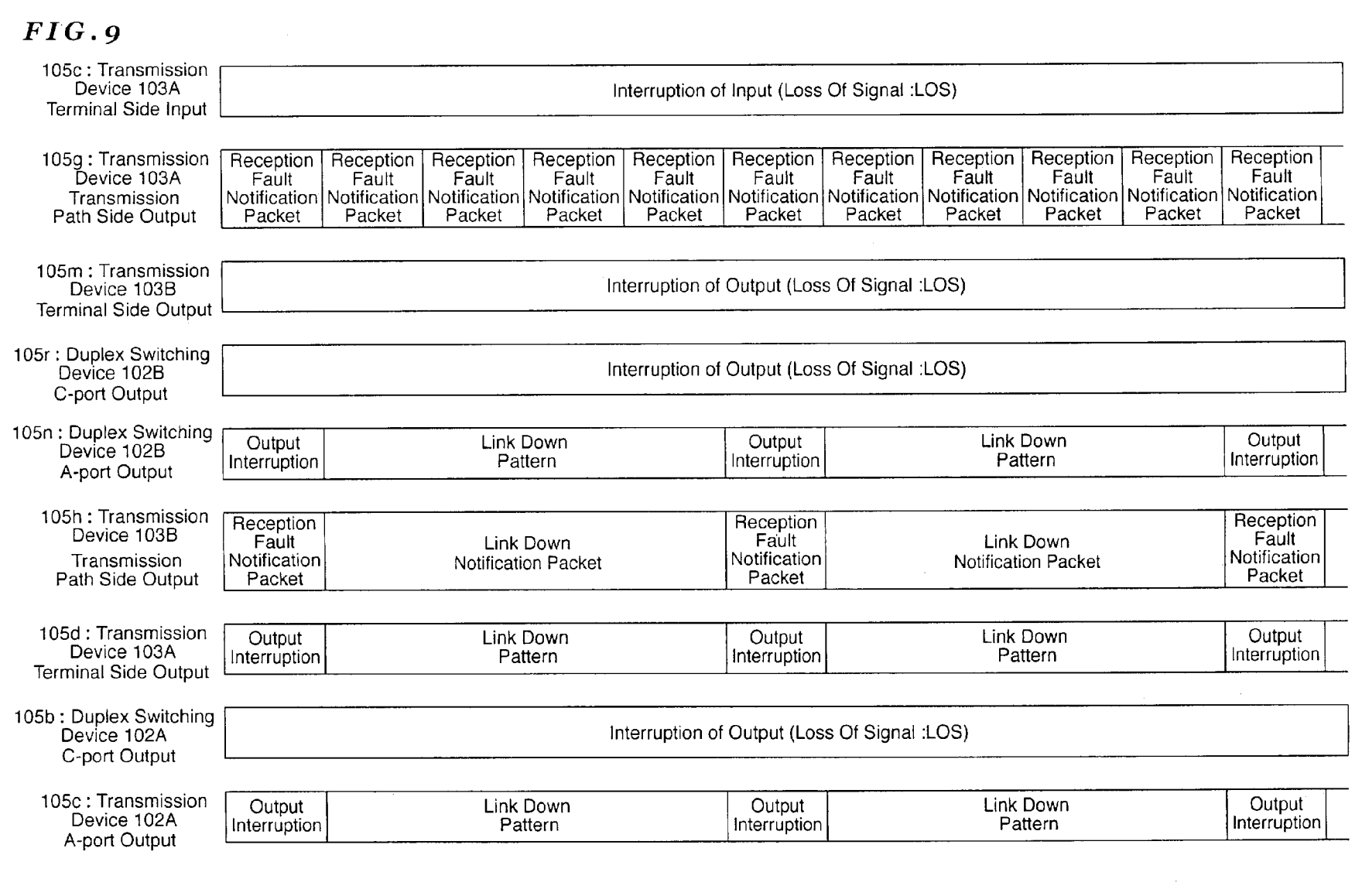

The alarm transfer by the transmission device 103 and the like will be described by referring to the case where there is a fault generated in the line 105c shown in FIG. 3. When there is a fault generated in between (line 105c) the transmission device 103A and the duplex switching device 102A, first, the transmission device 103 detects it as a reception fault. The transfer data at each point shown in FIG. 3, at the time of detecting the loss of input as the reception fault, is shown in FIG. 9 as a transmission data at the time of transferring the alarm.

There is no fault generated in between (line 105g) the transmission device 103A and the transmission device 103B so that a normal transmission is possible. At this time, the reception fault detected by the transmission device 103A is notified to the transmission device 103B on the opposing side through generating a packet for notifying the fault (reception fault notification packet). Upon receiving the reception fault notifying packet, the transmission device 103B notifies the generation of the fault to the duplex switching device 102B through interrupting the output to the line 105m. The switching device 102B notifies the non input to the terminal device 101B through the line 105r while notifying the output side 105n of the A-port through periodically interrupting the output and transmitting the link pattern. In other words, the fault detection part 123B notifies the detected fault through periodically repeating the interruption of the output signal and transmitting the link down pattern for downing the link in the protocol.

The fault is not notified through continuously interrupting the output because of the following reason. The link down pattern will be also described in the followings. As shown in FIG. 3, the alarm at the time of fault is transferred (generated fault notification) turning back and forth in between the duplex switching device 102A and the duplex switching device 102B. Thus, the route transferring the alarm is to be in a loop. If the alarm is always being transferred in between the devices, the transferred fault generation notification becomes a factor for regenerating a fault after the fault is being restored. Therefore, it cannot break from the loop state.

Therefore, the generation of fault is continuously transferred from the fault generating point until reaching the duplex switching device 102B and the interruption of the output and the link down pattern are periodically transmitted in the route from the duplex switching device 102B to the opposing duplex switching device 102A thereby to provide a non-signal state and a signal state alternately. Thereby, it avoids the alarm to be continuously transferred in the loop state.

At this time, the no-output state is to be defined sufficiently long for the alarm transfer delay time between with the opposing stations. The relation between the transfer delay time, time for the output interruption, and the link down pattern transmission time will be described by referring to FIG. 4.

FIG. 4(a) shows the case where the above-described time for the output interruption is shorter than the transfer delay time. FIG. 4(a-2) shows the state in which the signal is delayed for the transmission delay time with respect to the case shown in FIG. 4(a-1). Further, FIG. 4B shows the case where the above-described time for the output interruption is sufficiently longer than the transmission delay time. FIG. 4(b-2) shows the state in which the signal is delayed for the transmission delay time with respect to the case shown in FIG. 4(b-1). In the figures, "H" level denotes the non-output state due to the generation of fault and "L" level denotes the link down pattern transmission time.

When notification on the generation of fault is transmitted in a loop state due to a fault generated at a fault generating point, if, as shown in FIG. 4(a), the time for output interruption is shorter than the transfer delay time at the point where the notification is transferred to the point just before the fault generating point, the duplex switching device 102 waits judgement based on the received signal during the transfer delay time in order to avoid a misjudgment. As a result, the non-signal state shown in FIG. 4(a-1) is not used for the judgment so that the duplex switching device 102 misunderstands that the fault is temporarily restored. In other words, there may be cases where the duplex switching devices on both stations recognize the fault as the different fault state.

On the contrary, by setting the time for the output interruption sufficiently longer than the transmission delay time as shown in FIG. 4(b), it can avoid the affect caused by waiting the judgment described above for the transmission delay time and able to recognize the output interruption. Further, even if there is a difference in the recognized time because of the transfer delay time in both duplex switching devices, there is a time zone in which both of the duplex switching devices can commonly recognize the fault state. Therefore, it is possible to avoid such a problem of repeatedly recognizing the fault even after the fault is temporarily restored.

In the periodical transmission of the output interruption and the link down pattern, the time for transmitting the link down pattern per period is set to be longer than the time for the output interruption. Thereby, it is possible to avoid the endless loop state where the device, which transferred the alarm by detecting the fault, detects the fault by the alarm transferred from the device itself.

The minimum requirement for avoiding the endless loop state is to set the time for transmitting the link down pattern longer than that of the output interruption per period of the alarm transfer. It has been verified by inventor of the present invention that it is preferable that the time for transmitting the link down pattern be about four times longer than that of the output interruption per period. For example, provided that the maximum data transfer delay time between the terminal device 101A and the terminal device 101B is 10 ms, if the time for the output interruption in one period is 100 ms, and the transmission time of the link down data is 400 ms and the one period is 500 ms, there is no such problem to be generated as the endless loop state as described above, since there is a four-time interval to be present in between. Further, the time for the output interruption is sufficiently longer than the transfer delay time so that no such problem in regards to the transfer delay is generated. Therefore, it is confirmed that the devices normally operate.

Now, the link down pattern will be described. When transmission is achieved in between the terminal device 101A, the transfer device 103A and the transmission device 103C, as well as in between the terminal device 101B, the transmission device 103B and the transmission device 103C using Ethernet frame, link up control is performed in between the devices and it becomes possible to transfer data at the point when the link is established. When there is a generation of fault, communication cannot be normally performed and the link is down. During the fault, the link down pattern is sent out to keep the link-down state. As the link down pattern, a pattern in violation of 8B10B code used for transmitting Ether frame may be generated. For example, ON/OFF signal with the time length different from the 8B10B code may be generated.

In the repeated signal of the output interruption and the link down pattern inputted to the transmission device 103B, the output interruption transmitted from the transmission device 103B to the transmission path 105h is converted to a reception fault notification packet to be transmitted to the opposing transmission device 103A. When the link down pattern is detected by the transmission device 103B, the transmission device 103B performs a link down control for downing the link between the terminal device 101B and transfers it as a link down notification packet to the opposing transmission device 103A. The transmission device 103 receiving the data interrupts the output while receiving the reception fault packet and, when receiving the link down notification packet, performs link down control for the terminal device 101A to be in the link down state. When the duplex switching device 102A receives these data, it returns the data to the transmission path side and transmits the same pattern to the A-port (line 105c).

The fault notification is sent to the fault generating point. The output to the C-port of the duplex switching device 102A is continuously interrupted thereby to notify that the line side cannot be used. The duplex switching device 102A and the duplex switching device 102B, when detecting a switching trigger (non-signal state) in the A-port, wait for a switching protection time. During this time, if the continuous interruption is detected, the devices move onto the switching processing. When there is no fault generated in the B-port to be switched to, the active system is switched to the B-port. When there is also a fault generated in the B-port to be switched to, the switching devices do not perform switching processing and keep selecting the A-port. Further, when there is a fault generated in both the A-port and B-port under the state where the B-port is selected, the switching devices select the A-port thereby to avoid the state in which both stations select the different systems when the fault is restored. The unselection system, in the duplex switching device 102A and the duplex switching device 102B, returns the input on the transmission path side (A-port or B-port) to the output on the transmission side so that the transmission device on the side connected to the terminal device becomes a return connection. The transmission device performs link up control for the device itself so as to establish the link. The transmission device in which the standby system is selected operates by performing link up for the device itself as long as there is no fault generated in the transmission path. The standby system waits in such a state so that it is possible to execute the switching after confirming whether or not the standby system line is normal between the duplex switching device 102A and the duplex switching device 102B before switching the active system.

The operation of the system has been described heretofore by referring to FIG. 3. Next, the switching operation of the duplex switching device 102A and the duplex switching device 102B will be described in detail by referring to FIG. 2.

When the duplex switching device 102 detects a fault in the A-port 126f, data inputted via the input terminating part 124f is judged in the fault detection circuit if there is a non-signal state. The judgment is performed through monitoring the state of the fault detection circuit 121f in the switching control circuit 160 inside the duplex switching devices 102 (102A, 102B). If the signal is interrupted, the switching control circuit 160 outputs an instruction to the output control circuit 123f to interrupt the output periodically and, at the same time, outputs the link down pattern generated inside the output control circuit 123f. At the same time, the switching control circuit 160 outputs an instruction to the output control circuit 132h of the C-port to interrupt the output.

After detecting the fault in the switching control circuit 160, the fault state is monitored until a certain switching protection time has passed. When the fault is continued even after the switching protection time has passed, the switching control circuit 160 outputs an instruction to the switch 150 thereby to switch to select the B-port. When the fault is discontinued after the switching protection time, switching is not executed.

Before the switching is executed, the output of the fault detection circuit 121g of the B-port is connected to the input of the output control circuit 123g thereby forming a loop back state. When the switching is executed, the fault detection circuit 121f of the A-port connected to the output control circuit 123h of the C-port and the fault detection circuit 121h of the C-port connected to the output control circuit 123f of the A-port are changed to be in such a form in which the fault detection circuit 121g of the B-port is connected to the output control circuit 123h of the C-port and the fault detection circuit 121h of the C-port is connected to the output control circuit 123g of the B-port.

On the other hand, on the A-port side, the output of the fault detection circuit 121*f* and the input of the output control circuit 123*f* are to be connected. When the B-port is in a normal state, there is no fault detected in the fault detection circuit 121*g* of the active system (B-port) so that the interruption of the output to the output control circuit 123*h* of the C-port is canceled. The switching control circuit 160 notifies the fault state and the selection system to the control terminal 127 connected thereto.

Further, if a forcible switching of the system is desired during the operation, the control terminal 127 outputs a switching instruction. For example, when forcibly switching the port to the A-port while the B-port is in operation, it operates as follows. A user inputs and designates the system to be forcibly switched to from the control terminal 127. At this time, it will be described by referring to a case where the user designates the A-port.

The switching control circuit 160, upon receiving the instruction from the control terminal 127, starts a processing so that the B-port interrupts the signal output. The processing is performed through outputting the instruction for interrupting the output to the output control circuit 123*g* of the B-port from the switching control circuit 160. By keeping the output interruption to the connected transmission device 103 for a certain time (for example, one second), the connected transmission device 103 judges that there is a generation of fault and performs the alarm transfer. The operation of the alarm transfer is performed by the same processing as that of the case where there is an actual fault generated on the line. The fault is detected on the B-port side by the opposing duplex switching device so that the switching is executed to the A-port side. At this time, the opposing duplex switching device also transfers the alarm to the duplex switching device side which generated a false fault. In the duplex switching device side receiving the alarm, the fault is also detected on the B-port side so that the switching processing to the A-port side is executed.

As described, when forcibly switching the system, it can be achieved through generating a false fault by outputting the instruction for interrupting the output to the output control circuit to be switched from. Therefore, it is not necessary to provide an additional circuit.

At the time of the switching, if there is a fault generated in the port to be switched to, the processing itself for interrupting the signal output is not performed. Thereby, it is possible to avoid the state to be incommunicable after completing the switching operation, and the present communication state can be maintained. The fault state can be monitored in the control terminal 127 so that whereabouts the fault is generated can be detected in the control terminal 127.

When the power source is supplied to the duplex switching device 102, a processing of matching the selection system is performed through utilizing the processing of interrupting the output signal. The power source is supplied to each device so that the line switching systems according to the embodiment on both station are to be in operation. However, in general, each device is placed in different positions so that the order of supplying the power source to the devices cannot be defined.

In the invention, it provides with such a system that both stations start to operate by selecting the same system in such a case. The duplex switching device 102, after the power source is supplied, performs the setting within the device so as to be in the state for operation. At this time, if it is operated by interrupting the signal output to the standby side (B-port side) and keeps the signal output only to the present side (A-port) for a prescribed time (for example, one second) even after the device itself can be in an operable state, it selects the present side (A-port) to be in operation when there is no fault in the present-side line (A-port). In this circuit, it only needs to control the interruption of the output signal to the standby side (B-port side) for a long time so that it can be achieved using the output control circuit 123*g* of the B-port shown in FIG. 2, which is used in the normal switching operation. The switching control circuit 160 manages the control of interrupting the signal output interruption through monitoring the supply to the power source.

Further, the case of a fault generated in the line 105*g* shown in FIG. 5 shows the alarm transfer when there is a fault generated in the transmission path (the line 105*g*) between the transmission device 103A and the transmission device 103B. At this time, the alarm transfer data at each point is shown as transmission data (a fault between the transmission device 103A and the transmission device 103B) at the time of alarm transfer in FIG. 10. In the case of a fault generated in the line 105*g* shown in FIG. 5, the same operation as the case described above by referring to FIG. 3 is performed in regards to the alarm transfer except that the generating point is different. The alarm is transferred to the section from the duplex switching device 102A to the output point 105*g* of the transmission device 103A shown in FIG. 5 through periodically outputting the output interruption and the link down pattern.

Also, the case of a fault generated in the line 105*m* shown in FIG. 6 shows the alarm transfer when there is a fault generated in between the transmission device 103B and the duplex switching device 102B. At this time, the alarm transfer data at each point is shown as transmission data (a fault between the transmission device 103B and the duplex switching device 102B) at the time of alarm transfer in FIG. 11. In the case of a fault generated in the line 105*m* shown in FIG. 6, the same operation as the case described above by referring to FIG. 3 is performed in regards to the alarm transfer except that the generating point is different. The alarm is transferred to the section from the duplex switching device 102A to the output point 105*m* of the transmission device 103B shown in FIG. 6 through periodically outputting the output interruption and the link down pattern.

The case of a fault generated in the line 105*m* shown in FIG. 6 shows the case where there is a fault generated in the non-duplex section between the terminal device 101A and the duplex switching device 102A. In this case, the link down pattern is generated in the duplex switching device 102A thereby to down the link of the terminal device 101B on the opposing side so as to inform that the line is not available.

In other words, the notification shown by double chain lines in FIG. 7 represents the notification route under the link down state. The duplex switching device 102A can detect the fault by the input interruption. Thus, when detecting the fault, it outputs the link down pattern to the line 105*c*. The transmission device 103A, upon receiving the link down pattern, performs the link down control thereby to down the link between with the terminal device 101A. The transmission device 103A, when the link is down, transfers the link down notification packet to the transmission device 103B on the opposing station in order to notify the link down state. The transmission device 103B, upon receiving the link down notification packet, downs the link between the terminal device 101B and notifies the link down state to the transmission device 103A on the opposing side via the line 105*h*.

At this time, the link between the transmission device 103A has been already down so that the device maintains the link down state.

In this state, the line switching is not performed since the fault cannot be restored to be communicable even though the line is switched to the other system (the other line).

The case of a fault generated in the line 105b shown in FIG. 8 shows the case where there is a fault generated in the non-duplex section between the terminal device 101A and the duplex switching device 102A as in the case shown in FIG. 7. At this time, in the method in which the terminal device 101A interrupts the output thereby to down the link, as in the case shown in FIG. 7, the link down patter is generated in the duplex switching device 102A thereby to down the link of the terminal device 101B on the opposing side so as to inform that the line is not available.

In other words, the notification shown by double chain lines in FIG. 8 represents the notification route under the link downstate. When the terminal device 101A downs the link between with the transmission device 103A through performing the link down control, the input signal of the duplex switching device is not interrupted. Thus, it cannot judge the generation of fault so that the link down pattern cannot be transmitted. The terminal device 101A performs the link down control between with the transmission device 103A so that the link is to be down, thereby achieving the same state as that of the case where the terminal device 101A interrupts the output. Further, transfer of the link down state from the transmission device 103A to the transmission device 103B is performed by the same method as that shown in FIG. 7.

In this state, the line switching is not performed since the fault cannot be restored to be communicable even though the line is switched to the other system. At the time of a fault being generated on the input side of the terminal device 101A, when the terminal device 101A interrupts the output, the operation of the system is the same as that of the case shown in FIG. 7 except that the fault generating point is different from the case shown in FIG. 7. At the time of fault in this example, two types of operations are possible depending on the operation of the terminal device 101A.

As described, with the line switching system according to the embodiment, at the time of switching the duplex lines in the duplex-line structure, the generation of fault in the transmission path is notified to the duplex switching device by interrupting the signal thereby to trigger the switching of the line. Therefore, it is applicable to a system with no switching protocol. For example, it can be applied to Ethernet® devices which perform transfer using the Ethernet frame.

The line switching method of the embodiment using the non-signal state as a trigger for switching can be achieved through simply adding a duplex switching device, which performs the duplex switching of the line, in between the terminal device and the transmission device, as long as the transmission device provided in the transmission path has a function of transferring the fault state to the opposing transmission device when a fault is generated and a function of interrupting the signal output to the terminal side. At this time, in the duplex switching device, switching can be performed upon detecting the non-signal state as a switching trigger without terminating the protocol in the interface between the terminal device and the transmission device. Therefore, the duplex switching device itself can be achieved at a relatively low cost.

In the present invention, the fault is continuously transmitted as it is in the state of generation of fault from the fault generating point to the duplex switching device in the data transmission direction. However, when the duplex switching device transmits the generation of fault to the opposing duplex switching device upon detecting the fault, it is transmitted periodically. Therefore, even the alarm transfer forms a loop shape with the fault generating point as the starting point, it can avoid an endless loop in which the alarm is still transferred even after the fault is restored.

Also, the duplex switching device has a function of selecting the A-port side at all times when there is a fault generated in both of the duplex lines. Thus, when restoring from the double faults, arbitrary selection of the system by both stations can be avoided thereby preventing the inconsistent system selection.

If there is no such function, the duplex switching devices on both stations select the different systems when there are faults generated in both of the duplex lines. Therefore, when the faults are restored simultaneously, the devices maintained to be in the state to keep selecting the different systems. In the present invention, the duplex switching device is to operate so as to select the A-port side at all times in the case where faults are generated in both of the lines and the case where the fault in the A-port side is restored. Thereby, at the time of the faults in both lines, the duplex switching devices in both stations are to select the A-port side, thereby avoiding the inconsistent selection of the systems when the fault is restored simultaneously.

Also, at the time of supplying the power source to the duplex switching device, interruption of the output is continued to the standby line side (B-port side) of the duplex switching device for a longer time than to the present line side (A-port side) thereby to complete the initial booting of the device. Therefore, as long as there is no fault generated in the present line side (A-port side), the device starts the operation by selecting the present line side (A-port side). Thereby, it is possible to avoid the state where the duplex switching devices in both stations select the different systems when the power source is supplied thereby to prevent the state where the devices cannot break away from the state.

When a forcible switching to the designated selection system is desired while in operation, it is achieved through interrupting the output by the output control circuit of the duplex switching device on the side to which the line is switched (B-port side if the designated port is A-port, and A-port if the designated port is B-port). In this case, the output control circuit of the duplex switching device can use the circuit for the regular switching operation. Therefore, it can be achieved by simply adding the control from the switching control circuit which has received the control signal from the control terminal. Thus, the forcible switching can be achieved by adding a relatively small-scaled circuit without providing hardware exclusively for forcible switching.

Also, when performing a forcible switching, it is executed only when there is no fault generated after checking the state of the line to be switched to. Thus, it can avoid to be in the incommunicable state due to the forcible switching.

Further, there may be cases where, when building the network, a transmission system with no standby line is initially build and the network is expanded through adding the standby system lines when the reliability is required. It can be also achieved in this case through inserting the switching device between the transmission device and the terminal and additional devices can be flexibly provided.

As described, in the conventional case, when the non-signal state is simply transferred as the alarm, the selection of the system selected by both stations are to be inconsistent depending on the state of the devices. In this state, if there becomes a state with no fault on the line, the devices cannot break away from the inconsistent. When performing the alarm transfer in the full duplex communication system, the device, upon detecting the reception fault, notifies the fault to the opposing station through the transmission side line. In this method, notification of the fault starts from the fault generating point, returns between the communication routs on both sides and continues until reaching the fault generating point. In other words, the alarm is transferred in a loop state with the fault generating point as the starting point. If the alarm transfer is continued at all times, the devices cannot break away from the loop state of the alarm transfer when the fault is restored. Therefore, it faces a problem that the fault cannot be restored.

The line switching system according to the embodiment does not face such problems even used in a system in which communication is performed using a protocol without the function of switching the line. Therefore, a highly reliable line switching can be achieved by a fast and reliable operation.

Next, a line switching system according to another embodiment of the present invention will be described by referring to FIG. 12 and FIG. 13.

In this embodiment, a plurality of pairs of terminal devices for performing communication are provided, unlike the above-described embodiment having a pair of the devices.

Figure 12:
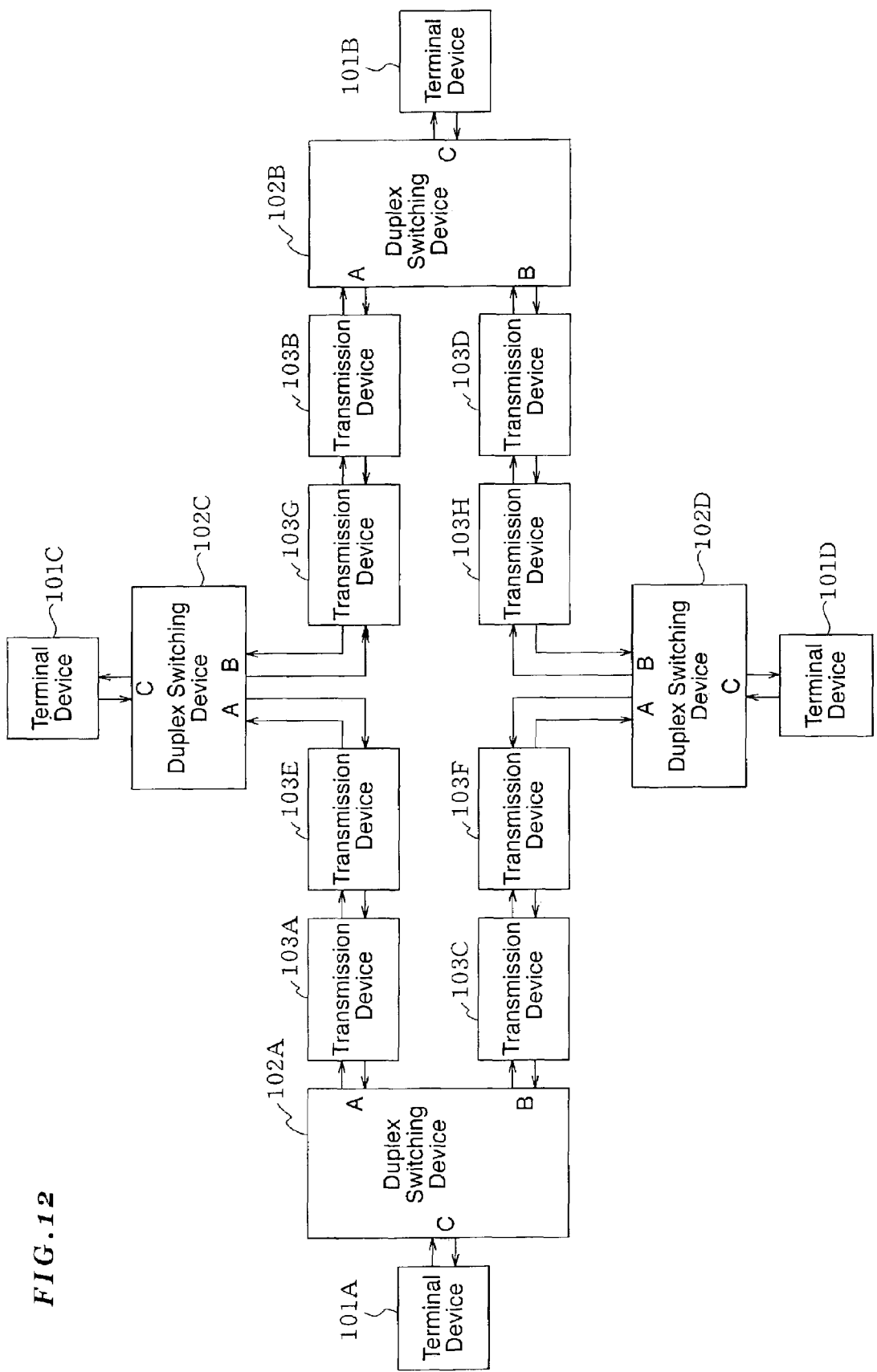
FIG. 12 is a block diagram showing an example of the configuration of a line switching system according to another embodiment of the present invention.

The line switching system according to the present embodiment, as shown in FIG. 12, comprises: terminal devices 101 (101A, 101B, 101C, 101D), duplex switching devices 102 (102A, 102B, 102C, and 102D) and transmission devices 103 (103A, 103B, 103C~103H). One of the terminal devices 101 is connected to the duplex switching devices 102, respectively, and the duplex switching devices 102 are connected to other duplex switching devices via the present system line and the standby system line to which one of the transmission devices 103 is provided, respectively.

Each of the terminal devices 101 (101A, 101B, 101C, 101D) shown in FIG. 12 may be the same as the terminal device 101A and the terminal device 101B of the above-described embodiment shown in FIG. 1. Also, each of the duplex switching devices 102 (102A, 102B, 102C, 102D) shown in FIG. 12 may be the same as the duplex switching device 102A and the duplex switching device 102B of the above-described embodiment shown in FIG. 1. Further, each of the transmission devices 103 (103A, 103B, 103C~103H) shown in FIG. 12 may be the same as the transmission device 103A, the transmission device 103B, the transmission device 103C and the transmission device 103D of the above-described embodiment shown in FIG. 1.

Figure 2:
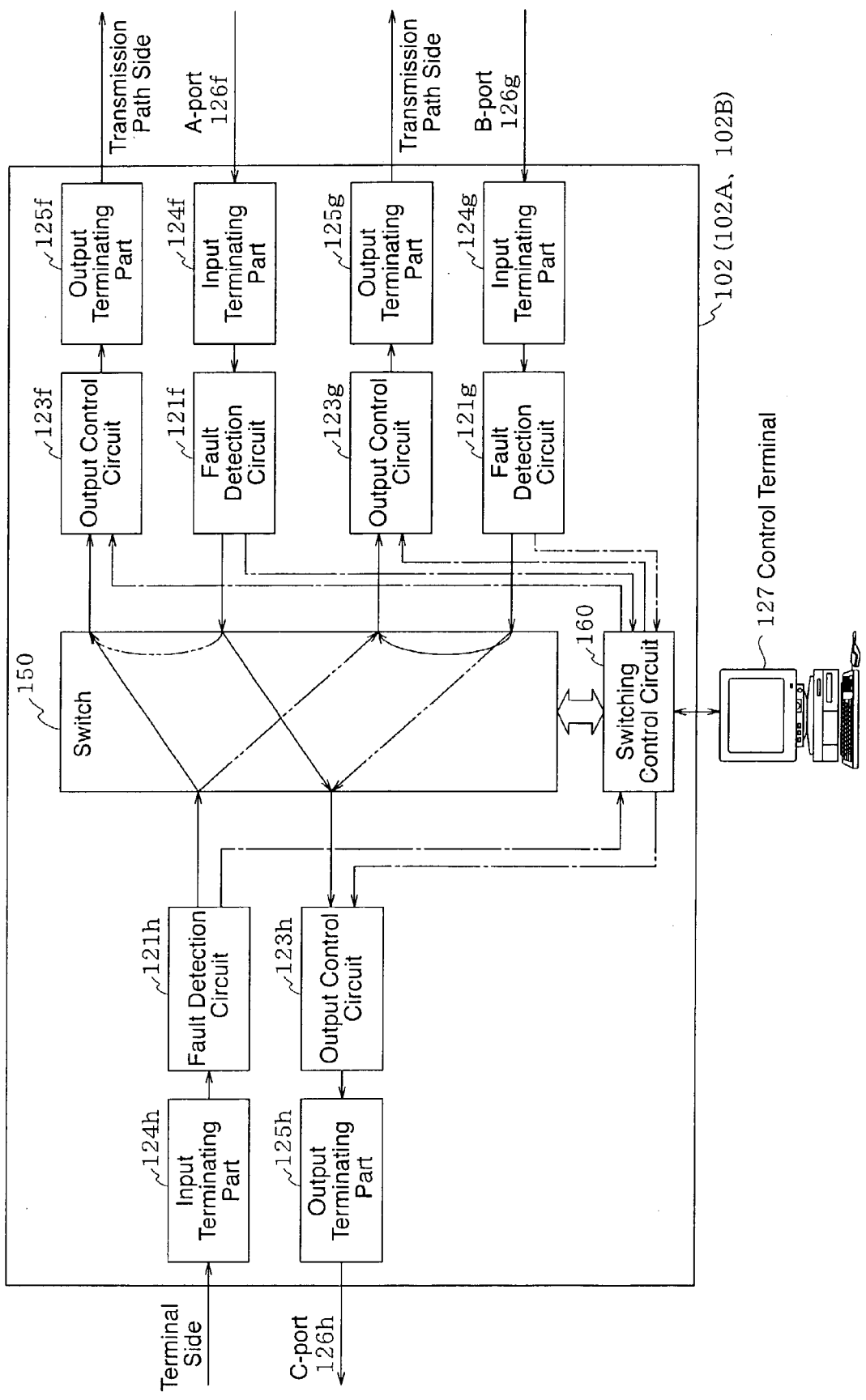
FIG. 2 is a block diagram showing an example of the configuration of a duplex switching device (a line switching device) of the line switching system.

Further, each of the duplex switching devices 102 (102A, 102B, 102C, 102D) shown in FIG. 12 has a configuration as described by referring to FIG. 2 and the control of the connection to each port is managed by the switching control circuit 160.

Figure 13A:
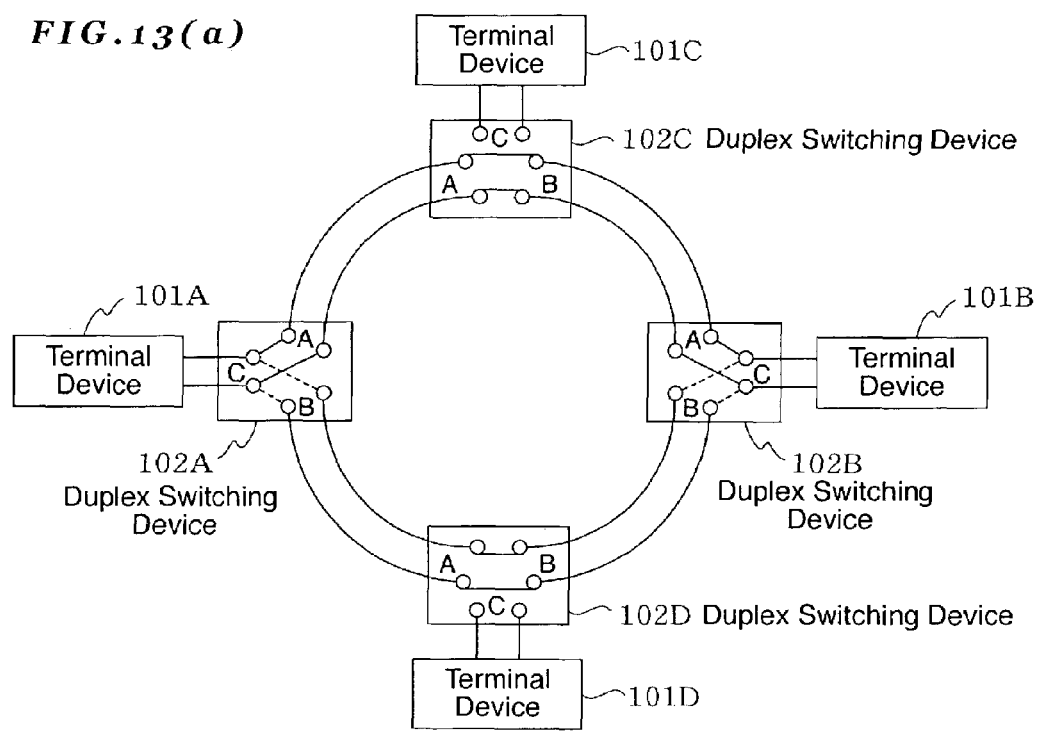
FIGS. 13(a) and 13(b) are illustrations showing the outline (an image) of the connection in a line switching operation of the line switching system shown in FIG. 12.
Figure 13B:
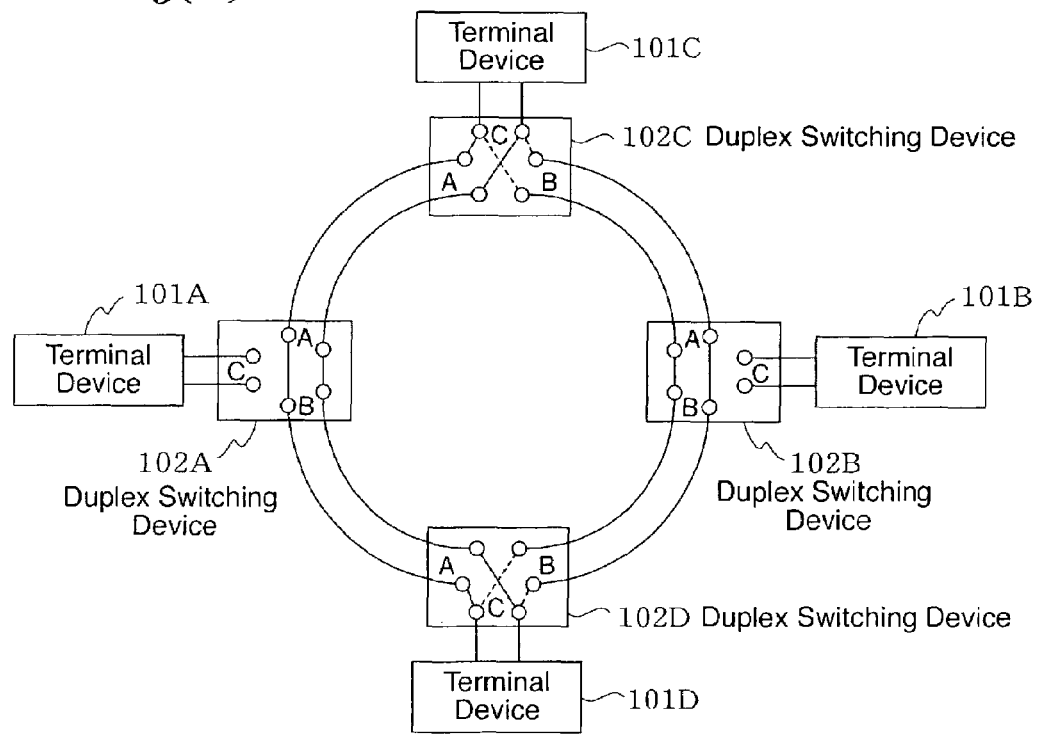

By changing the connecting condition and fixedly connecting the A-port and the B-port, it becomes possible to achieve the network with a structure connected in such a manner as shown in FIG. 13. FIG. 13(a) shows the state where the terminal device 101A and the terminal device 101B are connected to be capable of communication, and FIG. 13(b) shows the state where the terminal device 101C and the terminal device 101D are connected to be capable of communication.

When achieving the connection shown as in FIG. 13(a), in the condition between the duplex switching device 102C and the duplex switching device 102D are connected to the terminal device 101C and the terminal device 101D via the A-port and the B-port and the system switching operation is not performed. In this structure, it is possible to build a network with a structure in which the lines are duplicated between the terminal device 101A and the terminal device 101B. The operation in this case is the same as that of the above-described embodiment shown in FIG. 1.

Also, when achieving the connection shown as in FIG. 13(b), the duplex switching device 102A and the duplex switching device 102B are connected to the terminal device 101A and the terminal device 101B via the A-port and the B-port and the system switching operation is not performed. In this structure, it is possible to build a network with a structure in which the lines are duplicated between the terminal device 101C and the terminal device 101D. The operation in this case is also the same as that of the above-described embodiment shown in FIG. 1.

In the same manner, in the case where, the duplex switching device 102A and the duplex switching device 102D are connected to the terminal device 101A and the terminal device 101D via the A-port and the B-port, it is possible to build a network in which the line is duplicated between the terminal device 101B and the terminal device 101C. In the case where, the duplex switching device 102A and the duplex switching device 102C are connected to the terminal device 101A and the terminal device 101C via the A-port and the B-port are connected, it is possible to build a network in which the line is duplicated between the terminal device 101B and the terminal device 101D.

As described, it is possible to achieve a various network structure and duplicate the line through changing the connecting condition of the duplex switching devices 102.

Further, if the partner device (terminal device) to which transfer is performed changes as the time passes, the condition of the duplex switching device, in the structure according to the embodiment, can be changed as the time passes. In other words, a network can be built, which operates as scheduled by preparing an assigned schedule so that the network is to be built to perform communication between a terminal device and a prescribed another terminal device via the duplex lines at a prescribed time.

As described, with the line switching system according to the present embodiment, a system can be built in which one of the terminal devices is connected to the prescribed another terminal device via the lines duplicated to the present system line and the standby system line by the duplex switching device.

Each of the embodiments described above is a preferred embodiment of the present invention and various modifications are possible within the spirit and the broad scope of the appended claims of the invention. For example, the present system line and the standby system line according to each of the embodiments described above may not need to be fixedly decided but any of the line may be decided to be the standby system line.

Further, each of the embodiments described above has been described by referring to the case where one terminal device is connected to the duplex switching device. However, it is not limited to this but a plurality of the terminal devices may be connected. In the case with a plurality of the terminal devices, the line selected (switched) by the duplex switching device according to each embodiment described above is to be shared by a plurality of the terminal devices. Also, the transmission device capable of achieving a long-distance communication by the terminal device is to have a transmission capacity corresponding to the connected terminal devices (the number of lines to be corresponded).

Further, in each of the embodiments described above, the transmission devices are used. However, it is not required for a short-distance communication, and the duplex switching device and another duplex switching device may be directly connected via the present system line and the standby system line.

As described, the invention is a line switching system comprising a present line and a standby line formed to perform communication using a protocol without a function of switching the line. The line switching device comprises: the fault detection unit for detecting the generation of fault through checking whether or not a recognizable signal is detected from the line within a prescribed time; and the line switching unit for switching the line from the present line to the standby line which can be replaced with the present line so as to perform the communication between the terminal device and prescribed another terminal device therethrough, when the fault detection unit detects the generation of fault in the present line.

Thereby, in the system, communication is performed using a protocol without a function of switching the line. Thus, it is possible to promptly switch the line to the standby line when the recognizable signal is not detected from the present line within a prescribed time. Therefore, when there is a fault generated in the present line, a prompt line switching can be achieved without changing the basic protocol of the network with no requirement for adding an expensive hardware.

Also, the line switching unit switches the line after the switching protection time has passed from the time when the generation of fault is detected by the fault detection unit.

Thereby, it is possible to improve the reliability in the line switching when detecting the generation of fault.

Further, by the line switching method of the present invention, it is possible to achieve the same effect as that of the line switching system of the present invention described above.

In the above-described embodiments, the line switching system in multiplex communication and the method have been described. Next, a specific example of an optical transmission switching device used in multiplex communication will be described. The optical transmission switching device according to the present invention is a switching device for switching the transmission path to be used when there is a fault generated in any given transmission path in an optical transmission system comprising a plurality of transmission paths.

Figure 35:
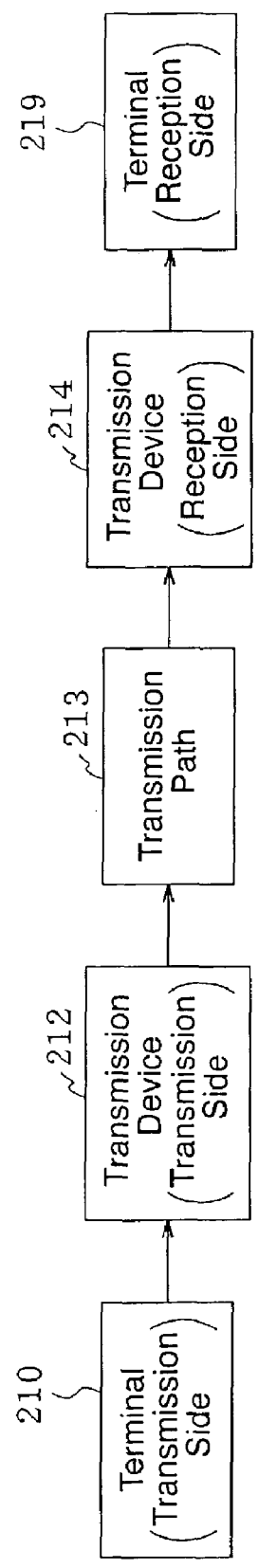
FIG. 35 is a block diagram showing the configuration of a conventional optical transmission system.

In order to define the distinctive feature of the optical transmission switching device according to the present invention, it will be described by making a comparison to a conventional case. Recently, an optical transmission system capable of transmitting a large amount of data at a high-speed has been widely used. The optical transmission system, as shown in FIG. 35, comprises a transmission-side terminal 210, a transmission-side transmission device 212, a transmission path 213, a reception-side transmission device 214 and a reception-side terminal 219.

The transmission-side terminal 210 has a function of generating data and transmitting the data. The transmission-side transmission device 212 is a transmission-side device for transmitting the data from the terminal 210 via the transmission path 213. The reception-side transmission device 214 processes data received from the transmission path 213. The reception-side terminal 219 receives the data from the transmission device 214.

With such optical transmission system, the data from the terminal 210 can be transmitted to the terminal 219. However, in the optical transmission system described above, data transmitted from the terminal 210 cannot reach the terminal 219 when there is a fault generated in any section between with the transmission device 212, the transmission path 213, and the transmission device 214. In order to avoid this, an optical transmission system has been proposed, which employs a duplex structure. In the system, a present system line and a standby system line are provided beforehand so that, when there is a fault generated in the present system line, the active system is switched to the standby system line thereby to avoid the communication difficulty.

Figure 36:
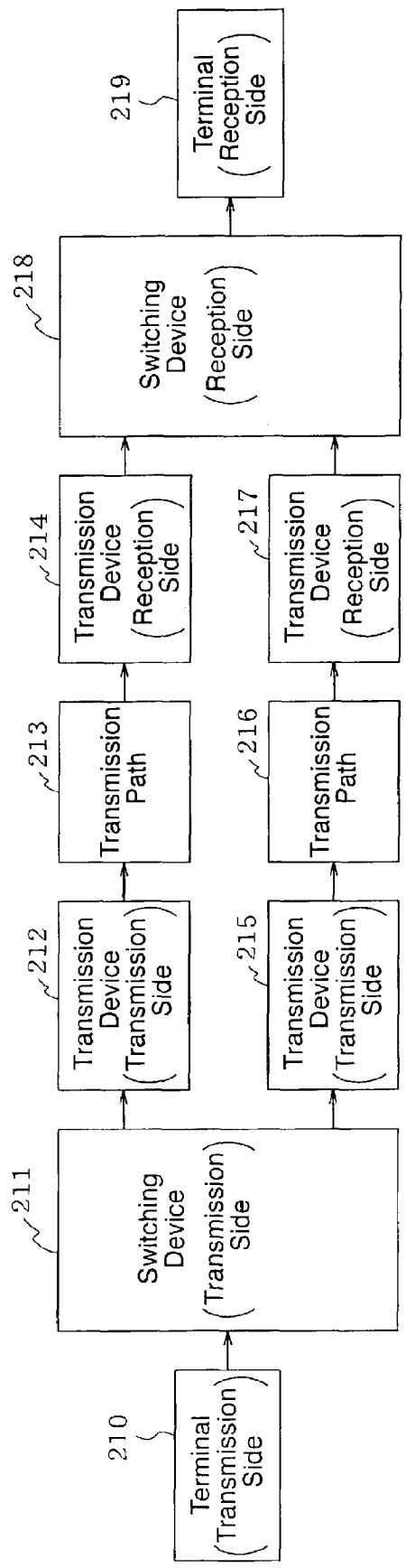
FIG. 36 is a block diagram showing a conventional optical transmission system in which a duplex structure is employed.

The optical transmission system with the duplex structure, as shown in FIG. 36, comprises a transmission-side switching device 211, transmission-side transmission devices 212, 215, transmission paths 213, 216, reception-side transmission devices 214, 217, a reception-side switching device 218, and a reception-side terminal 219.

In the optical transmission system with the duplex structure, two lines made of a line consisting of the transmission device 212, the transmission path 213, and the transmission device 214, and a line consisting of the transmission device 215, the transmission path 216 and the transmission device 217 are provided beforehand. Thereby, through switching the two lines by the switching device 211, it becomes possible to avoid communication difficulty even if there is a fault generated in either line.

The transmission device 215, the transmission path 216, and the transmission device 217 have the same structure and function as that of the transmission device 212, the transmission path 213, and the transmission device 214, respectively.

The switching device 211 branches data from the transmission-side terminal 210 into two and transmits the branched data to the transmission devices 212 and 215, respectively. The switching device 218 selects either the transmission device 214 or the transmission device 217 as the active system line. When the data from the selected line becomes invalid, the switching device 218 switches the active system to the other switching device and selects data from this transmission device and transmits it to the terminal 219.

Next, outline of the switching operation in the optical transmission system shown in FIG. 36 will be described by referring to the figure.

Data transmitted from the transmission-side terminal 210 is branched into two via the transmission-side switching device 211 and the same data are transmitted to both the present system line and the standby system line. The transmission device 212 transmits the data to the transmission device 214 via the transmission path 213 and the transmission device 215 transmits the data to the transmission device 217 via the transmission path 216. When there is a line fault generated in between the terminal 210 and the transmission device 212 or in between the terminal 210 and the transmission device 215, the transmission device 212 or the transmission device 215 transmits notification of the generated fault to the opposing device, the transmission device 214 or the transmission device 217 so as to notify that the line is not available. The transmission device 214 or the transmission device 217, upon receiving the notification, recognizes the generated fault and interrupts the output to the switching device 218.

The switching device 218, when judging that the input signal is interrupted, continues the data transmission through switching the active system to the side in which the signal is not interrupted. The switching device 218 does not perform switching unless the input of the present active system is interrupted. It is a role of the switching device 218 to transmit the data from the system selected as described to the reception-side terminal 219. The transmission path fault generated in the transmission device 212, in between the transmission device 215 and the transmission device 214, or the transmission device 217 is judged within the transmission device 214 or the transmission device 217. Then, the device notifies the fault to the switching device 218 by interrupting the output to the switching device 218 thereby to execute the switching.

In the optical transmission system as described, the output interface of the terminal 210 and the input interfaces of the transmission devices 212 and 215 are to coincide with each other to be connected, and the output interfaces of the transmission devices 214 and 217 and the input interface of the terminal device 219 are to be coincide with each other thereby to be connected. When the interfaces are determined, the interface of the switching device 211 and the terminal 219 to be provided in between the transmission devices 212, 215, and the interface of the switching device 218 provided in between the transmission devices 214, 217 are to be determined inevitably. That is, the interfaces of the switching devices 211 and 218 are determined depending on the interfaces of the transmission devices 212, 215, 214 and 217 to be used.

In recent years, there have been a various kinds of interfaces used as interfaces of devices, such as SDH (Synchronous Digital Hierarchy)/SONET (Synchronous Optical Network) interface, various kinds of Ethernet interfaces and the like. Thus, when the duplex structure as shown in FIG. 36 is used, it is necessary to provide a switching device depending on an interface whenever the device interface used therein is different.

For example, SDH/SONET OC48 interface is not compatible with the Gigabit Ethernet interface. Thus, it is necessary to develop and provide a switching device for the SDH/SONET OC48 interface when using the SDH/SONET OC48 interface, and necessary to develop a switching device for the Gigabit Ethernet interface when using the Gigabit Ethernet interface. Therefore, when the number of the types of interfaces used in the devices is increased, it becomes necessary to develop switching devices corresponding to the interfaces of various types, which is time-consuming.

It has been described by referring to the case of duplex structure with two lines in order to simplify the description. However, there faces the same problems in optical transmission system having a multiple structure with three or more lines.

Further, in an optical transmission system comprising a plurality of terminals and a plurality of transmission paths, in which each terminal selects a different transmission path, a cross-connecting device is used as a switching device for switching the connection between a plurality of lines. In such optical transmission system, it is necessary to design a corresponding cross-connecting device when the interfaces of the terminal and the transmission device vary.

An object of the present invention is to provide a switching device which can be used without being affected by the types of interfaces in the transmission device, the terminal and the like, which are to be connected.

In order to achieve the foregoing object, a switching device in the optical transmission system according to the present invention comprises: a replaceable optical module capable of performing photoelectric conversion or electric-optic conversion on inputted data; a CDR circuit being provided in correspondence with the data from the optical module for reproducing data and clock at a timing according to a set rate; and a device information judging circuit for judging device information of the optical module through reading out type information, that is, information about the types of interface of the optical module and a transmission code in the interface, and for setting the rate of the CDR circuit through discriminating the interface rate.

The present invention is provided with the replaceable optical module, the CDR circuit corresponding to multi-rate capable of setting the rate, and the device information judging circuit having a function of reading out the type of the interface of the optical module noted in the optical module and for setting the rate according to the type of the interface for the CDR circuit. Therefore, the type of the interface can be automatically recognized and the rate is set for the CDR circuit. Thereby, it becomes possible to correspond to various types of interfaces by simply changing the optical module. Therefore, the switching device can be used without being affected by the types of the interfaces of the transmission device, the terminal and the like, which are to be connected.

Also, another switching device in the optical transmission system according to the present invention comprises: a first replaceable optical module capable of performing photoelectric conversion on inputted data; a first CDR circuit for reproducing data and clock from the data from the first optical module at a timing according to a set rate; a first device information judging circuit for judging device information of the first optical module through reading out type information, that is, information about the types of interface of the first optical module and a transmission code in the interface, and for setting the rate of the first CDR circuit through discriminating the interface rate; a branching circuit for branching data which is waveform-shaped by the first CDR circuit into a plurality of systems; a plurality of second CDR circuits for reproducing, respectively, a plurality of data and clocks which are branched by the branching circuit at a timing according to a set rate; a plurality of replaceable second optical modules for performing electric-optic conversion on a plurality of data which are waveform-shaped by the second CDR circuits; and a plurality of second device information judging circuits for judging device information of a plurality of the second optical modules, respectively, through reading out type information, that is, information about the types of interface of a plurality of the second optical modules and a transmission code in the interface, respectively, and for setting the rate of a plurality of the second CDR circuits through discriminating the interface rate, respectively.

With the present invention, the switching device for branching a data to a plurality of system of data can be formed to have a structure which can correspond to various types of interfaces by simply changing the optical module. Therefore, the switching device can be used without being affected by the transmission device, the terminal and the like, which are to be connected.

Also, still another switching device in the optical transmission system according to the present invention comprises: a plurality of first replaceable optical module, which is performing photoelectric conversion on inputted data each other; a plurality of first CDR circuits for reproducing data and clock from a plurality of the first optical modules at a timing according to a set rate; a plurality of first device information judging circuits for judging device information of a plurality of the first optical modules, respectively, through reading out type information, that is, information about the types of interface of a plurality of the first optical modules and a transmission code in the interface, respectively, and for setting the rate of a plurality of the first CDR circuits through discriminating the interface rate, respectively; a selection circuit for selecting a system which can receive an effective data through recognizing presence of a plurality of systems of data which are waveform-shaped by a plurality of the first CDR circuits; a second CDR circuit for reproducing data and clock of the system selected by the selection circuit at a timing according to a set rate; a second optical module for performing electric-optic conversion on data which is waveform-shaped by the second CDR circuit; and a second device information judging circuit for judging device information of the second optical module through reading out type information, that is, information about the types of interface of the second optical module and a transmission code in the interface, and for setting the rate of the second CDR circuit through discriminating the interface rate, respectively.

With the present invention, the switching device for selecting one of the data out of a plurality of the data can be formed to have a structure which can correspond to various types of interfaces by simply changing the optical module. Therefore, the switching device can be used without being affected by the transmission device, the terminal and the like, which are to be connected.

Also, further another switching device in the optical transmission system according to the present invention comprises: a plurality of first replaceable optical modules capable of performing photoelectric conversion on inputted data; a plurality of first CDR circuits for reproducing data and clock from a plurality of the first optical modules at a timing according to a set rate; a plurality of first device information judging circuits for judging device information of a plurality of the first optical modules, respectively, through reading out type information, that is, information about the types of interface of a plurality of the first optical modules and a transmission code in the interface, respectively, and for setting the rate of a plurality of the first CDR circuits through discriminating the interface rate, respectively; a switching circuit for outputting data on a plurality of lines which are waveform-shaped by a plurality of first CDR circuits to a recipient determined based on the line setting set beforehand; a line setting circuit for performing line-switching on the switching circuit based on a setting from outside; a plurality of second CDR circuits for reproducing data and clocks on a plurality of lines outputted from the switching circuit at a timing according to a set rate; and a plurality of second device information judging circuits for judging device information of a plurality of the second optical modules, respectively, through reading out type information, that is, information about the types of interface of a plurality of the second optical modules and a transmission code in the interface, respectively, and for setting the rate of a plurality of the second CDR circuits through discriminating the interface rate, respectively.

With the present invention, the switching device which functions as a cross-connecting device for performing switching between a plurality of the lines can be formed to have a structure which can correspond to various types of interfaces by simply changing the optical module. Therefore, the switching device can be used without being affected by the transmission device, the terminal and the like, which are to be connected.

Figure 14:
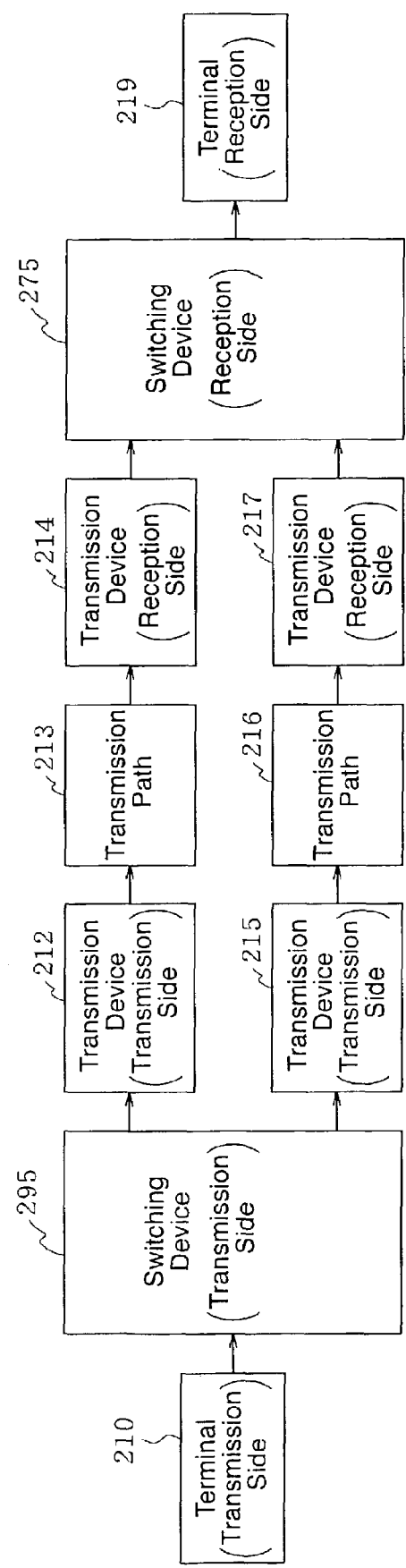
FIG. 14 is a block diagram showing the configuration of an optical transmission system according to the embodiment of the present invention.

Next, a specific example of the optical transmission switching device according to the present invention will be described in detail. The optical transmission system according to the embodiment, as shown in FIG. 14, is a system in which the present invention is applied to the optical transmission system employing a protection system as shown in FIG. 36.

The optical transmission system according to the embodiment comprises a terminal (transmission side) 210, a switching device (transmission side) 295, transmission devices (transmission side) 212, 215, transmission paths 213, 216, transmission devices (reception side) 214, 217, a switching device (reception side) 275, and a terminal (reception side) 219.

In the optical transmission system according to the embodiment, the switching device 211 on the transmission side and the switching device 218 on the reception side of the conventional optical transmission system shown in FIG. 36 are replaced with the switching device 295 and the switching device 275, respectively.

The switching device 295 has a function that it can be used without depending on the signal protocol and frame format of the terminal 210 and the transmission devices 212, 215, in addition to having the same function as the switching system 211 in the conventional optical transmission system shown in FIG. 36, which is to branch the data from the terminal device 210 on the transmission side into two and transmits the branched data to the transmission devices 212 and 215, respectively.

Further, the switching device 275 has a function that it can be used without depending on the signal protocol and frame format of the terminal 219 and the transmission devices 214, 217, in addition to having the same function as the switching system 218 in the conventional optical transmission system shown in FIG. 36, which is to select the data from either the transmission device 214 or the transmission device 217 to transmit the data to the terminal 219.

In the followings, the specific structure of the switching devices 295 and 275 will be described in detail by referring to FIG. 15 and FIG. 16.

Figure 15:
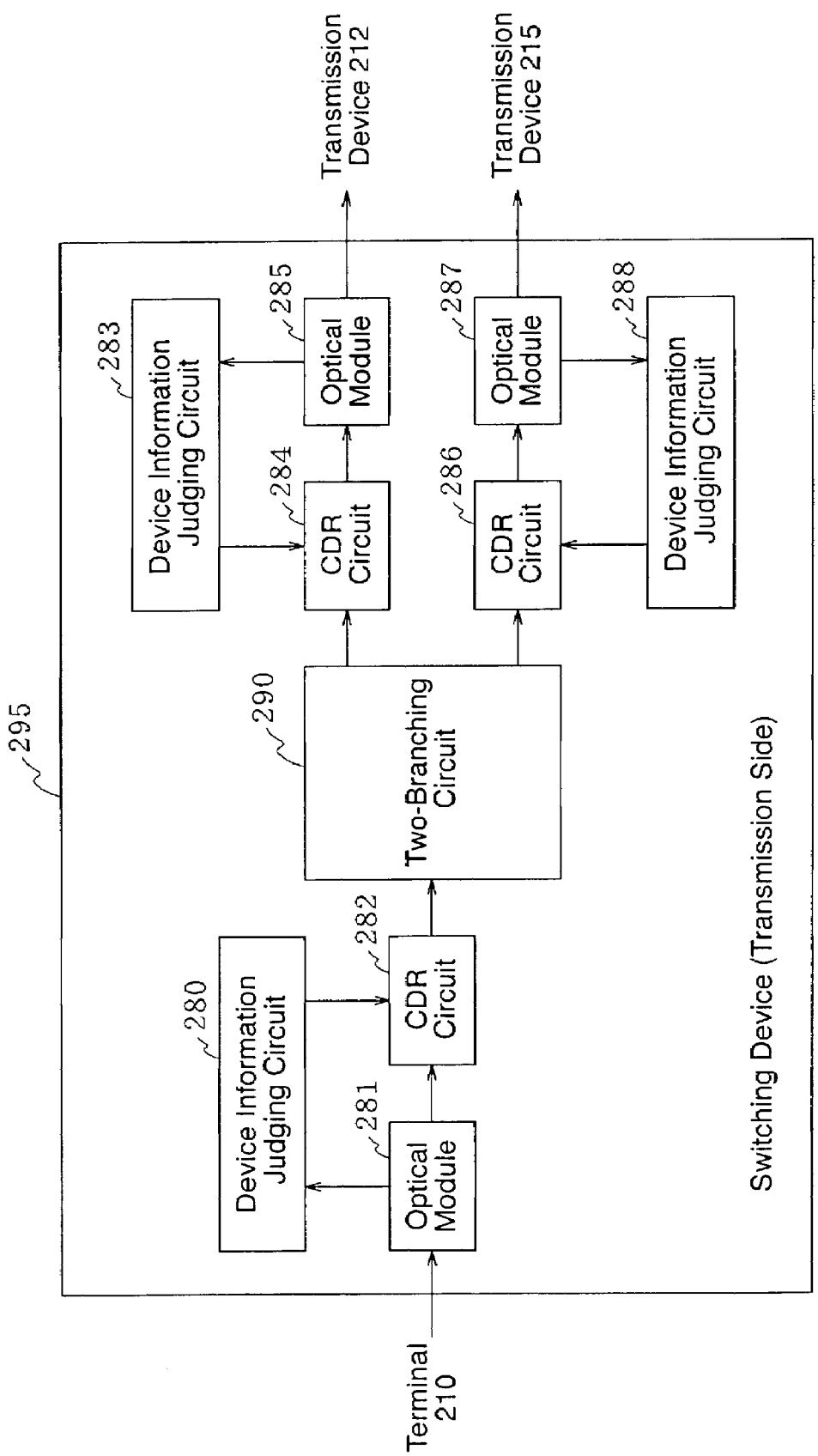
FIG. 15 is a block diagram showing the configuration of a multi-rate switching device (transmission side) shown in FIG. 14.

First, the switching device 295 corresponding to multi-rate shown in FIG. 14 comprises, as shown in FIG. 15, device information judging circuits 280, 283, 288, optical modules 281, 285, 287, CDR (Clock and Data Recovery) circuits 282, 284, 286 and a two-branching circuit 282.

The optical module 281 has a structure to be replaceable and performs photoelectric conversion to the data inputted from the terminal 210. The CDR circuit 282 is a CDR circuit corresponding to multi-rate capable of setting the rate, and is provided in correspondence with the data from the optical module for reproducing data clock at a timing according to the set rate. In other words, the CDR circuit 282 performs waveform-shaping when the terminal 210 and the switching device 295 are distant from each other.

The device information judging circuit 280 reads out the type information of the optical module 281 from a register present in the optical module 281, judges the device information of the optical module 281, recognizes the interface rate and sets the rate for the CDR circuit 282 through recovering clock from the data and performing waveform shaping. At this time, the type information of the optical module consists of interface type and the information on the transmission code.

The two-branching device 290 branches the data waveform-shaped by the CDR circuit into two systems of a present system and a standby system. The CDR circuits 284 and 286 have the same function as that of the CDR circuit 282, and reproduce the data and clock of the two systems, respectively, which are branched by the two-branching device 290 at a timing according to the rate set by the device information judging circuits 283 and 288.

The optical module 285 performs electric-optic conversion to the data waveform-shaped by the CDR circuit 284 and then outputs it to the transmission device 212. The optical module 287 performs electric-optic conversion to the data waveform-shaped by the CDR circuit 286 and then outputs it to the transmission device 215.

The device information judging circuit 288 reads out the type information of the optical module 287 from a register present in the optical module 287, judges the device information of the optical module 287, recognizes the interface rate and sets the recognized interface rate for the CDR circuit 286 through recovering clock from the data and performing waveform-shaping. The device information judging circuit 283 reads out the type information of the optical module 285 from a register present in the optical module 285, judges the device information of the optical module 285, recognizes the interface rate and sets the rate for the CDR circuit 284 through recovering clock from the data and performs waveform-shaping.

The optical modules 281, 285, and 287 used in the system are the ones that are replaceable by each module, and are connected to the devices through a common connector. Examples of such modules are SFP (Small Form Factor Pluggable) optical module and GBIC (Gigabit Interface Connector) optical modules. It is on condition that these optical modules are used in the system. In the register present inside the optical modules 281, 285, and 287, type information consisting of the interface type and notification on the transmission code of the interface is stored.

As shown in FIG. 15, the CDR circuits 284 and 285 are also mounted on the output side so that the transmission path error by deterioration of waveform can be reduced through transmitting data after performing waveform-shaping when the switching device 211 and the transmission devices 212 and 215 shown in FIG. 14 are distant from each other.

Figure 16:
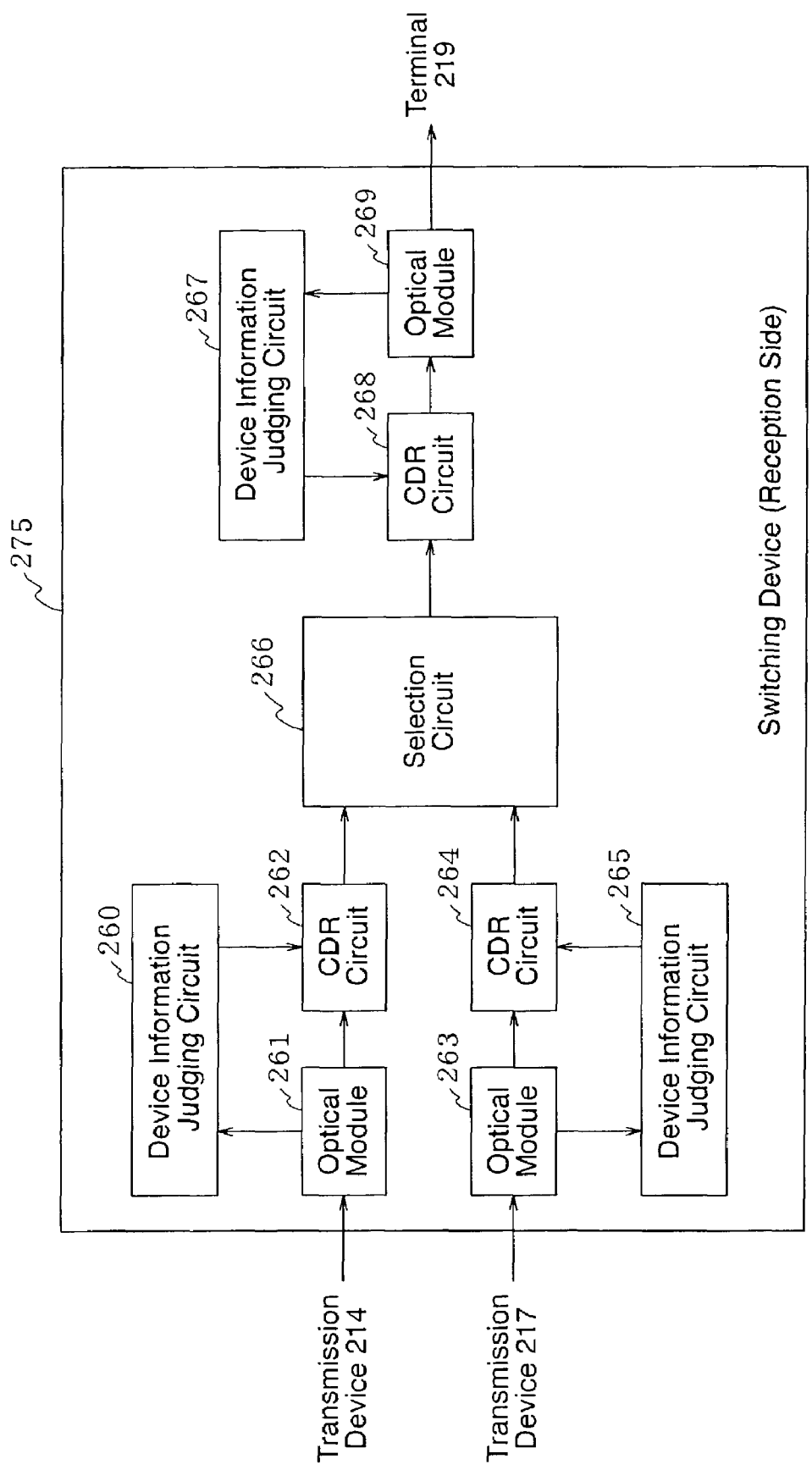
FIG. 16 is a block diagram showing the configuration of a multi-rate switching device (reception side) shown in FIG. 14.

Next, the switching device 275 on the reception side, as shown in FIG. 16, comprises device information judging circuits 260, 265, 267, optical modules 261, 263, 269, CDR circuits 262, 264, 268 and a selection circuit 266.

The optical modules 261 and 263 perform photoelectric conversion to the data inputted from the transmission devices 214 and 217, respectively. The device information judging circuits 260 and 265 read out the type information of the optical modules 261 and 263 from the register present in the optical modules 261 and 263, recognize the device information of the optical modules 261 and 263, recognizes the interface rate, and set the rate for the CDR circuits 262 and 264, respectively. The CDR circuits 284 and 286 reproduce the data and clock from the optical modules 261 and 263, respectively, at a timing according to the rate set by the device information judging circuits 260 and 267.

The selection circuit 266 judges the presence of data in two systems, which are waveform-shaped by the CDR circuits 262 and 264, and selects the system from which valid data can be received. The CDR circuit 268 reproduces the data and clock of the system selected by the selection circuit 266 at a timing according to the rate set by the device information judging circuit 267.

The optical module 269 performs electric-optic conversion to the data waveform-shaped by the CDR circuit 268 and outputs it to the terminal 219. The device information judging circuit 267 reads out the type information of the optical module 269 from the register present in the optical module, recognizes the device information of the optical module 269, recognizes the interface rate and sets the rate for the CDR circuit 268.

Next, operation of the optical transmission system according to the embodiment will be described in detail by referring to the drawings.

In the optical transmission system according to the embodiment shown in FIG. 14, only the operation of the switching devices 295 and 275 is different from that in the conventional optical transmission system shown in FIG. 36. Therefore, in the description provided below, the operation of the switching devices 295 and 275 will be described.

First, operation of the switching device 295 will be described in detail by referring to FIG. 15. In the switching device 295, the data inputted from the terminal 210 is received in the optical module 281. The state of mounting the optical module 281 and the type information of the mounted optical module 281 are monitored by the device information judging circuit 280 at all times and, when the optical module 281 is being replaced, the reception side is aligned through changing the set rate value for the CDR circuit 282. As the method for setting the rate for the CDR circuit 282, the device information judging circuit 280 maybe provided with a function of setting the rate by hardware or software. It is possible to select a setting method using hardware in which the type of the optical module 281 is recognized and, when there is a change in the module, changes the setting, or to select a method using software in which an operator sets the rate from the control terminal. In the description of the device information judging circuits 280, 283, 288, 260, 265 and the like provided below, it is provided on condition that each device information judging circuit is provided with this function.

Figure 17:
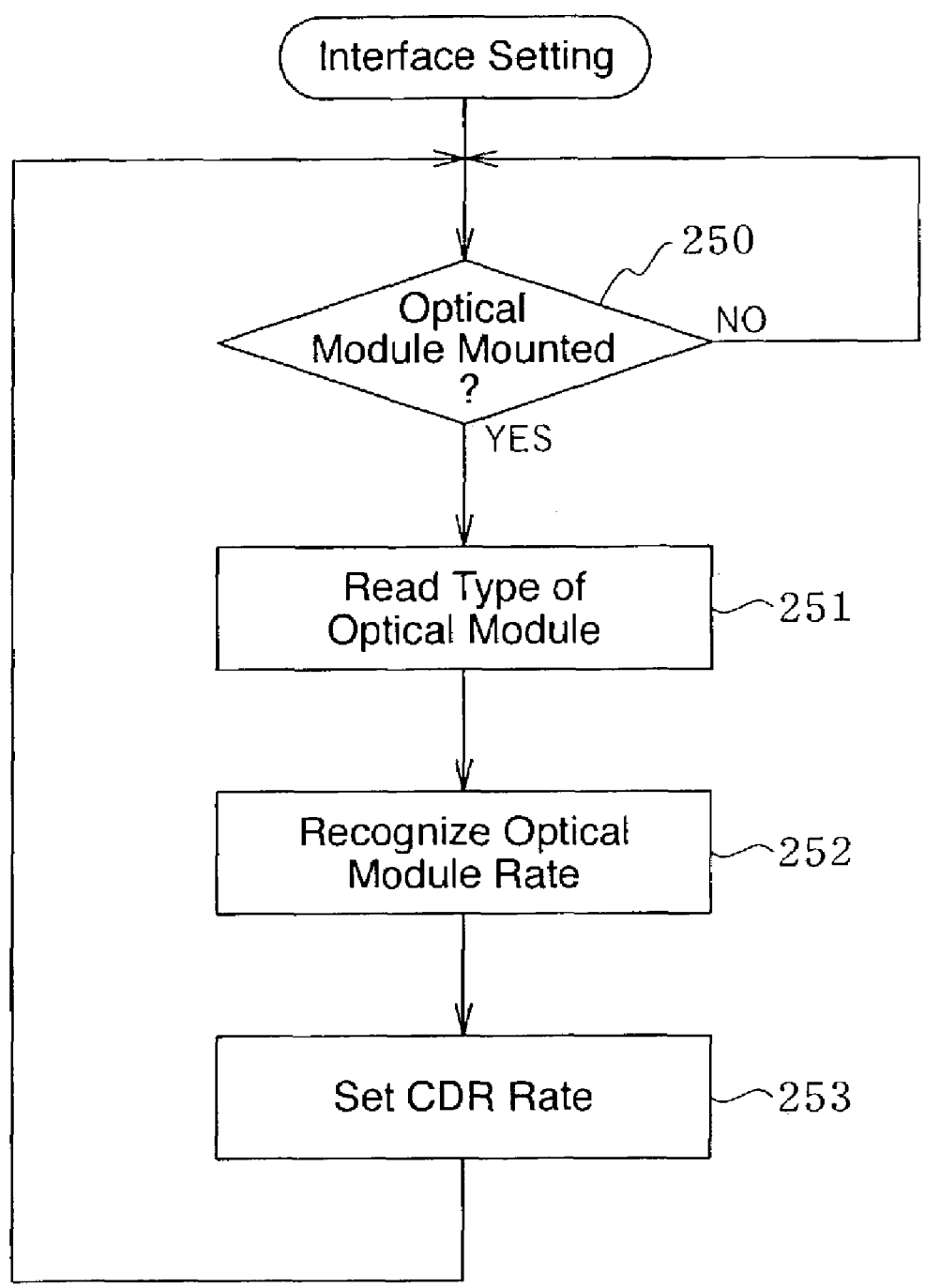
FIG. 17 is a flowchart showing a method for setting the rate of interface.

The process of the interface rate setting method will be shown in the flowchart in FIG. 17. First, the device information judging circuit judges whether or not the optical module is mounted (step 250). When no module is mounted, the device does not set the rate and monitors the mounting notification until a module is mounted. When it is judged in the step 250 that a module is mounted, the device information judging circuit reads out information inside the optical module (step 252) and judges the device information using a prescribed table. For example, if the optical module is SFP, the type and the rate of the interface are recognized (step 252) by referring to the address 4 h to Bh (h: denotes hexadecimal) of the inside register using the table as shown in FIG. 18. For example, when data of the addresses 4 h, 5, 7 h to Ah are 0 h and data of 6 h is 1 h, it means 1000 BASE-SX interface of Gigabit Ethernet, which is the interface having a transmission capacity of 1G bit/sec.

Further, transmission codes of the interfaces can be identified through referring to the address Bh as they are shown in the table showing the SFP transmission code type in FIG. 19. For example, if 01 h is read out, the SFP transmission code is identified as 8B10B, the rate of the interface is identified as 10/8 times the transmission capacity thereby to be 1.25 G bit/sec. When the rate of the interface is identified, the setting of the rate for the CDR circuit 282 is performed.

The signal waveform-shaped by the CDR circuit 282 shown in FIG. 15 is then branched into the signals for the present system line and the standby system line by the two-branching circuit 282. The signals are then inputted to the CDR circuits 284 and 286. As for the optical modules 285 and 287 mounted on the output side, as in the same manner as that of the input side, the type information of the mounted optical modules is read out by the device information judging circuits 283 and 288 and rate setting for the CDR circuits 284 and 286 is performed. Basically, the interfaces on the input side and the output side are the same. Thus, unless it has a duplex structure, the terminal 210 and the transmission device 212 shown in FIG. 14 are directly connected so that the input/output rate and the interface condition coincide with each other.

The data outputted from the optical modules 285 and 287 shown in FIG. 15 are outputted to the transmission devices 212 and 215 shown in FIG. 14 and then are transmitted to the transmission devices 214 and 217 via the transmission path 213 and the transmission path 216. The operation of the transfer method of the fault is as same as that of the method described by referring to FIG. 36. The fault in the transmission path is detected when the signal to the switching device 275 is interrupted and the line is switched to the system in which no fault is generated.

Next, operation of the switching device 275 will be described in detail by referring to FIG. 16. In the switching device 275, the data inputted from the transmission devices 214 and 217 shown in FIG. 14 are received in the optical modules 261 and 263. The device information judging circuits 260 and 265 read out the type information of the optical modules 261 and 263 and set the rate for the CDR circuits 262 and 264. The selection circuit 266 monitors the loss of the input signal and, when the input signal of the system selected at present is interrupted, switch the line to the other system. For example, if the system selected at present is the input from the CDR circuit 262, the device monitors the reception state of the signal on the CDR circuit 264 side. When the input signal is not interrupted, the device switch the selection system to the CDR circuit 262 side.

The signal selected by the selection circuit 266 is inputted to the CDR circuit 268, then is waveform-shaped and outputted to the optical module 269. The device information judging circuit 267 reads out the type information of the optical module 269 and sets the rate for the CDR circuit 268. The CDR circuits 262 and 264 are provided so as to reduce the transmission path error due to deterioration of the waveform by waveform-shaping when the transmission devices 214 and 217 shown in FIG. 14 are distant form each other. Also, the CDR circuit 268 is provided so as to reduce the transmission path error due to deterioration of the waveform by waveform-shaping when the switching device 275 and the terminal 219 are distant form each other.

In the switching devices 295 and 275 in the optical transmission system according to the embodiment, the optical modules 281, 285, 287, 261, 263, and 269 have a structure to be replaceable. Therefore, it is possible to select and mount the one to coincide with the each interface of the device to be connected. The device information judging circuits 280, 283, 288, 260, 265 and 267 provided in the switching devices 295 and 275 judges the types of the mounted optical modules, respectively, and recognize the interface rate thereby to automatically perform setting of the rate for the CDR circuits 282, 285, 287, 262, 264 and 268. Therefore, in the switching devices 295 and 275 according to the embodiment, only the optical module part is being replaced to coincide with each interface so that it becomes unnecessary to design a switching device specifically for the device interface. In other words, as for developing the device, it can achieve a system in which one kind of the device is developed and decide the interface according to the optical module to be mounted on the interface part of the device.

Next, another optical transmission system according to the embodiment of the present invention will be described by referring to FIG. 20. The difference between the embodiment shown in FIG. 14 and the embodiment shown in FIG. 20 is that one device is provided on the terminal side and two systems are provided on the transmission path side in the former whereas, in the latter, a plurality of terminals (two terminals in this case) are provided through performing cross connection by a switching device thereby to correspond to a network in which the transmission path differs by every terminal.

Figure 20:
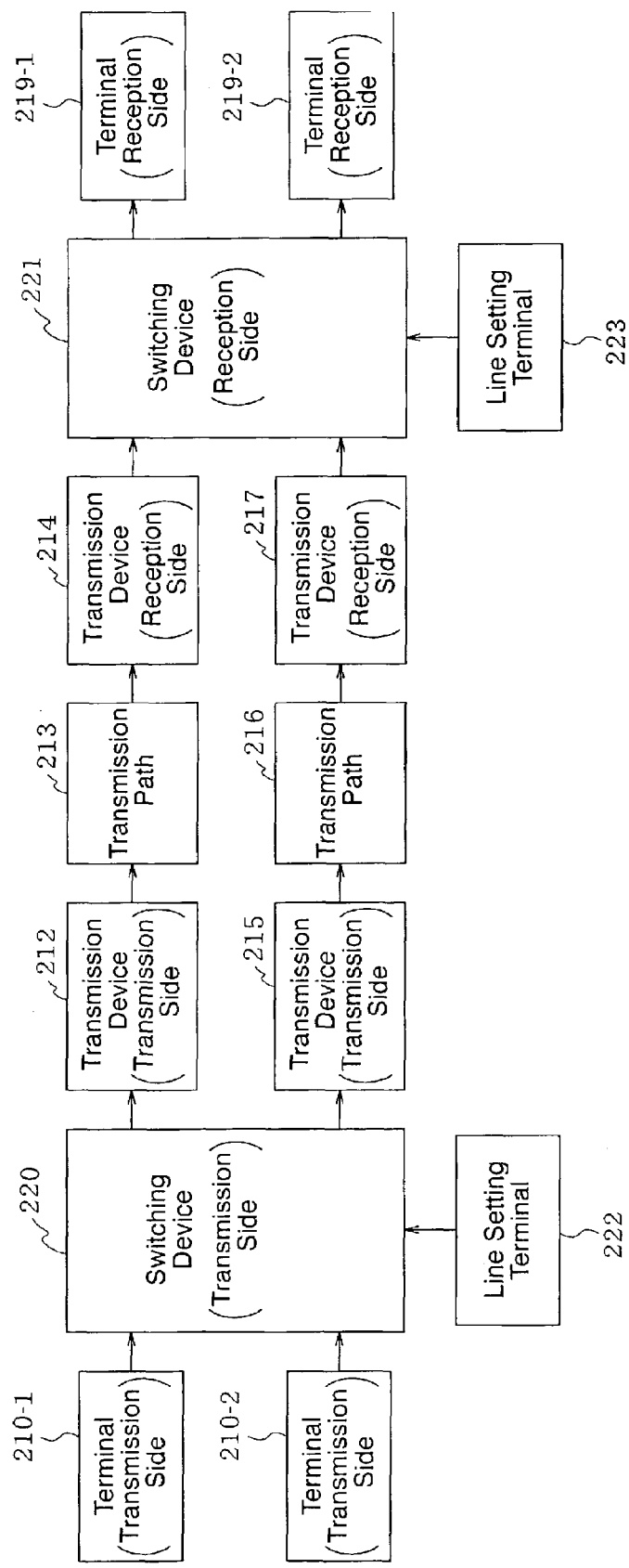
FIG. 20 is a block diagram showing the configuration of another optical transmission system according to the embodiment of the present invention.

The optical transmission system according to the embodiment as shown in FIG. 20 comprises two transmission-side terminals 210-1, 210-2, a transmission side switching device 220, transmission-side transmission devices 212, 215, transmission oaths 213, 216, two reception-side transmission devices 214, 217, reception-side switching device 221, two reception-side terminals 219-1, 219-2, and line setting terminals 222, 223.

Two terminals, the terminal 210-1 and the terminal 210-2 are connected to the switching device 220 on the transmission side. The line setting terminal 222 for setting which transmission path to be used for connecting the terminal is connected to the switching device 220. The line connection on the transmission side is set by the line setting terminal 220. The transmission device 212 and the transmission device 215 are connected to the transmission side of the switching device 220 and data is transmitted to the transmission device 214 and the transmission device 217 via the transmission path 213 and the transmission path 216. A switching device 221 is connected to the output side of the transmission devices 214 and 217. The switching device 221 has a function of transferring data to the two terminals 219-1 and 219-2, and is capable of deciding the connection between the transmission paths and the terminals (which one to which) based on the setting by the line setting terminal 223.

The switching devices 295 and 275 in the optical transmission system according to the former embodiment shown in FIG. 14 function as a protection switch for the line with duplex structure. However, the switching devices 220 and 221 according to the present embodiment function as a cross-connecting device for switching a plurality of lines.

Figure 21:
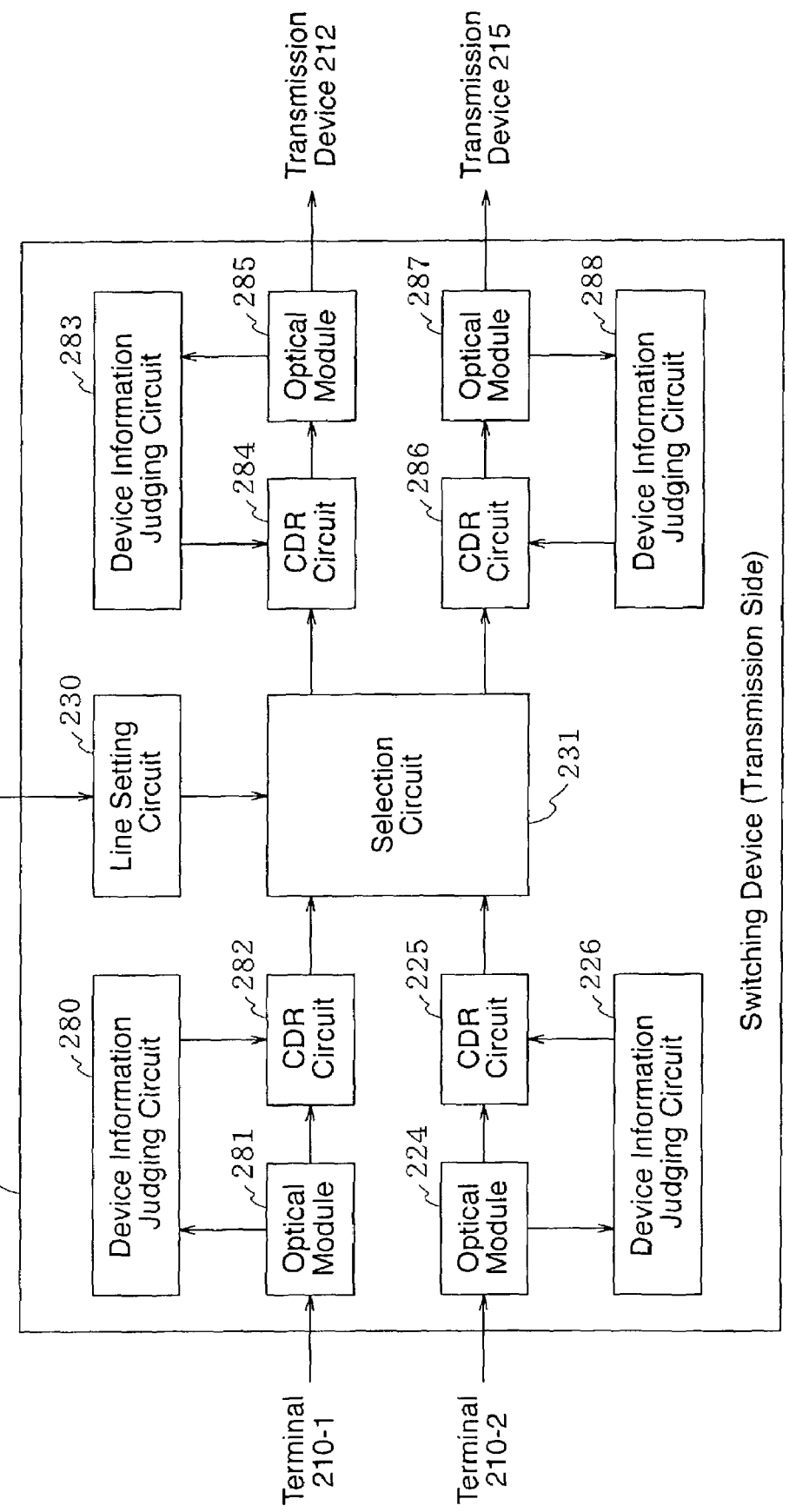
FIG. 21 is a block diagram showing the configuration of a multi-rate switching device (transmission side) shown in FIG. 1.

Next, FIG. 21 shows the configuration of the switching device 220 shown in FIG. 20. The switching device 220 functioning as a multi-rate cross-connecting device has a configuration in which: with respect to the switching device 295 corresponding to the multi-rate as shown in FIG. 15, an optical module 224, a CDR circuit 225 and a device information judging circuit 226 are added for corresponding to the additional connection to the terminal 210-2; the two-branching device 290 shown in FIG. 15 is replaced with the switching circuit 231; and a line setting circuit 230 is added for performing line switching to the switching circuit 231 based on the setting by the line setting terminal 222.

The optical module 224, the CDR circuit 225, and the device information judging circuit 226 have the same function as that of the optical module 281, the CDR circuit 282 and the device information judging circuit 280, respectively. The switching circuit 231 outputs the data waveform-shaped by the CDR circuits 282 and 225 to the designated part which is determined based on the line setting set by the line setting circuit 230.

Figure 22:
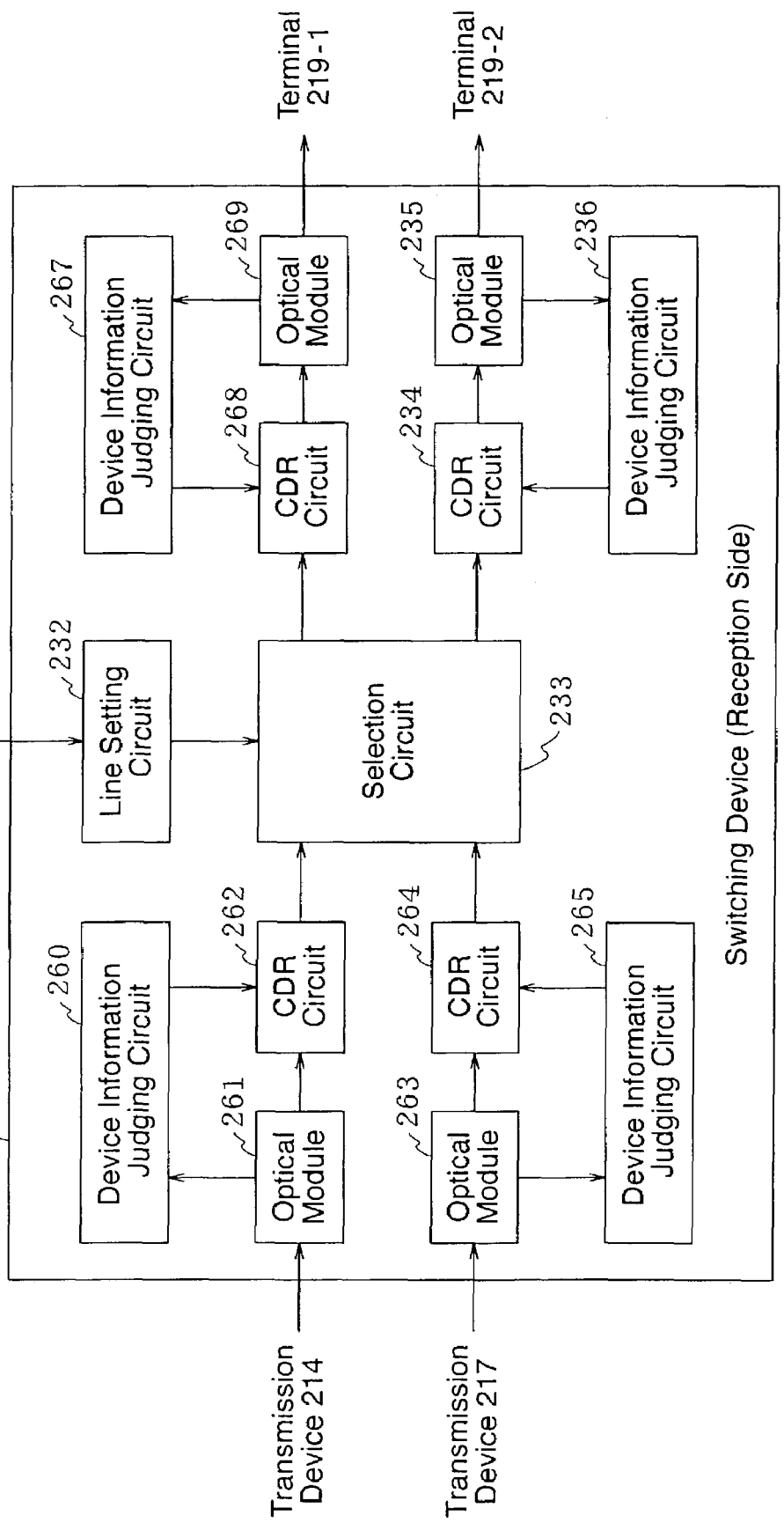
FIG. 22 is a block diagram showing the configuration of a multi-rate switching device (reception side) shown in FIG. 1.

Next, FIG. 22 shows the configuration of the switching device 221 shown in FIG. 20. The switching device 221 functioning as a multi-rate cross-connecting device has a configuration in which: with respect to the switching device 275 corresponding to the multi-rate as shown in FIG. 16, an optical module 235, a CDR circuit 234 and a device information judging circuit 236 are added for corresponding to the additional connection to the terminal 219-2; the selection circuit 266 shown in FIG. 16 is replaced with the switching circuit 233; and a line setting circuit 232 is added for performing line switching to the switching circuit 233 based on the setting by the line setting terminal 223.

The optical module 234, the CDR circuit 235, and the device information judging circuit 236 have the same function as that of the optical module 269, the CDR circuit 268 and the device information judging circuit 267, respectively. The switching circuit 233 outputs the data waveform-shaped by the CDR circuits 262 and 264 to the designated part which is determined based on the line setting set by the line setting circuit 232.

First, operation of the switching device will be described by referring to FIG. 21. In the switching device 220, data inputted from the terminals 210-1 and 210-2 interface with the optical modules 281 and 224. The device information judging circuit 280 and 226 judge the types of the optical modules 281 and 224, respectively, and set the rate for the CDR circuit 282 and 225. The output from the CDR circuits 282 and 225 is inputted to the switching circuit 231. In the switching circuit 231, the designated switch to which the data inputted from the CDR circuits 282 and 225 is outputted is determined based on the line setting set by the line setting circuit 230.

On the output side of the switching circuit 231, the interface rate is set in the device information judging circuits 283 and 288, which recognize the types of the optical modules 285, 287 provided on the transmission path side for performing setting of the rate for the CDR circuits 284 and 286. The CDR circuits 284 and 286 have a function of waveform-shaping the output data. The data outputted from the optical modules 285 and 287 are outputted to the transmission paths 213 and 216, respectively, via the transmission device 212 and the transmission device 215 shown in FIG. 20.

Next, operation of the switching device 212 will be described by referring to FIG. 22. In the switching device 221, data from the transmission paths 213 and 216 are transmitted via the transmission devices 214, 217 and interface with the optical modules 261 and 263. The device information judging circuit 260 and 265 recognize the types of the optical modules 261 and 263, respectively, and set the rate for the CDR circuit 262 and 264. The output from the CDR circuits 262 and 264 is inputted to the switching circuit 233. In the switching circuit 233, the designated switch to which the data inputted from the CDR circuits 262 and 264 is inputted is determined based on the line setting set by the line setting circuit 232.

On the output side of the switching circuit 233, the interface rate is set in the device information judging circuits 267 and 236, which judge the types of the optical modules 269 and 235 provided on the terminal side for performing setting of the rate for the CDR circuits 268 and 234. The CDR circuits 268 and 234 have a function of waveform-shaping the output data. The data outputted from the optical modules 269 and 235 are outputted to the terminals 219-1 and 219-2 shown in FIG. 20.

In the embodiment, the switching circuits 231 and 233 provided inside the switching device 221 and 221 have a 2×2 structure with two input channels and two output channels. However, the present invention is not limited to this and, generally, can achieve the same function even when it is extended to the n×n switch with n input channels and n output channels.

In the embodiment, the switching device is not for duplex switching but is to have a structure capable of achieving cross-connecting function. With this structure, it is also possible to correspond to the interfaces with different interface rates by simply replacing the optical modules. It is possible to correspond to the rates by simply replacing the optical modules to change the interface without changing the interface part of the cross-connecting device.

In the embodiment described above, the present invention is applied, respectively, to a switching device for branching a data into a plurality of systems of data, a switching device for selecting one system out of a plurality of the system of data, and a switching device for switching between a plurality of the lines. However, the present invention is not limited to such a case but is applicable to switching devices with other configurations as well. In such a case, the same effects can be achieved by having at least one configuration with an optical module, a CDR circuit and a device information judging circuit.

Furthermore, the embodiment has been described by referring to the case with the register present in the optical module and the type information of the optical module is stored in the register. However, the present invention is not limited to such a case but is applicable to any configuration as well, as long as it is a configuration in which the type information can be read out from outside.

As described, with the optical transmission switching device according to the present invention, the switching device for branching a data into a plurality of systems of data, a switching device for selecting a data out of a plurality of systems of the data, and a switching device for switching a plurality of lines can be formed to be capable of corresponding to various interfaces by simply replacing the optical module. Thus, the switching device can be used without being affected by the transmission devices, the terminals and the like, which are to be connected.

Next, the multiplex communication system according to the present invention to which the above-described line switching system, the optical transmission switching devices and the like can be applied will be described. In order to provide a distinctive feature of the multiplex communication system according to the present invention, it will be described by making a comparison to a conventional case.

As has been described, in order to improve the reliability of the multiplex communication system, a system is built in which duplex transmission paths of an active system and a standby system are provided thereby to switch the system to the standby system when there is a fault generated in the transmission path of the active system.

As the communication system, various types of protocols have been used, in which the active system is switched to the standby system when the transferred alarm is recognized by using a protocol having an alarm transfer function for generating and transferring the alarm when a fault is generated in the transmission path.

Further, the switching part for switching the active system and the standby system is combined with a multiplex device for performing multiplexing, thereby to perform multiplexing/separation of signals and switching between the active system and the standby system under a control by the same control part.

The transmission path duplex system of the conventional multiplex communication device described above is achieved on condition that it uses a protocol having the alarm transfer function. Therefore, it cannot be applied to a communication system using a data communication protocol in which no alarm transfer function is defined like, e.g., Ethernet.

Also, when the alarm transfer function is used, the system cannot be switched to the standby system until the alarm transfer is completed. Thus, there faces a problem that the switching cannot be performed promptly.

Further, the switching part and the multiplex devices are unified into one body so that the user lines are connected to the multiplex device via the switching device. Therefore, the scale of the device becomes large and the price is increased.

Also, it has a configuration in which the line connected to the switching part is duplicated inside the device to be connected to the multiplex device. Therefore, in the case where there are a service for duplicating the transmission line and a service without duplicating the transmission path being provided together, the line of the user, that does not require the duplex service (single line service), is also duplicated to be connected. Thus, the channels to be multiplexed cannot be effectively utilized.

The present invention has been designed to overcome the foregoing problems present in the related art as described. An object is to perform a prompt switching of the transmission paths in any types of the protocols and to achieve a multiplex communication system which can effectively utilize the channel to be multiplexed.

In order to achieve the foregoing object, the multiplex communication system according to the present invention comprises a switching device for duplicating data on a plurality of transmission paths thereby to distribute the data to an active system transmission path and a standby system transmission path; and a multiplex device provided on each of the active system transmission path and the standby system transmission path for multiplexing data which are distributed by the switching device and transmitted via the transmission paths. A control part is provided in each of the switching device and the multiplex device, and each of the control part together switches the transmission path from the active system to the standby system upon detecting a fault in the transmission path based on a state that no data signed is transmitted via each transmission path.

In this case, the multiplex device may comprise: a plurality of low-speed transmission/reception parts connected to a switching device; a multiplex part for multiplexing data received in the low-speed transmission/reception part; a high-speed transmission/reception part for outputting multiplex data multiplexed by the multiplex part to another opposing multiplex device; a separation part for separating the multiplex data from the opposing multiplex device received in the high-speed transmission/reception part and outputting the separated data to a plurality of the low-speed transmission/reception parts; and a control part for controlling operation of each part. Each of the low-speed transmission/reception parts and the high-speed transmission/reception part may notify an input fault to the control part and interrupt output of signal when input of signal from the transmission path connected to the multiplex device is interrupted for a prescribed time or longer; and the control part, upon receiving the notification, may interrupt the output signal of the low-speed transmission/reception parts or the high-speed transmission/reception part to which the fault has not been notified.

In any case described above, the switching device may comprise: a plurality of first low-speed transmission/reception parts connected to a plurality of transmission paths, respectively; a plurality of second and third low-speed transmission/reception parts connected to the multiplex device provided on the active system and standby system transmission paths, respectively, corresponding to a plurality of the low-speed transmission/reception parts; a copy/selection part provided in between the first low-speed transmission/reception parts and the second and third low-speed transmission/reception parts, for copying data from the first low-speed transmission/reception parts and outputting the data to the second and third low-speed transmission/reception parts, and for selecting data either from the second or third low-speed transmission/reception part and outputting it to the first low-speed transmission/reception parts; and a control part for controlling operation of each part. Also, each of the second and third low-speed transmission/reception part may notify an input fault to the control part when input of signal from the transmission path connected to the multiplex device is interrupted for a prescribed time or longer; and the control part, upon receiving the notification, may make the copy/selection part select the data from the second low-speed transmission/reception part in a normal state and, when notified of an input fault from the second low-speed transmission/reception part, may make the copy/selection part select the data from the third low-speed transmission/reception part after confirming that there is no notification about an input fault from the third low-speed transmission/reception part for a prescribed time or longer.

Further, the copy/selection part may comprise: a copy part for copying data from the first low-speed transmission/reception parts to output the data to the second and third low-speed transmission/reception parts and a selection part for selecting the data either from the second or third low-speed transmission/reception part to output it to the first low-speed transmission/reception parts. Also, the copy/selection part may be a switch comprising a plurality of input/output ports.

In the multiplex communication system according to the present invention with the configuration as described, when detecting a fault in the transmission path, a prompt switching of the transmission path is achieved through notifying the transmission path fault on both ends of the duplex structure section by utilizing interruption of the optical output.

It is a distinctive feature of the system that, by separating the duplex switching function and the multiplex function, the transmission duplex service and the transmission single line service can be provided at the same time and the number of the stored lines can be increased.

Also, the multiplex device and the switching device are separated and the switching device side performs detection of the non-input-signed state without terminating the transmission frame individually by every channel (ch) to be stored. Therefore, the switching device itself does not depend on the communication protocol.

It is also a distinctive feature that it is possible to use a different protocol by a channel (ch) unit inside a switching device.

It is another distinctive feature that a different transmission path to be duplicated can be selected individually by every channel (ch) so that it is more widely applicable than the case in which the duplex switching part is provided inside the multiplex device. In the system, interruption of the optical input/output is utilized, however, interruption of the input/output of the electric signals can be also utilized in the same system.

A specific example of the multiplex communication system according to the present invention will be described in the followings by referring to FIG. 23 to FIG. 25. It is shown separately in FIG. 23, FIG. 24 and FIG. 25 due to the available space. However, the terminals T1~T16 and the opposing terminals T1'~T16' in FIG. 23 and FIG. 24 are connected to each other and the terminals T1~T16 and the opposing terminals T1'~T16' in FIG. 24 and FIG. 25 are also connected to each other thereby to build the multiplex system according to the embodiment of the present invention.

Figure 23:
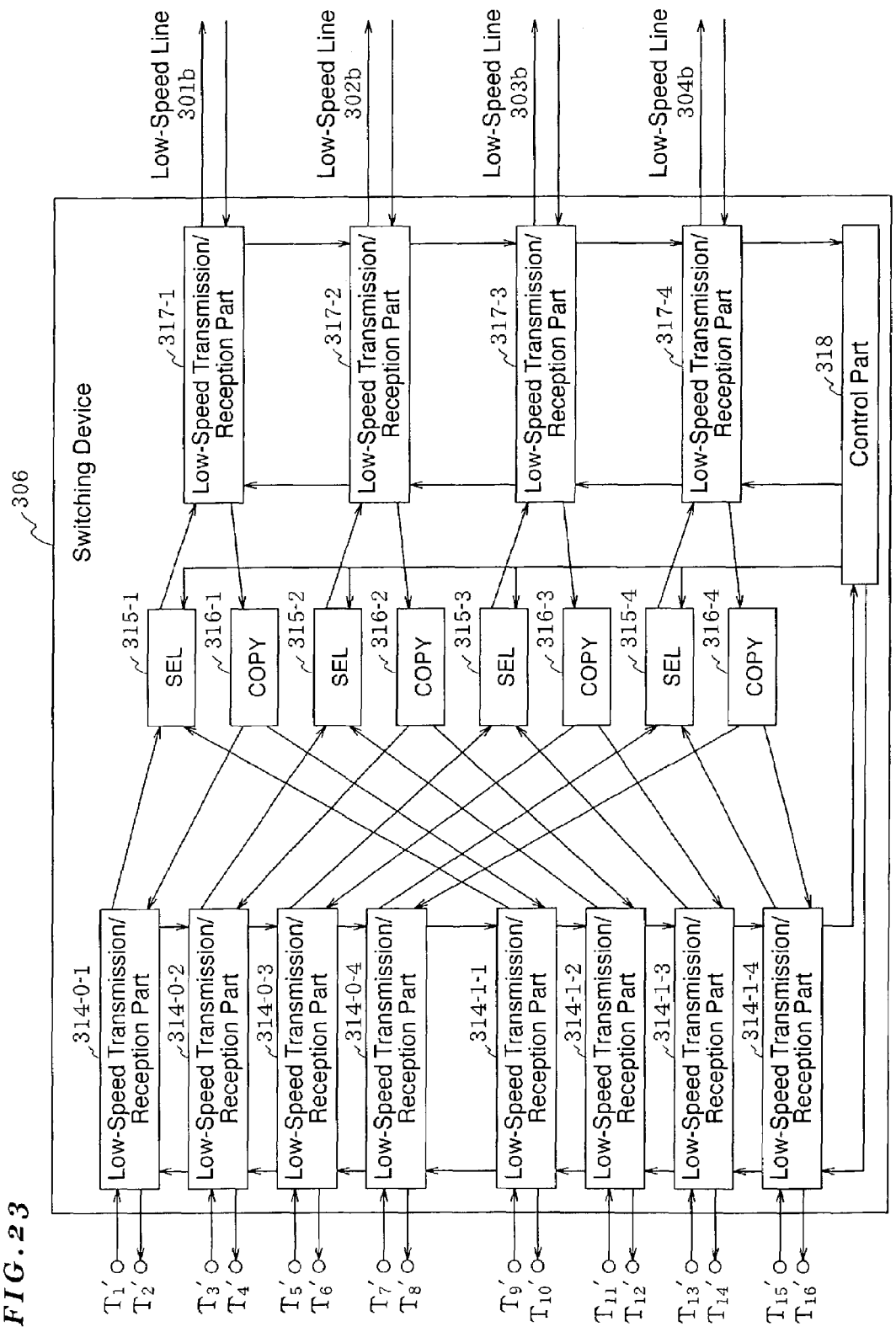
FIG. 23 is a block diagram showing the configuration of a multiplex system according to an embodiment of the present invention.
Figure 24:
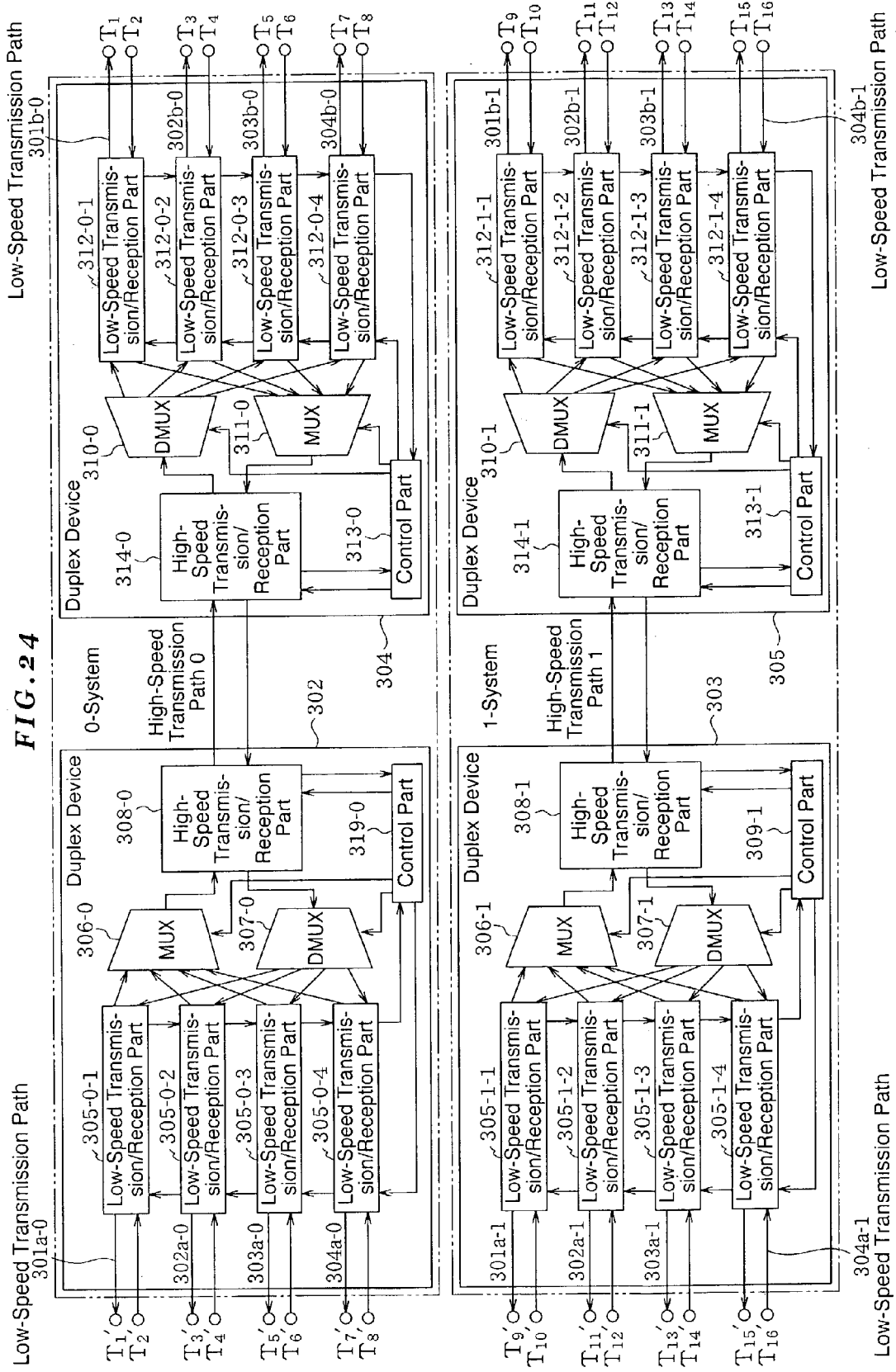
FIG. 24 is a block diagram showing the configuration of a multiplex system according to the embodiment of the present invention.
Figure 25:
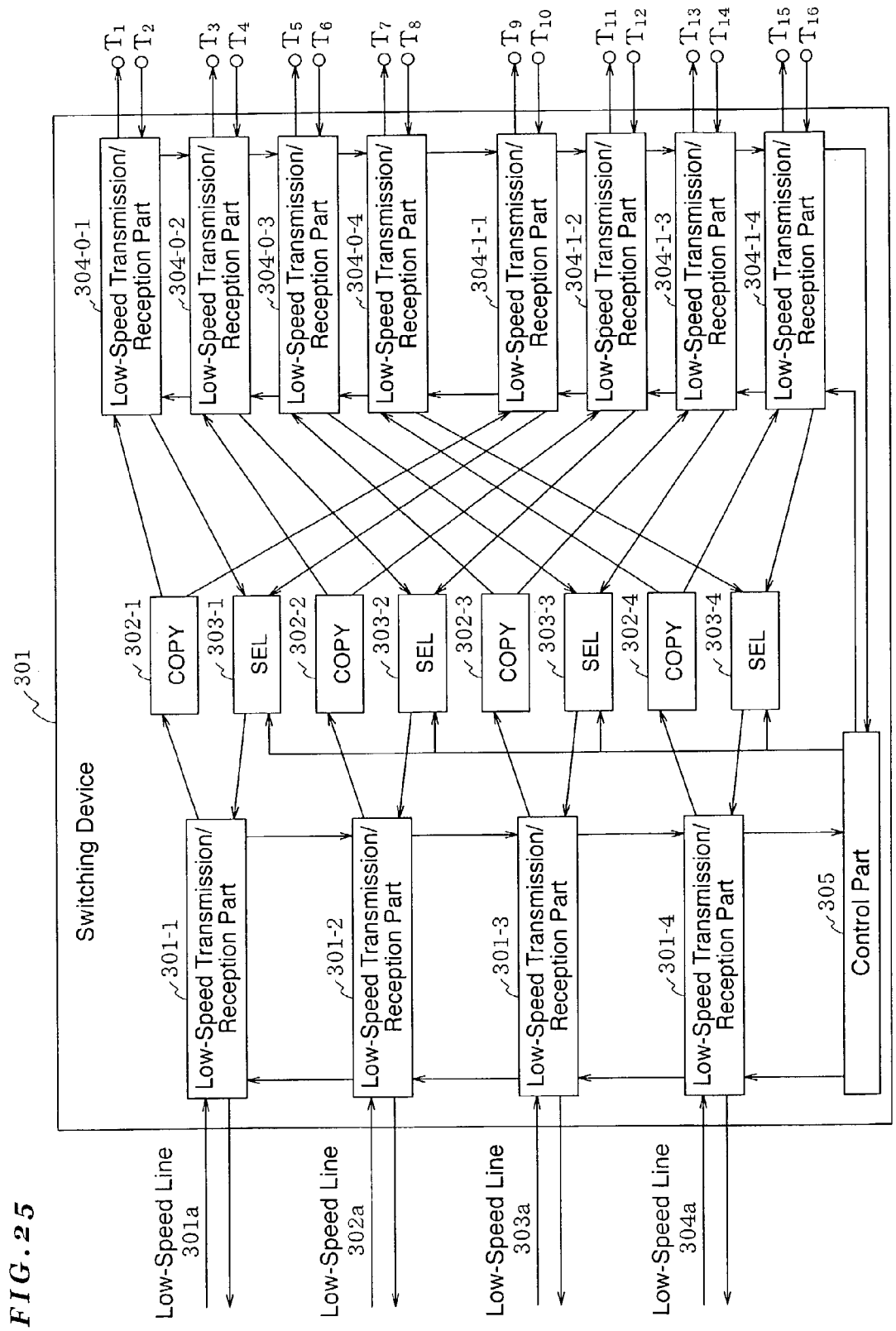
FIG. 25 is a block diagram showing the configuration of a multiplex system according to the embodiment of the present invention.

The Example as shown in FIG. 23 to FIG. 25 comprises two switching devices 301, 306, four multiplex devices 302, 303, 304, 305, and lines for connecting each device. The two switching devices 301 and 306, and the four multiplex devices 302, 303, 304 and 306 have the same configuration, respectively. The transfer between each switching device is performed in the multiplex devices 302 to 305 provided in between the switching devices 301 and 306. The multiplex devices 302 and 304 form the 0-system high-speed transmission path as one of the transmission path and the multiplex devices 303 and 305 form the 1-system high-speed transmission path as the other transmission path.

In the Example, as described above, the multiple number by the multiplex device is set to be 4. However, the present invention is applicable as long as the multiple factor is any integer of 1 or larger.

First, the configuration of the switching devices 301 and 302 will be described in detail. The switching device 301 comprises low-speed transmission/reception parts 301-1 to 301-4, 304-0-1 to 304-0-4, 304-1-1 to 304-1-4, COPY parts 302-1 to 302-4, SEL part (selection part) 303-1 to 303-4, and a control part 305 which is connected to each of the parts for controlling the operation.

The low-speed transmission/reception parts 301-1 to 301-4 are connected to low-speed lines 301a to 304a which serve as the connection lines between the outside-of the switching device 301. Also, the low-speed transmission/ reception parts 301-1 to 301-4 are connected to the COPY parts 302-1 to 302-4 and the SEL parts 303-1 to 303-4, respectively, inside the switching device 301, and have a bi-directional conversion function for the optical signals on the low-speed lines 301a to 304a and the electric signals inside the switching device 301. Further, the low-speed transmission/reception parts 301-1 to 301-4 have a function of monitoring the signal inputted from the low-speed lines 301a to 304a, and notifying a fault in the input signal to the control part 305 when there is a fault such as the non-input-signed state being continued for a prescribed time or longer. Also, the low-speed transmission/reception parts 301-1 to 301-4 have a function of interrupting the optical output to the low-speed lines 301a to 304a according to the output control signal inputted from the control part 305.

The COPY parts 302-1 to 302-4 have a function of copying the signals inputted from the low-speed transmission/reception parts 301-1 to 301-4 and outputting the copies to the low-speed transmission/reception parts 304-0-1 to 304-0-4 and 304-1-1 to 304-1-4, respectively.

The SEL parts 303-1 to 303-4 have a function of inputting the signals from each of the low-speed transmission/reception parts 304-0-1 to 304-0-4 and 304-1-1 to 304-1-4 and selecting any of the input signals according to the selection signal inputted from the control part 305 thereby to output the selected signal to the low-speed transmission/reception parts 301-1 to 301-4.

The low-speed transmission/reception parts 304-0-1 to 304-0-4, 304-1-1 to 304-1-4 are connected to the COPY parts 302-1 to 302-4 and the SEL parts 303-1 to 303-4 inside the switching device 301. Also, the low-speed transmission/ reception parts 301-1 to 301-4 and 304-1-1 to 304-1-4 are connected to the multiplex devices 302 and 303 via the low-speed transmission paths 301a-0 to 304a-0 and 301a-1 to 304a-1, provided respectively in between the multiplex devices 302 and 303, while having a bi-directional conversion function for the electric signal inside the switching device 301 and the optical signals on the low-speed transmission paths 301a-0 to 304a-0 and 301a-1 to 304a-1. Further, the low-speed transmission/reception parts 304-0-1 to 304-0-4 and 304-1-1 to 304-1-4 have a function of monitoring the signal inputted from low-speed transmission paths 301a-0 to 304a-0 and 301a-1 to 304a-1, and notifying a fault in the input signal to the control circuit 305 when there is a fault such as the non-input-signed state of the input signal being continued for a prescribed time or longer. Also, the low-speed transmission/reception parts 304-0-1 to 304-0-4, and 304-1-1 to 304-1-4 have a function of interrupting the optical output to the low-speed transmission paths 301a-0 to 304a-0, 301a-1 to 304a-1 according to the output control signal inputted from the control part 305.

The control part 305 have a function of controlling optical output of each low-speed transmission/reception part and controlling the selection in the SEL parts 303-1 to 303-4 through monitoring the input fault signals by every channel, showing the fault in the input signals inputted from each of the low-speed transmission/reception parts 301-1 to 301-4 and the low-speed transmission/reception parts 304-0-1 to 304-0-4 and 304-1-1 to 304-1-4.

The switching device 306 has the same configuration as that of the switching device 301. The low-speed transmission/reception parts 317-1 to 317-4, 314-0-1 to 314-0-4 and 314-1-1 to 314-1-4 of the switching device 306 correspond to the low-speed transmission/reception parts 301-1 to 301-4, 304-0-1 to 304-0-4, and 304-1-1 to 304-1-4 of the switching device 301, respectively. Also, the COPY parts 315-1 to 315-4, the SEL parts 316-1 to 316-4, and the control part 318 of the switching device 306 correspond to the COPY parts 302-1 to 302-4, the SEL parts 303-1 to 303-4 and the control part 305 of the switching device 301, respectively.

The low-speed transmission/reception parts 317-1 to 317-4 are connected to low-speed lines 301b to 304b as the connection lines between the outside of the switching device 306. Also, the low-speed transmission/reception parts 317-1 to 317-4 are connected to the COPY parts 316-1 to 316-4 and the SEL parts 315-1 to 315-4, respectively, inside the switching device 306, while having a bi-directional conversion function for the optical signals on the low-speed lines 301b to 304b and the electric signals inside the switching device 306. Further, the low-speed transmission/reception parts 317-1 to 317-4 have a function of monitoring the signal inputted from the low-speed lines 301b to 304b, and notifying a fault in the input signal to the control part 318 when there is a fault such as the non-input-signal state being continued for a prescribed time or longer. Also, the low-speed transmission/reception parts 317-1 to 317-4 have a function of interrupting the optical output to the low-speed lines 301b to 304b according to the output control signal inputted from the control part 318.

The COPY parts 316-1 to 316-4 have a function of copying the signals inputted from the low-speed transmission/reception parts 317-1 to 317-4 and outputting the copies to the low-speed transmission/reception parts 314-0-1 to 314-0-4 and 314-1-1 to 314-1-4, respectively.

The SEL parts 315-1 to 315-4 have a function of inputting the signals from each of the low-speed transmission/reception parts 314-0-1 to 314-0-4 and 314-1-1 to 314-1-4 and selecting any of the output signals according to the selection signal inputted from the control part 318 thereby to output the selected signal to the low-speed transmission/reception parts 317-1 to 317-4.

The low-speed transmission/reception parts 314-0-1 to 314-0-4, 314-1-1 to 314-1-4 are connected to the COPY parts 316-1 to 316-4 and the SEL parts 315-1 to 315-4 inside the switching device 306. Also, the low-speed transmission/ reception parts 314-0-1 to 314-0-4 and 314-1-1 to 314-1-4 are connected to the multiplex devices 304 and 305 via the low-speed transmission paths 301b-0 to 304b-0 and 301b-1 to 304b-1, provided respectively in between the multiplex devices 304 and 305, while having a bi-directional conversion function for the electric signal inside the switching device 306 and the optical signals on the low-speed transmission paths 301b-0 to 304b-0 and 301b-1 to 304b-1. Further, the low-speed transmission/reception parts 314-0-1 to 314-0-4, and 314-1-1 to 314-1-4 have a function of monitoring the signal inputted from low-speed transmission paths 301b-0 to 304b-0, 301b-1 to 304b-1, and notifying a fault in the input signal to the control part 318 when there is a fault such as the non-input-signed state being continued for a prescribed time or longer. Also, the low-speed transmission/reception parts 314-0-1 to 314-0-4, and 314-1-1 to 314-1-4 have a function of interrupting the optical output to the low-speed transmission paths 301b-0 to 304b-0 and 301b-1 to 304b-1 according to the output control signal inputted from the control part 318.

The control part 318 have a function controlling optical output of each low-speed transmission/reception part and controlling the selection in the SEL parts 315-1 to 315-4 through monitoring the input fault signals by every channel, showing the fault in the input signals inputted from each of the low-speed transmission/reception parts 317-1 to 317-4 and the low-speed transmission/reception parts 314-0-1 to 314-0-4 and 314-1-1 to 314-1-4.

Next, the configuration of the multiplex devices 302 to 305 will be described in detail.

The multiplex device 302 comprises low-speed transmission/reception parts 305-0-1 to 305-0-4, a MUX part 306-0, a DMUX part 307-0, a high-speed transmission/reception part 308-0, and a control part 309-0 being connected to each of the parts for controlling the operation.

The low-speed transmission/reception parts 305-0-1 to 305-0-4 are connected to the low-speed transmission/reception parts 304-0-1 to 304-0-4 of the switching device 301, respectively, via the low-speed transmission paths 301a-0 to 301a-4. The low-speed transmission/reception parts 305-0-1 to 305-04 are also connected to the MUX part 306-0 and the DMUX part 307-0 inside the multiplex device 302, while having a bi-directional conversion function for the optical signals on the low-speed transmission paths 301a-0 to 304a-0 and the electric signal inside the multiplex device 302. Further, the low-speed transmission/reception parts 305-0-1 to 305-0-4 have a function of monitoring the signal inputted from low-speed transmission paths 301a-0 to 304a-0, and notifying a fault in the input signal to the control part 309-0 when there is a fault such as the non-input signal state being continued for a prescribed time or longer. Also, the low-speed transmission/reception parts 305-0-1 to 305-0-4 have a function of interrupting the optical output to the low-speed transmission paths 301a-0 to 304a-0 according to the output control signal inputted from the control part 309-0.

The MUX part 306-0 multiplexes the signal inputted from the low-speed transmission/reception parts 305-0-1 to 305-0-4 and outputs the signals to the high-speed transmission/reception part 308-0. Also, it has a function of inserting a transmission path fault detection pattern showing the fault by every channel according to an instruction from the control part 309-0.

The DMUX part 307-0 separates the signals which are inputted from the high-speed transmission/reception part 308-0 by channel unit and then outputs it to the low-speed transmission/reception parts 305-0-1 to 305-0-4 of the corresponding channel. Also, it has a function of detecting the transmission path fault detection pattern showing the fault of each channel and notifying the fault to the control part 309-0.

The high-speed transmission/reception part 308-0 is provided in between the MUX part 306-0, the DMUX part 307-0, and the high-speed transmission path 0, and has a bi-directional conversion function for the optical signal on the high-speed transmission path 0 and the electric signal inside the device. Also, the high-speed transmission/reception part 308-0 has a function of monitoring the signal inputted from the high-speed transmission path 0 and notifying the input fault to the control part 309-0 when detecting the fault. Further, it has a function of notifying the input fault to the opposing device through the high-speed transmission path 0. Furthermore, it has a function of interrupting the optical output to the high-speed transmission path 0 according to the output control signal inputted from the control part 309-0.

The control part 309-0 has a function of monitoring the input fault signals inputted from the low-speed transmission/reception parts 305-0-1 to 305-0-4, the high-speed transmission/reception part 308-0 and the DMUX part 307-0 and performing the output control of the low-speed transmission/reception parts 305-0-1 to 305-0-4 and the output control of the high-speed transmission/reception part 308-0.

Each of the multiplex devices 303 to 305 has the same configuration as that of the multiplex device 302. The low-speed transmission/reception parts 305-1-1 to 305-1-4, 312-0-1 to 312-0-4, and 312-1-1 to 312-1-4 in each of the multiplex devices 303 to 305 correspond to the low-speed transmission/reception part 305-0-1 to 305-0-4 in the multiplex device 302. Also, the MUX parts 306-1, 310-0, 310-1, and the DMUX parts 307-1, 311-0, 311-1, the high-speed transmission/reception parts 308-1, 314-0, 314-1, and the control parts 309-1, 313-0, 313-1 in each of the multiplex devices 303 to 305 correspond to the MUX part 306-0, the DMUX part 307-0, the high-speed transmission/reception part 308-0 and the control part 309-0 in the multiplex device 302, respectively.

Each of the low-speed transmission/reception parts 305-1-1 to 305-1-4 in the multiplex device 303 is connected to the low-speed transmission/reception parts 304-1-1 to 304-1-4 of the switching device 301 via the low-speed transmission paths 301a-1 to 304a-1. Also, the low-speed transmission/reception parts 305-1-1 to 305-1-4 are connected to the MUX part 306-1 and the DMUX part 307-1, respectively, inside the multiplex device 303, while having a bi-directional conversion function for the optical signals on the low-speed transmission paths 301a-1 to 304a-1 and the electric signals inside the multiplex device 303. Further, the low-speed transmission/reception parts 305-1-1 to 305-1-4 have a function of monitoring the signal inputted from the low-speed transmission paths 301a-1 to 304a-1, and notifying a fault in the input signal to the control part 309-1 when there is a fault such as the non-input-signed state being continued for a prescribed time or longer. Also, the low-speed transmission/reception parts 305-1-1 to 305-1-4 have a function of interrupting the optical output to the low-speed transmission paths 301a-1 to 304a-1 according to the output control signal inputted from the control part 309-1.

The MUX part 306-1 multiplexes the signal inputted from the low-speed transmission/reception parts 305-1-1 to 305-1-4 and outputs the signals to the high-speed transmission/reception part 308-1. Also, it has a function of inserting a transmission path fault detection pattern showing the fault by every channel according to an instruction from the control part 309-1.

The DMUX part 307-1 separates the signals which are inputted from the high-speed transmission/reception part 308-1 by channel unit and then outputs it to the low-speed transmission/reception parts 305-1-1 to 305-1-4 of the corresponding channel. Also, it has a function of detecting the transmission path fault detection pattern showing the fault of each channel and notifying the fault to the control part 309-1.

The high-speed transmission/reception part 308-1 is provided in between the MUX part 306-1, the DMUX part 307-1, and the high-speed transmission path 1, and has a bi-directional conversion function for the optical signal on the high-speed transmission path 1 and the electric signal inside the device. Also, the high-speed transmission/reception part 308-1 has a function of monitoring the signal inputted from the high-speed transmission path 1 and notifying the input fault to the control part 309-1 when detecting the fault. Further, it has a function of notifying the input fault to the opposing device through the high-speed transmission path 1. Furthermore, it has a function of interrupting the optical output to the high-speed transmission path 1 according to the output control signal inputted from the control part 309-1.

The control part 309-1 has a function of monitoring the input fault signals inputted from the low-speed transmission/reception parts 305-1-1 to 305-1-4, the high-speed transmission/reception part 308-1 and the DMUX part 307-1, and performing the output control of the low-speed transmission/reception parts 305-1-1 to 305-1-4 and the output control of the high-speed transmission/reception part 308-1.

Each of the low-speed transmission/reception parts 312-0-1 to 312-0-4 in the multiplex device 304 is connected to the low-speed transmission/reception parts 304-0-1 to 304-0-4 of the switching device 306 via the low-speed transmission paths 301b-0 to 304b-0. Also, the low-speed transmission/reception parts 312-0-1 to 312-0-4 are connected to the MUX part 311-0 and the DMUX part 310-0, respectively, inside the multiplex device 304, while having a bi-directional conversion function for the optical signals on the low-speed transmission paths 301b-0 to 304b-0 and the electric signals inside the multiplex device 304. Further, the low-speed transmission/reception parts 312-0-1 to 312-0-4 have a function of monitoring the signal inputted from the low-speed transmission paths 301b-0 to 304b-0, and notifying a fault in the input signal to the control part 313-0 when there is a fault such as the non-input-signed state being continued for a prescribed time or longer. Also, the low-speed transmission/reception parts 312-0-1 to 312-0-4 have a function of interrupting the optical output to the low-speed transmission paths 301b-0 to 304b-0 according to the output control signal inputted from the control part 313-0.

The MUX part 311-0 multiplexes the signal inputted from the low-speed transmission/reception parts 312-0-1 to 312-0-4 and outputs the signals to the high-speed transmission/reception part 314-0. Also, it has a function of inserting a transmission path fault detection pattern showing the fault by every channel according to an instruction from the control part 313-0.

The DMUX part 310-0 separates the signals which are inputted from the high-speed transmission/reception part 314-0 by channel unit and then outputs it to the low-speed transmission/reception parts 312-0-1 to 312-0-4 of the corresponding channel. Also, it has a function of detecting the transmission path fault detection pattern showing the fault of each channel and notifying the fault to the control part 313-0.

The high-speed transmission/reception part 314-0 is provided in between the MUX part 311-0, the DMUX part 310-0, and the high-speed transmission path 0, and has a bi-directional conversion function for the optical signal on the high-speed transmission path 0 and the electric signal inside the device. Also, the high-speed transmission/reception part 314-0 has a function of monitoring the signal inputted from the high-speed transmission path 0 and notifying the input fault to the control part 313-0 when detecting the fault such as the non-input-signed state for a prescribed time or longer continued. Further, it has a function of notifying the input fault to the opposing device through the high-speed transmission path 0. Furthermore, it has a function of interrupting the optical output to the high-speed transmission path 0 according to the output control signal inputted from the control part 313-0.

The control part 313-0 has a function of monitoring the input fault signals inputted from the low-speed transmission/reception parts 312-0-1 to 312-0-4, the high-speed transmission/reception part 314-0 and the DMUX part 310-0, and performing the output control of the low-speed transmission/reception parts 312-0-1 to 312-0-4 and the output control of the high-speed transmission/reception part 314-0.

Each of the low-speed transmission/reception parts 312-1-1 to 312-1-4 in the multiplex device 305 is connected to the low-speed transmission/reception parts 304-1-1 to 304-1-4 of the switching device 306 via the low-speed transmission paths 301b-1 to 304b-1. Also, the low-speed transmission/reception parts 312-1-1 to 312-1-4 are connected to the MUX part 311-1 and the DMUX part 310-1, respectively, inside the multiplex device 305, while having a bi-directional conversion function for the optical signals on the low-speed transmission paths 301b-1 to 304b-1 and the electric signals inside the multiplex device 305. Further, the low-speed transmission/reception parts 312-1-1 to 312-1-4 have a function of monitoring the signal inputted from the low-speed transmission paths 301b-1 to 304b-1, and notifying a fault in the input signal to the control part 313-1 when there is a fault such as the non-input-signed state being continued for a prescribed time or longer. Also, the low-speed transmission/reception parts 312-1-1 to 312-1-4 have a function of interrupting the optical output to the low-speed transmission paths 301b-1 to 304b-1 according to the output control signal inputted from the control part 313-1.

The MUX part 311-1 multiplexes the signal inputted from the low-speed transmission/reception parts 312-1-1 to 312-1-4 and outputs the signals to the high-speed transmission/reception part 314-1. Also, it has a function of inserting a transmission path fault detection pattern showing the fault by every channel according to an instruction from the control part 313-1.

The DMUX part 310-1 separates the signals which are inputted from the high-speed transmission/reception part 314-1 by channel unit and then outputs it to the low-speed transmission/reception parts 312-1-1 to 312-1-4 of the corresponding channel. Also, it has a function of detecting the transmission path fault detection pattern showing the fault of each channel and notifying the fault to the control part 313-1.

The high-speed transmission/reception part 314-1 is provided in between the MUX part 311-1, the DMUX part 310-1, and the high-speed transmission path 1, and has a bi-directional conversion function for the optical signal on the high-speed transmission path 1 and the electric signal inside the device. Also, the high-speed transmission/reception part 314-1 has a function of monitoring the signal inputted from the high-speed transmission path 1 and notifying the input fault to the control part 313-1 when detecting the fault such as the non-input-signed state being continued for a prescribed time or longer. Further, it has a function of notifying the input fault to the opposing device through the high-speed transmission path 1. Furthermore, it has a function of interrupting the optical output to the high-speed transmission path 1 according to the output control signal inputted from the control part 313-1.

The control part 313-1 has a function of monitoring the input fault signals inputted from the low-speed transmission/reception parts 312-1-1 to 312-1-4, the high-speed transmission/reception part 314-1 and the DMUX part 310-1 and performing the output control of the low-speed transmission/reception parts 312-1-1 to 312-1-4 and the output control of the high-speed transmission/reception part 314-1.

Next, operation of the Example will be described.

It will be described by referring to the case where the system of the Example operates with the multiplex devices 302 and 304 being the active systems and the duplex devices 303 and 305 being the standby system.

In FIG. 25, when the transmission fault path is detected in the high-speed transmission/reception part 309-0, the fault is notified to the low-speed transmission/reception parts 312-0-1 to 312-0-4 through the control part 313-0, and the optical output to the low-speed transmission paths 301b-0 to 304b-0 is interrupted. Thereby, the transmission path fault is detected in the low-speed transmission/reception parts 314-0-1 to 314-0-4 and is notified to the control part 318. Thus, the selection system of SEL parts 315-1 to 315-4 is switched from the 0-system to the 1-system. Also, by interrupting the optical output of the low-speed transmission/reception parts 314-0-1 to 314-0-4, the transmission path fault is notified in the reverse direction. Thereby, the transmission path fault is also detected in the low-speed transmission/reception parts 304-0-1 to 304-0-4 of the switching device 301. Thus, by the control of the control part 305, the selection system of the SEL parts 303-1 to 303-4 is switched from the 0-system to the 1-system so that the transmission paths in both directions are switched from the 0-system to the 1-system.

Specific operation of each part is as follows.

In a normal state, the optical signal inputted from the low-speed line 301a, after being converted to the electric signal in the low-speed transmission/reception part 301-1, is copied in the COPY part 302-1, and then converted to the optical signal in the low-speed transmission/reception parts 304-0-1 and 304-1-1 to be outputted to the active system low-speed transmission path 301a-0 and the standby system low-speed transmission path 301a-1. The operation of allotting the optical signals from the low-speed line to the active system low-speed transmission path 301a-0 and to the standby system low-speed transmission path 301a-1 is performed for each of the low-speed lines 301a to 304a, respectively.

In the multiplex devices 302 and 303, the data from each low-speed transmission path is multiplexed in the MUX parts 306-0, 306-1 and output the data to the high-speed transmission path 0 and the high-speed transmission path 1. The multiplexed data are separated to the data for each low-speed transmission path in the multiplex devices 304, 305 and outputted to the low-speed transmission paths 301b-0 and 301b-1.

In the switching device 306, the optical signal inputted from the low-speed line 301a is inputted to the low-speed transmission/reception parts 314-0-1 and 314-1-1 and the data is transferred to the SEL part 315-1. The control part 318, since the multiplex devices 302 and 304 are to be the operation system, controls the SEL part 315-1 to select the data inputted from the low-speed transmission/reception part 314-0-1 via the multiplex devices. The output of the SEL part 315-1 is transferred to the low-speed transmission/reception part 317-1 and is then converted to the optical signal in the low-speed transmission/reception part 317-1 to be outputted to the low-speed line 301b. In the same manner, the data in the reverse direction is copied in the COPY part 316-1 and the copied data are then inputted to the low-speed transmission/reception parts 304-0-1 and 304-1-1 of the switching device 301 through the multiplex devices 304, 302, and 305, 303. The data are inputted to the SEL part 303-1. However, the data inputted from the low-speed transmission/reception part 304-0-1 is selected by the control of the control part 305 to be outputted to the low-speed line 301a. As described, it enables a bi-directional communication between the low-speed line 301a and the low-speed line 301b.

Next, a case will be described in which, in the normal state, a fault is generated in the high-speed transmission path 0 in the direction from the duplex device 302 to the duplex device 304.

When there is a fault generated in the high-speed transmission path 0 which is the active system in the direction from the multiplex device 302 to the multiplex device 304, the high-speed transmission/reception part 314-0 of the multiplex device 304 detects the input fault and notifies it to the control part 313-0. Also, the optical output to the high-speed transmission path 0 is interrupted (or an input fault notified on signed is added to the output signal) thereby to notify the input fault to the multiplex device 302 through the transmission path 0. The control part 313-0, upon receiving the input fault notification, gives an instruction for interrupting the output to the low-speed transmission/reception parts 312-0-1 to 312-0-4, and the low-speed transmission/reception parts 312-0-1 to 312-0-4 thereby interrupts the optical output to the low-speed transmission paths 301b-0 to 304b-0.

In the low-speed transmission/reception parts 314-0-1 to 314-0-4 of the switching device 306, the input fault is detected by the interruption of the optical output to the low-speed transmission paths 301b-0 to 304b-0 and is notified to the control part 318. The control part 318, upon receiving the input fault notification from the low-speed transmission/reception parts 314-0-1 to 314-0-4, gives an instruction to the SEL parts 315-1 to 315-4 to switch the selection system to the 1-system when the input fault is not notified from the low-speed transmission/reception parts 314-1-1 to 314-1-4 within a certain time. The SEL parts 315-1 to 315-4 switch the output data from the input data of the low-speed transmission/reception parts 314-0-1 to 314-0-4 to the input data of the low-speed transmission/reception parts 314-1-1 to 314-1-4 according to the instruction from the control part 318.

In the multiplex device 302, the high-speed transmission/reception part 308-0, when recognizing the sate of no optical input from the high-speed transmission path 0 (or the input fault notification from the high-speed transmission/reception part 314-0), notifies the output fault to the control part 309-0. The control part 309-0 gives an instruction for interrupting the output to the low-speed transmission/reception parts 305-0-1 to 305-0-4 according to the output fault notification from the high-speed transmission/reception part 308-0. The low-speed transmission/reception parts 305-0-1 to 305-0-4 interrupt the optical output to the low-speed transmission paths 301a-0 to 304a-0 according to the instruction for interrupting the output. Thereby, the fault in the transmission path is notified to the low-speed transmission/reception parts 304-0-1 to 304-0-4 of the receiving switching device 301.

In the switching device 301, the input fault is detected in the low-speed transmission/reception parts 304-0-1 to 304-0-4 and is notified to the control part 305. The control part 305, when the input fault is notified from the low-speed transmission/reception parts 304-0-1 to 304-0-4, gives an instruction to the SEL parts 303-1 to 303-4 to switch the selection system from the 0-system to the 1-system when the input fault is not notified from the low-speed transmission/reception parts 304-1-1 to 304-1-4 within a certain time. The SEL parts 303-1 to 303-4 switch the output data from the input data of the low-speed transmission/reception parts 304-0-1 to 304-0-4 to the input data of the low-speed transmission/reception parts 304-1-1 to 304-1-4 according to the instruction from the control part 305.

As described, due to the generation of fault in the high-speed line 0a, switching of the transmission path is performed through changing the operation system from the 0-system to the 1-system.

Next, a case will be described in which, in a normal state, a fault is generated in the low-speed transmission path 301a-0 in the direction from the switching device 301 to the duplex device 302.

When there is a fault generated in the low-speed transmission path 301a-0 in the direction from the switching device 301 to the multiplex device 302, the multiplex device 302 detects the input fault in the low-speed transmission/reception path 305-0-1 and notifies the input fault to the control part 309-0. The control part 309-0, upon receiving the input fault notification from the low-speed transmission/reception part 305-0-1, gives an instruction to the MUX part 306-0 to generate the input fault detection pattern for the corresponding channel to be inserted thereto. Upon receiving the instruction, the MUX part 306-0 inserts the input fault detection pattern instead of the data of the corresponding channel and the pattern is multiplexed with the data of another channel to be transmitted to the multiplex device 304.

In the multiplex device 304, the input fault detection pattern inserted by the MUX part 306-0 is detected in the DMUX part 310-0. The DMUX part 310-0 notifies the fault of the corresponding channel to the control part 313-0. The control part 313-0 outputs an instruction for interrupting the output to the low-speed transmission/reception part 312-0-1. The low-speed transmission/reception part 312-0-1 interrupts the optical output to the low-speed transmission path 301b-0 and notifies the transmission path fault of the corresponding channel to the switching device 306.

The low-speed transmission/reception part 314-0-1 of the switching device 306, when detecting the transmission path fault, notifies the transmission path fault of the corresponding channel to the control part 318. The control part 318 outputs an instruction for interrupting the output to the low-speed transmission/reception part 314-0-1, and outputs an instruction to the SEL part 315-1 for switching the low-speed transmission/reception part 314-1-0 to the low-speed transmission part 314-1-1 when the transmission path fault notification is not inputted from the low-speed transmission/reception part 314-1-1 within a certain time. The SEL part 315-1 switches the selection systems from the 0-system to the 1-system according to the switching instruction from the control part 318. The low-speed transmission/reception part 314-0-1, upon receiving the instruction for interrupting the output, interrupts the optical output thereby to notify the transmission path fault to the multiplex device 304.

The low-speed transmission/reception part 312-0-1 of the multiplex device 304, when detecting the transmission path fault from the low-speed transmission/reception part 314-0-1, notifies the fault to the control part 313-0. The control part 313-0 then outputs an instruction to the MUX part 311-0 to insert the transmission path fault detection pattern. The MUX part 311-0 inserts the transmission path fault detection pattern instead of the data of the corresponding channel and transmits it to the multiplex device 302 through the high-speed transmission/reception part 314-0.

The DMUX part 307-0 of the multiplex device 302, when detecting the transmission path fault detection pattern inserted to the channel with transmission path fault, notifies the transmission path fault of the corresponding channel to the control part 309-0. The control part 309-0, upon receiving the notification, outputs an instruction to the low-speed transmission/reception part 305-0-1 for interrupting the output and the low-speed transmission/reception part 305-0-1 interrupts the optical output to the low-speed transmission path 301a-0.

The low-speed transmission/reception path 304-0-1 of the switching device 301 detects the transmission path fault and notifies the transmission path fault to the control part 305. The control part 305, after receiving the notification of the transmission path fault from the low-speed transmission/reception path 304-0-1, outputs an instruction to the SEL part 303-1 for switching the system to the standby system when the notification of the transmission path fault is not received from the low-speed transmission/reception part 304-1-1 as the standby transmission path within a certain time. The SEL part 303-1 switches the selection systems from the 0-system to the 1-system. In the manner as described, switching of the 0-system transmission path to the 1-system transmission path is performed when there is a transmission path fault is generated in the direction from the switching device 301 to the multiplex device 304.

When the high-speed transmission path is SONET (Synchronous Optical Network)/SDH (Synchronous Digital Hierarchy), the alarm transfer functions of the SONET/SDH can be utilized. Further, in the case where a relay is provided in the high-speed transmission path, the alarm can be also transferred to the opposing device by the alarm transfer functions of the SONET/SDH.

Figure 26:
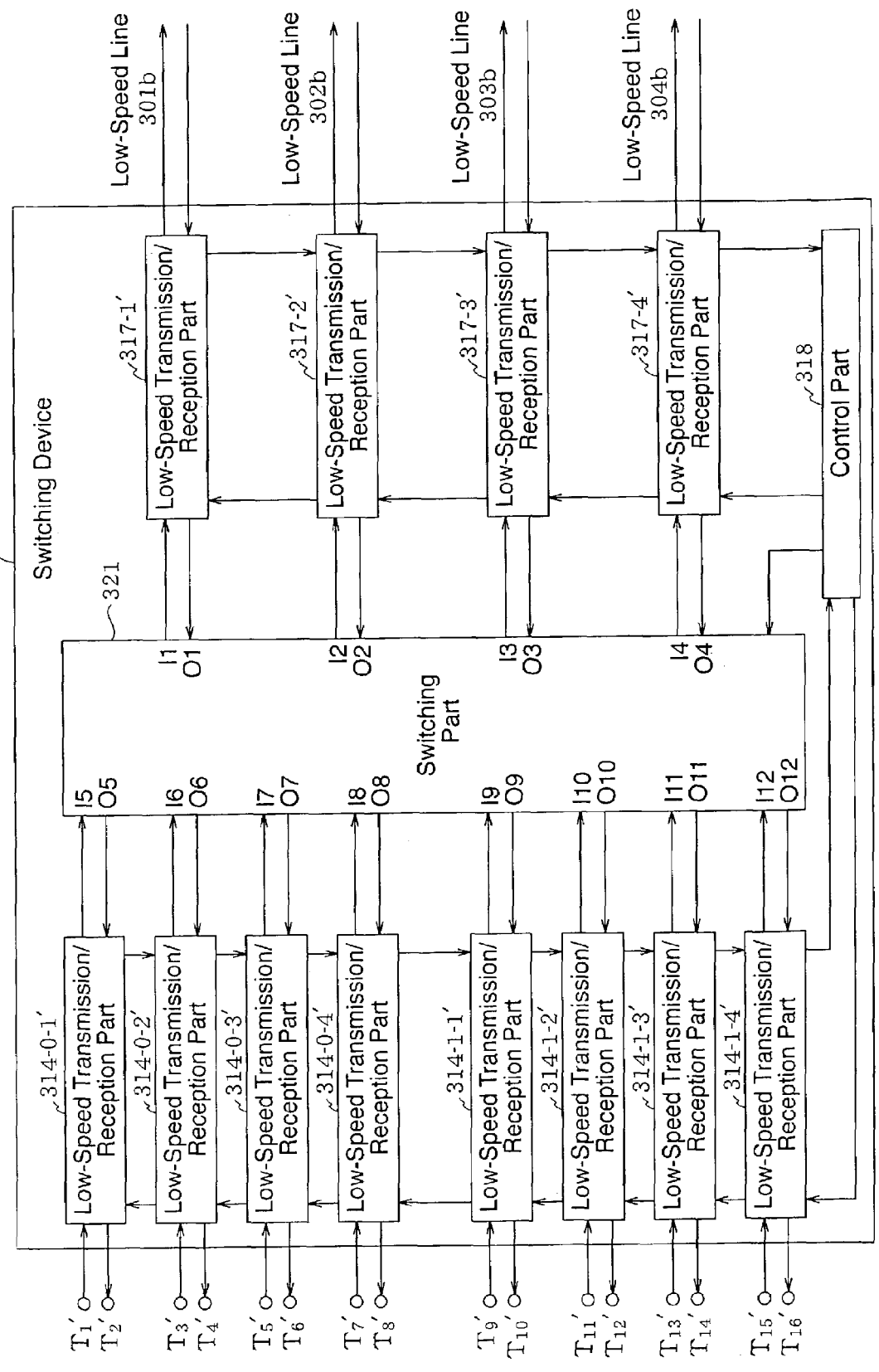
FIG. 26 is a block diagram showing the configuration of another multiplex system according to the embodiment of the present invention.
Figure 27:
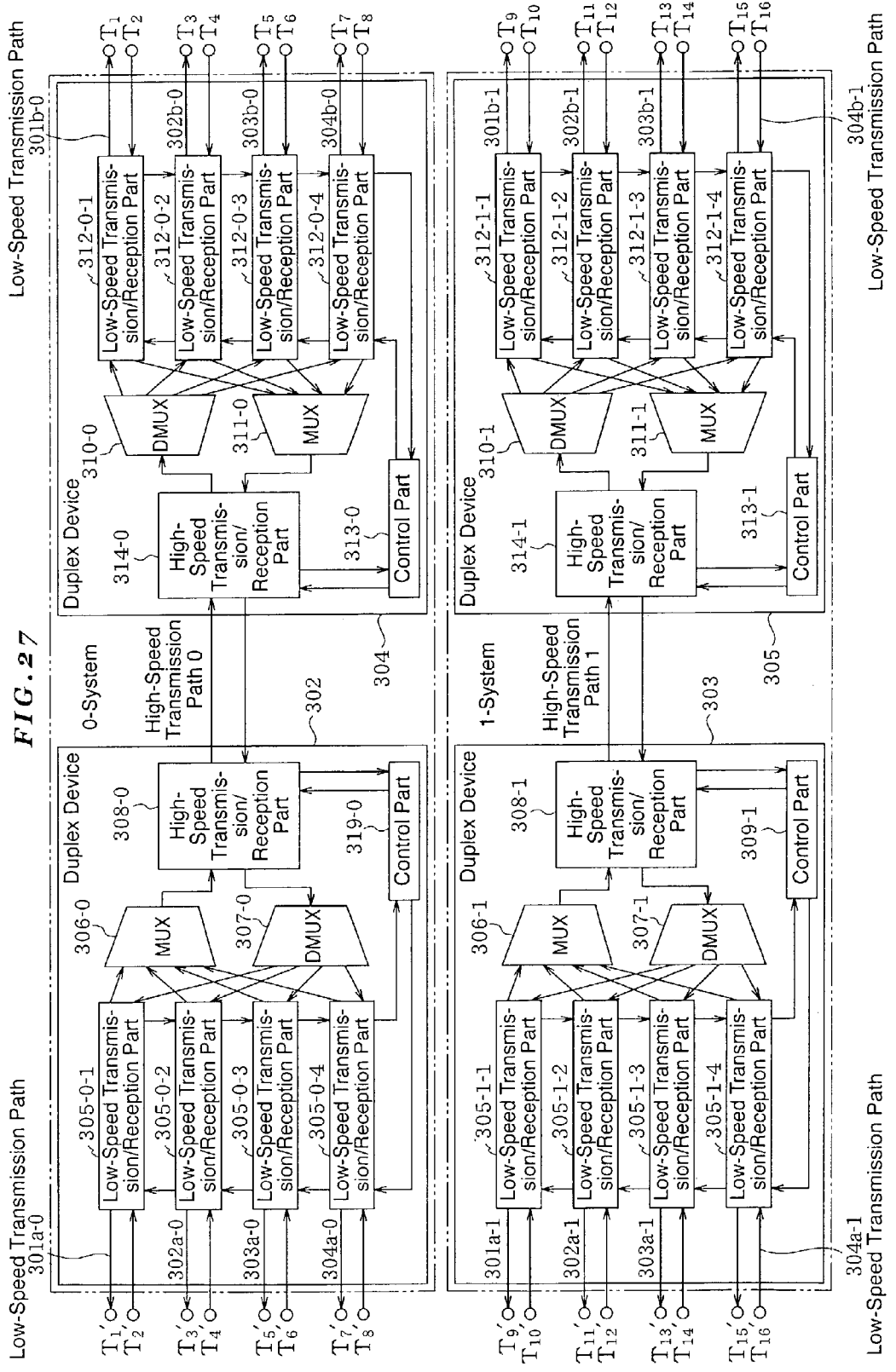
FIG. 27 is a block diagram showing the configuration of the multiplex system according to the embodiment of the present invention.
Figure 28:
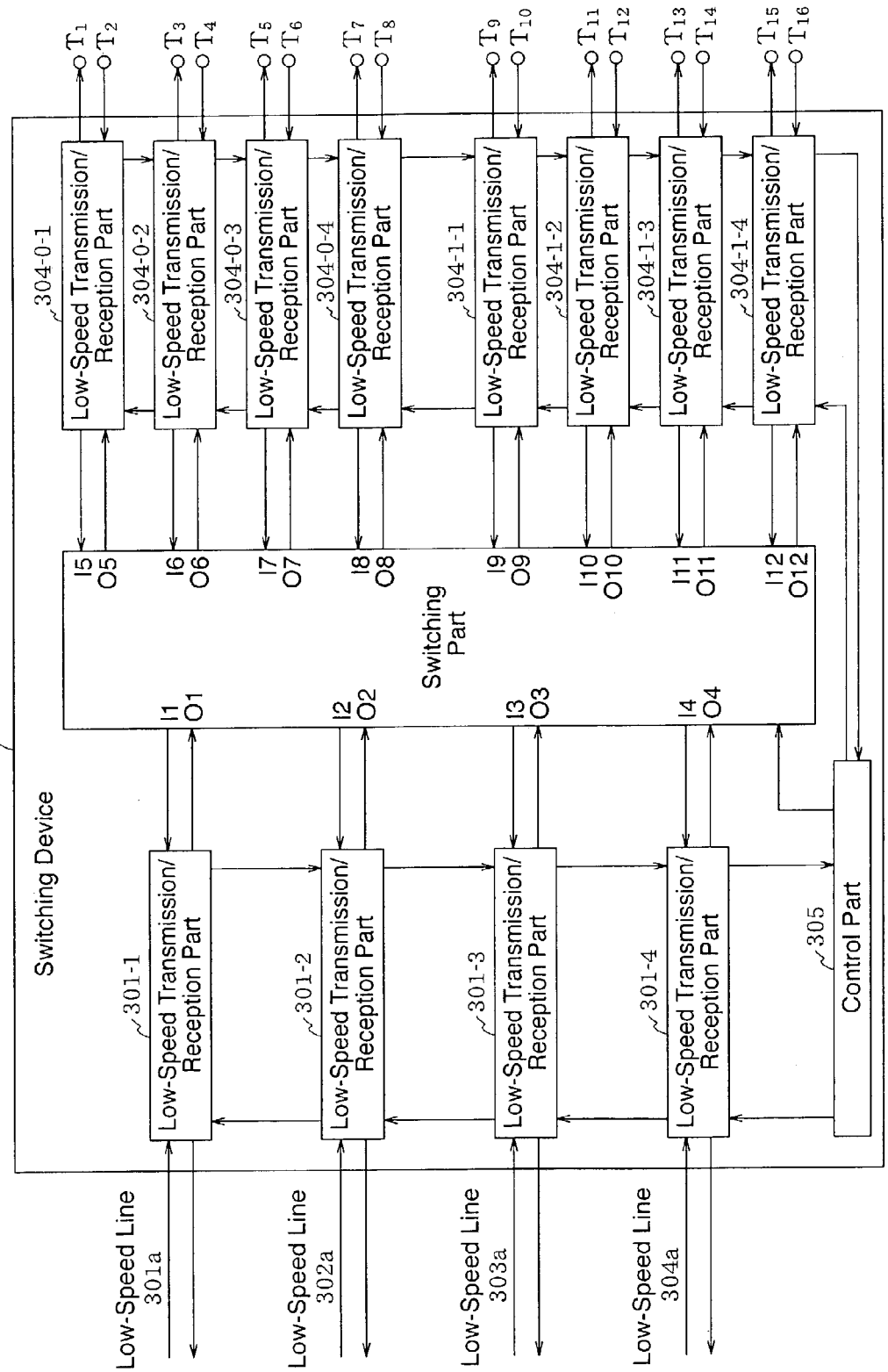
FIG. 28 is a block diagram showing the configuration of the multiplex system according to the embodiment of the present invention.

FIG. 26 to FIG. 28 are block diagrams for showing the configuration of another Example according to the present invention. The Example will be described by referring to FIG. 26 to FIG. 28.

In the Example, as shown in FIG. 26 to FIG. 28, the switching devices 301 and 306 shown in FIG. 23 to FIG. 25 are replaced with switching devices 301' and 306' having the inside structure different from that of the switching devices 301 and 306. In the Example, as for the structural parts of the switching devices 301' and 306', the operation towards the outside of low-speed transmission/reception parts 301-1' to 301-4', 304-0-1' to 304-0-4', 304-1-1' to 304-1-4', 317-1' to 317-4', 314-0-1' to 314-0-4', 314-1-1' to 314-1-4' and control parts 305', 318' are the same as that of the low-speed transmission/reception parts 301-1 to 301-4, 304-0-1 to 304-0-4, 304-1-1 to 304-1-4, 317-1 to 317-4, 314-0-1 to 314-0-4, 314-1-1 to 314-1-4 and the control parts 305, 318, respectively. Thus, only the inside operation of each of the switching devices 301' and 306' will be described below.

In the Example, a switching part 320 is provided in between the low-speed transmission/reception parts 301-1' to 301-4' and the low-speed transmission/reception parts 304-0-1' to 304-0-4', 304-1-1' to 304-1-4' of the switching device 301', and a switching part 321 is provided in between the low-speed transmission/reception parts 317-1' to 317-4' and the low-speed transmission/reception parts 314-0-1' to 314-0-4', 314-1-1' to 304-1-4' of the switching device 306'.

Each of the switching parts 320 and 321 has twelve input ports and twelve output ports. Any of the output ports is not to be affected by other output ports. The switching parts 320 and 321 are capable of selecting one port out of all the input ports and of switching the selected port according to the selecting instruction from the control part 305'.

In the switching parts 320 and 321 at the initial state, the output port 1 is connected to the input port 5, the output port 2 to the input port 6, the output port 3 to the input port 7, the output port 4 to the input port 8, the output port 5 to the input port 1, the output port 6 to the input port 2, the output port 7 to the input port 3, the output port 8 to the input port 4, the output port 9 to the input port 1, the output port 10 to the input port 2, the output port 11 to the input port 3, and the output port 12 to the input port 4.

In the normal state, the data inputted from the low-speed line 301a is converted to electric signal in the low-speed transmission/reception part 301-1', copied in the switching part 320, and then outputted to the low-speed transmission paths 301a-0 and 301a-1 from the low-speed transmission/ reception parts 304-0-1' and 304-1-1'. The data is then multiplexed with data from another low-speed transmission path in the multiplex devices 302, 303 and then outputted to the high-speed transmission path 0 and the high-speed transmission path 1. Subsequently, the data are separated from the data from another transmission path in the multiplex devices 304, 305 and outputted to the low-speed transmission paths 301b-0 and 301b-1. The data inputted to the low-speed transmission/reception parts 314-0-1', 314-1-1' are transferred to the switching part 321 and the data inputted from the low-speed transmission/reception part 314-0-1' is selected to be outputted to the low-speed line 301b. In the same manner, the data in the reverse direction is copied in the switching part 321, and inputted to the low-speed transmission/reception parts 304-0-1', 304-1-1' of the switching device 301' through the multiplex devices 304, 302, and the multiplex devices 305, 303. The data are then inputted to the switching part 320 and the data inputted from the low-speed transmission/reception part 304-0-1' is selected to be outputted to the low-speed line 301a. In the manner as described, it enables a bi-directional communication between the low-speed line 301a and the low-speed line 301b.

Next, operation of the Example in the case where, in the normal state, there is a fault generated in the high-speed transmission path 0 in the direction from the multiplex device 302 to the multiplex device 304 will be described.

When there is a fault generated in the high-speed transmission path 0 in the direction from the multiplex device 302 to the multiplex device 304, the high-speed transmission/ reception part 314-0 of the multiplex device 304 detects the input fault and notifies the control part 313-0. Also, it notifies the input fault to the multiplex device 302 via the high-speed transmission path 0 through interrupting the optical output to the high-speed transmission path 0 (or adding an input fault notification signal to the output signal).

The control part 313-0 of the duplex device 304, upon receiving the notification of the input fault, outputs an instruction to the low-speed transmission/reception parts 312-0-1 to 312-0-4 for interrupting the output. The low-speed transmission/reception parts 312-0-1 to 312-0-4, upon receiving the instruction for interrupting the output from the control part 313-0, notifies the fault in the transmission path to the low-speed transmission/reception parts 314-0-1 to 314-0-4 of the switching device 306' as the receiving device by interrupting the optical output to the low-speed transmission paths 301b-0 to 304b-0.

The low-speed transmission/reception parts 314-0-1' to 314-0-4' of the switching device 306' detect the input fault and notify the control part 318'. The control part 318', upon receiving notification of the input fault from the low-speed transmission/reception parts 314-0-1' to 314-0-4', outputs an instruction to the output ports 1 to 4 of the switching part 321 for switching the selection ports to the input ports 9 to 12 when the input fault is not notified from the low-speed transmission/reception parts 314-1-1' to 314-1-4' within a certain time. The switching part 321 switches the output data of the output ports 1 to 4 from the data of the low-speed transmission/reception parts 314-0-1' to 314-0-4' to the data of the low-speed transmission/reception parts 314-1-1' to 314-1-4' according to the instruction from the control part 318'.

On the other hand, in the multiplex device 302, the high-speed transmission/reception part 308-0, upon receiving the notification of the input fault, notifies the input fault to the control part 309-0. The control part 309-0, upon receiving the notification of the input fault, outputs an instruction to the low-speed transmission/reception parts 305-0-1 to 305-0-4 for interrupting the output. The low-speed transmission/reception parts 305-0-1 to 305-0-4, when receiving the instruction for interrupting the output, interrupts the optical output to the low-speed transmission paths 301a-0 to 304a-0 thereby to notify the fault in the transmission path to the low-speed transmission/reception parts 304-0-1' to 304-0-4' of the switching device 301' as the receiving device.

The low-speed transmission/reception parts 304-0-1' to 304-0-4' of the switching device 301' detect the input fault and notify the control part 305'. The control part 305', upon receiving notification on the input fault from the low-speed transmission/reception parts 304-0-1' to 304-0-4', outputs an instruction to the output ports 1 to 4 of the switching part 320 for switching the selection ports to the input ports 9 to 12 when the input fault is not notified from the low-speed transmission/reception parts 304-1-1' to 304-1-4' within a certain time. The switching part 320 switches the output data from the data of the low-speed transmission/reception parts 304-0-1' to 304-0-4' to the data of the low-speed transmission/reception parts 304-1-1' to 304-1-4' according to the instruction from the control part 305'.

In the manner as described above, switching of the transmission paths is performed by changing the operation system from the 0-system transmission path to the 1-system transmission path when there is a fault generated in the high-speed line 0a.

Next, operation of the Example in the case where, in the normal state, there is a fault generated in the low-speed transmission path 310a-0 in the direction from the switching device 301' to the multiplex device 302 will be described.

When there is a fault generated in the low-speed transmission path 301a-0 in the direction from the switching device 301' to the multiplex device 302, the low-speed transmission/reception path 305-0-1 detects the input fault and notifies the input fault to the control part 309-0. The control part 309-0, upon receiving the input fault notification from the low-speed transmission/reception part 305-0-1, gives an instruction to the MUX part 306-0 to generate the input fault detection pattern for the corresponding channel to be multiplexed therewith. The MUX part 306-0 inserts the input fault detection pattern instead of the data of the corresponding channel and the pattern is multiplexed with the data of another channel. The input fault detection pattern inserted in the MUX part 306-0 is transmitted to the multiplex device 304.

In the multiplex device 304, the DMUX part 310-0 detects the input fault detection pattern. The DMUX part 310-0 then notifies the fault of the corresponding channel to the control part 313-0. The control part 313-0 outputs an instruction for interrupting the output to the low-speed transmission/reception part 312-0-1. The low-speed transmission/reception part 312-0-1 interrupts the optical output to the low-speed transmission path 301*b*-0 thereby to notify the transmission path fault of the corresponding channel to the switching device 306'.

The low-speed transmission/reception part 314-0-1' of the switching device 306' when detecting the transmission path fault, notifies the transmission path fault of the corresponding channel to the control part 318'. The control part 318' outputs an instruction to the low-speed transmission/reception part 314-0-1' for interrupting the output, and outputs an instruction to the output port 1 of the switching part 321 for switching the selection port to the input port 9 when the transmission path fault notification is not inputted from the low-speed transmission/reception part 314-1-1' within a certain time. The switching part 321 switches the selection port of data according to the switching instruction from the control part 318'. The low-speed transmission/reception part 314-0-1', upon receiving the instruction for interrupting the output from the control part 318', interrupts the optical output thereby to interrupt the transmission path fault to the multiplex device 304.

The low-speed transmission/reception part 312-0-1 of the multiplex device 304, when detecting the transmission path fault, notifies the fault to the control part 313-0. The control part 313-0 then outputs an instruction to the MUX part 311-0 to insert the transmission path fault detection pattern. The MUX part 311-0 inserts the transmission path fault detection pattern instead of the data of the corresponding channel and transmits it to the multiplex device 302 through the high-speed transmission/reception part 314-0.

The DMUX part 307-0 of the multiplex device 302, when detecting the transmission path fault detection pattern and the transmission path fault channel, notifies the transmission path fault of the corresponding channel to the control part 309-0. The control part 309-0 outputs an instruction to the low-speed transmission/reception part 305-0-1 for interrupting the output, and the low-speed transmission/reception part 305-0-1 interrupts the optical output to the low-speed transmission path 301*a*-0.

The low-speed transmission/reception path 304-0-1' of the switching device 301' detects the transmission path fault and notifies the transmission path fault to the control part 305'. The control part 305', after receiving the notification of the transmission path fault from the low-speed transmission/reception path 304-0-1', outputs an instruction to the output port 1 of the switching part 320 for switching the selection port to the input port 9 when the notification on the transmission path fault is not received from the low-speed transmission/reception part 304-1-1' as the standby system transmission path within a certain time. The output port 1 of the switching part 320 switches data from the data of the low-speed transmission/reception part 304-0-1 to the data of the low-speed transmission/reception part 304-1-1. In the manner as described, switching of the 0-system transmission path to the 1-system transmission path is performed when there is a transmission path fault generated in the direction from the switching device 301' to the multiplex device 304.

Figure 29:
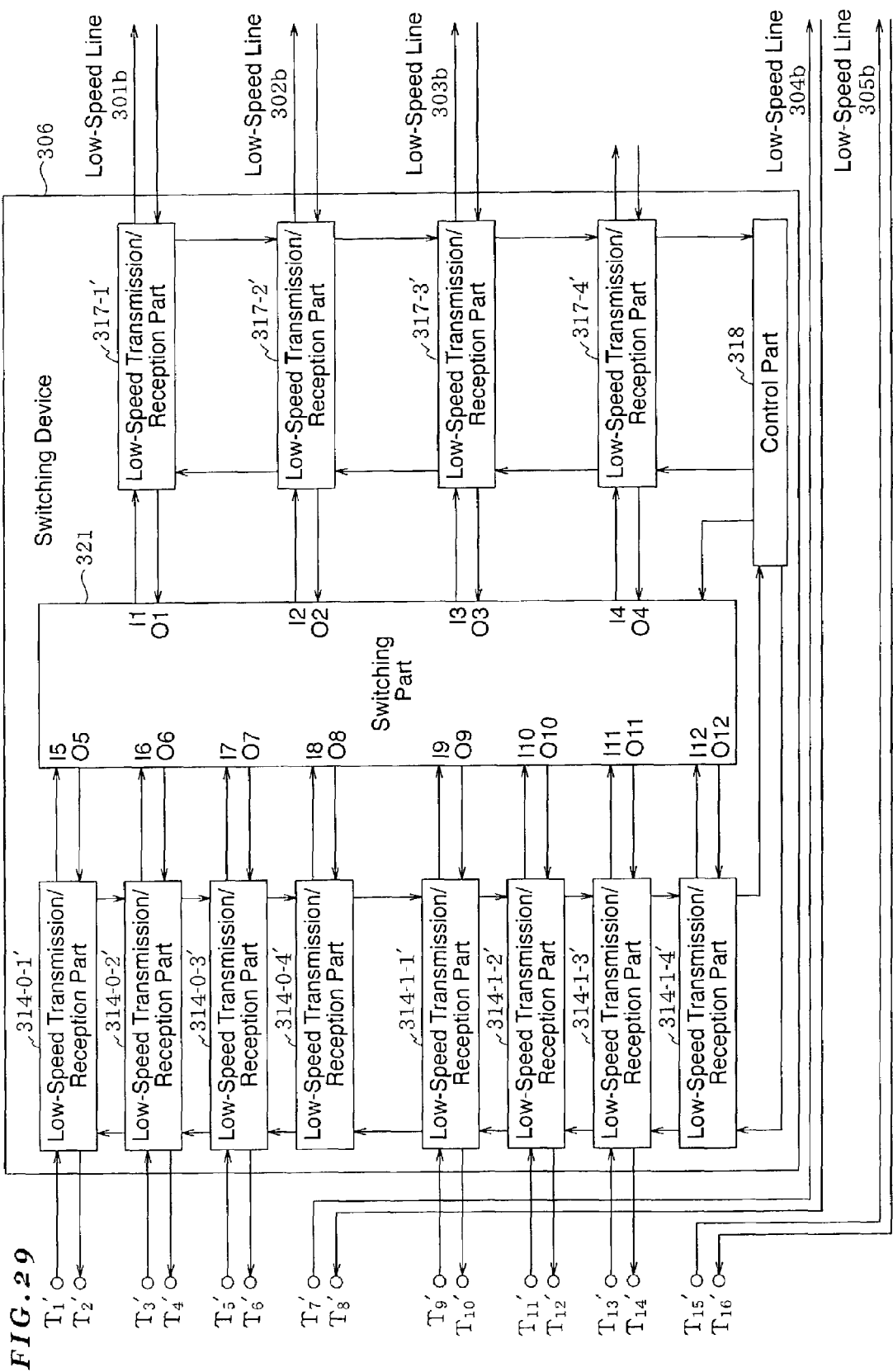
FIG. 29 is a block diagram showing the configuration of still another multiplex system according to the embodiment of the present invention.
Figure 30:
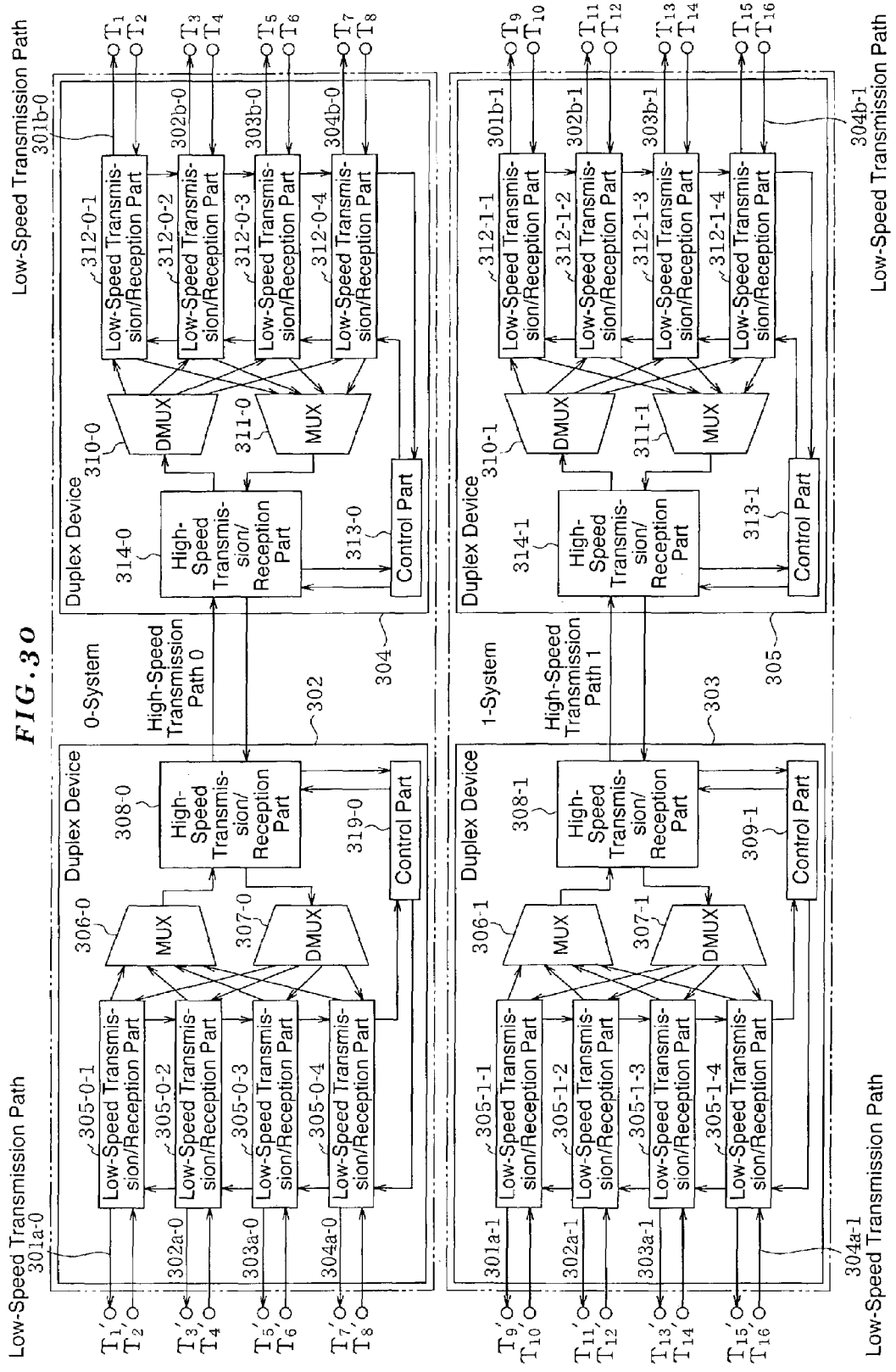
FIG. 30 is a block diagram showing the configuration of the still another multiplex system according to the embodiment of the present invention.
Figure 31:
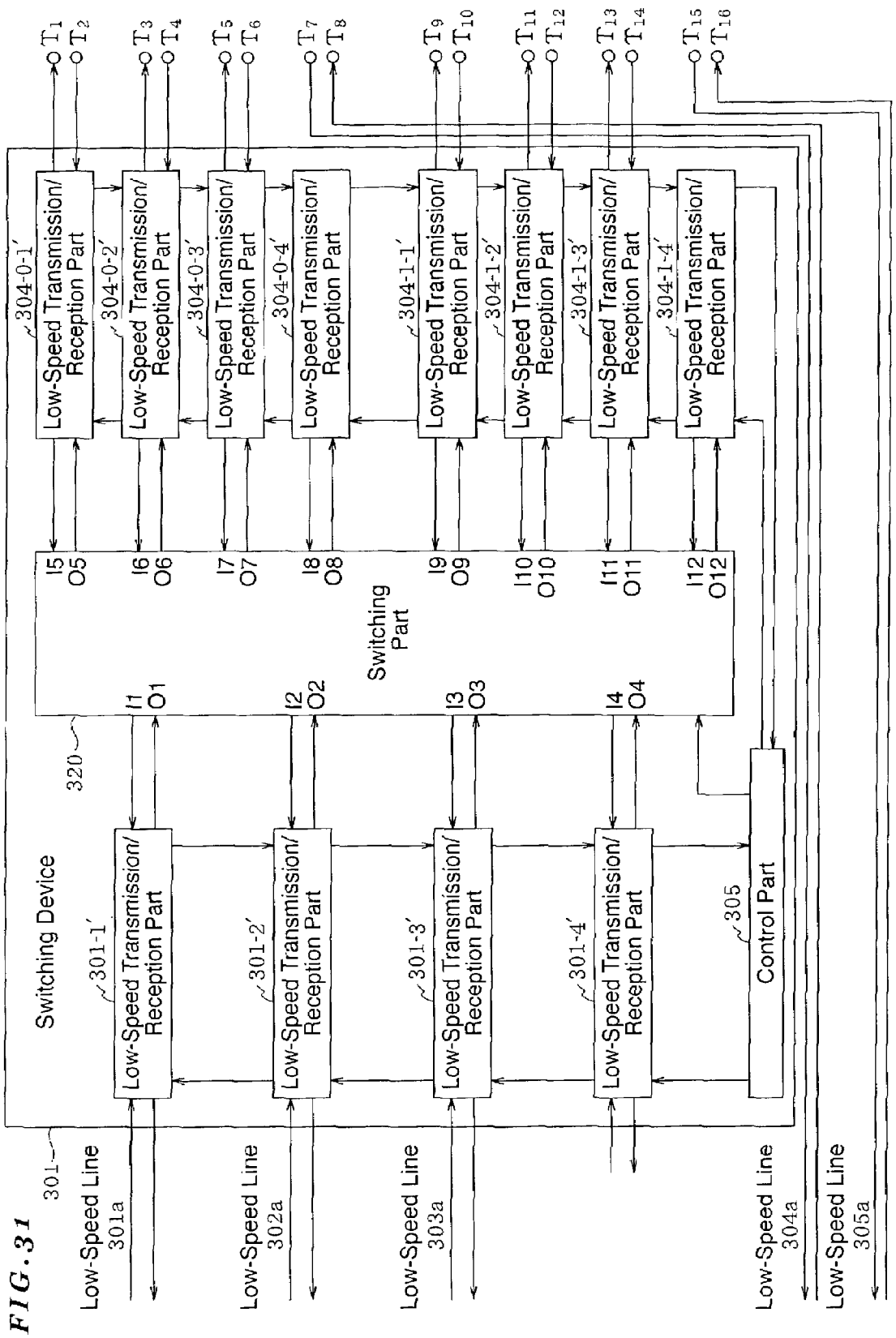
FIG. 31 is a block diagram showing the configuration of the still another multiplex system according to the embodiment of the present invention.

FIG. 29 to FIG. 31 show an example using the system of the above-described Example. It is an example of the system comprising three user lines with transmission duplex service and two user lines with the single transmission path service.

The users of the transmission path duplex service (the user using the low-speed transmission lines 301*a* to 303*a* and the low-speed transmission lines 301*b* to 303*b*) are stored in the multiplex device via the switching devices 301' and 304', while the users of the single transmission service (the user of the low-speed lines 304*a*, 305*a*, 304*b*, and 305*b*) are directly stored in the multiplex device without passing through the switching devices. Specifically, the low-speed lines 304*a*, 305*a*, 304*b* and 305*b* are connected to the low-speed transmission/reception parts 305-0-4, 305-1-4, 312-0-4, and 312-1-4. Other configuration is the same as that of the Example shown in FIG. 26 to FIG. 28. The configuration described here is also applicable to the Example shown in FIG. 26 to FIG. 28.

The users of the transmission path duplex service can avoid to be in the incommunicable state when there is a fault generated in either the 0-system transmission path or the 1-system transmission path. However, for the users of the single transmission path service, the service is to be down when there is a fault generated in the transmission line the users belong to. Thus, the single transmission path service can be provided at a lower price than that of the transmission path duplex system.

The present invention is formed in the manner as described. Therefore, it can achieve the effects as described below. The first effect is, in the communication system such as Ethernet using data communication protocol in which no alarm transfer function is defined, to be able to improve the reliability through duplicating the relay transmission paths and switching the transmission paths in a short time when a fault is generated. This can be achieved since, when the fault in the transmission path is detected, the generation of fault is notified to the up and down direction of the communication using the transmission path, and also the fault can be detected in a short time through using a method of interrupting the optical output to the optical transmission path in each device as the method for notifying the fault.

The second effect is that a flexible service can be provided and the device can be effectively utilized. The reason is for this is that, since the switching function for duplicating the transmission path is separated from the multiplex deice, it is possible that the lines of the users using the duplex service of the transmission path are connected to the multiplex device through the switching device, and the lines of the users (single service) who do not use the duplex service are directly connected to the multiplex device. Therefore, the number of users stored in the system can be increased. For example, if there is a multiplex device for multiplexing four channels and the number of the users using the transmission path duplex service is three, the total number of the users using the transmission path duplex service or the single service is to be four in the multiples system in which the switching function is unified, and to be five in the system in which the switching function is separated (FIG. 29 to FIG. 31).

The third effect is that the switching device can be connected to devices with various types of communication protocols. The reason is that the switching is performed through detecting the loss of optical or electrical signals so that the switching device does not depend on the communication protocol or the transmission medium.

The fourth effect is that it is capable of avoiding the incommunicable state when there are faults generated in a plurality of points. The reason is that, although a plurality of lines are stored in the switching device, it has a configuration in which each line can be individually switched so that the generation of double-faults can be restored. For example, when a fault is being generated in the low-speed transmission path 301a-0 and the low-speed line 301a is in operation by the 1-system, if a fault is simultaneously generated on the low-speed transmission path 302a-1 side, the low-speed line 302a can be operated by the 0-system. Therefore, the operation can be continued with no cut in the line.

By applying the multiplex communication system of the present invention described above to Ethernet, it becomes possible to monitor the network in a communication system which performs communication between computers using Ethernet. Next, the advantages of the case in which the multiplex communication system of the present invention is applied to the communication system using Ethernet will be described in detail by making comparison to the conventional example.

Conventionally, when using Ethernet for communication between computers (especially, personal computers), supervisory monitoring of network as the Internet has not been performed. This is due to the fact that the Internet is originally provided on the basis of "Best Effort Service" (a service that can be used when the band is available, but no guarantee for the band and the quality). However, there has been the movement for using the Internet as the basic system network and in such a case, it is necessary to guarantee the band and the quality. For example, it is necessary to achieve the protection function which restores the fault in the line by switching the line to the standby transmission path when the fault is generated in the transmission path in order to guarantee the quality.

In the duplex method of the transmission device performed by SDH (Synchronous Digital Hierarchy), the signal inputted from the terminal is branched and multiplexed to be connected to the present system path and the standby system path, and in the selection device for selecting the present system path and the standby system path, the present system path is switched to the standby system path when there is a fault in the present system path.

Figure 37:
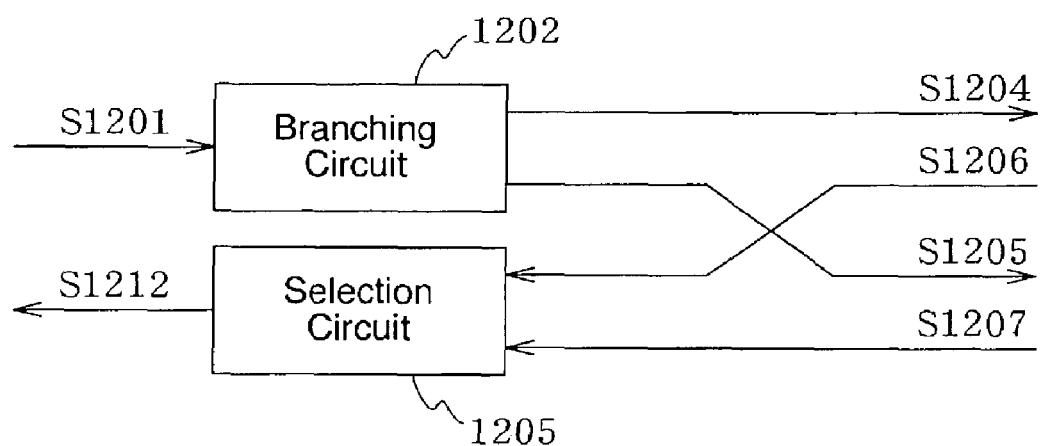
FIG. 37 is a block diagram showing the configuration of a conventional duplex device.

FIG. 37 is a block diagram showing the configuration of a conventional duplex device. A branching circuit 1202 branches a signal S1201 into signals S1204 and S1205. A selection circuit 1205 selects either one of a selected signal S1206 or a selected signal S1207 and output it as a signal S1212. The branching circuit 1202 and the selection circuit 1205 are provided in between the Ethernet terminal and Ethernet terminating device. The selection circuit 1205 selects the present system signal (for example, S1206) and, when there is a fault in the present system, selects the standby system signal (for example, S1207).

At the time of a fault generated in the transmission path, when data from the terminal is terminated once and is capsulized by a technique such as GFP (Generic Framing Procedure) or the like to be transferred through the relay section, data link control between the terminals cannot be performed. Therefore, the generation of fault is notified to the opposing device by defining the alarm transfer frame.

At present, the Internet has not been used as the basic system network as described above, so that switching to the standby transmission path is not performed.

In Ethernet, normality of the paths including the Ethernet terminals and the Ethernet terminating devices is judged based on whether or not the link between the Ethernet terminals and the Ethernet terminating devices is established.

In the case where the above-described SDH switching method is applied as it is to the switching method of Ethernet path, when the present system is normal, the Ethernet terminating device can receive signals from the Ethernet terminals by the auto-negotiation between the standby system Ethernet terminals and the Ethernet terminating device. However, the auto-negotiation cannot be completed since the signals transmitted from the device itself are not connected to Ethernet terminals. As a result, link between the standby system Ethernet terminals and the Ethernet terminating device cannot be established. Therefore, the control device for performing switching of the present system and the standby system recognizes as if there is a fault generated in the standby system path even though the standby system path is in a normal state. Thus, the switching is not performed.

An object of the present invention is, in the case where the above-described Ethernet is used as the basic system network, to achieve the Ethernet redundant method and the system which can properly perform switching to the standby system through judging the normal state when the standby system Ethernet path is normal.

In order to achieve the foregoing object, the Ethernet redundant system according to the present invention comprises: a plurality of paths formed in an Ethernet terminating device for connecting between Ethernet terminals in duplex; and a duplex switch provided between the both Ethernet terminals and a plurality of the paths for connecting the Ethernet terminals to the Ethernet terminating device forming a present system path, and connecting the Ethernet terminating device forming a standby system path in such a manner that the output to be an input, and for switching the present system path to the standby system path when there is a fault in the present system path. In this case, a relay may be provided in the paths.

Also, the duplex switch may comprise first to third input terminals and output terminals to be capable of connecting each input terminal and output terminal at will.

Also, the duplex switch may comprise: a first branching circuit and a first selection circuit provided for the Ethernet terminals; and a second and a third branching circuits and a second and a third selection circuits provided, respectively, for each Ethernet terminating device forming the present system and the standby system paths. The first branching circuit may branch a signal from the Ethernet terminals and output the branched signals to the second and third selection circuits; each of the second and third branching circuits may branch a signal from the corresponding Ethernet terminating device and output the branched signals to the first, the second and the third selection circuits; the first selection circuit may select a signal from the branching circuit provided for the Ethernet terminating device forming a present system path and output the signal to the Ethernet terminal; the second selection circuit may select a signal from the first branching circuit and outputs the signal to the corresponding Ethernet terminating device; and the third selection circuit may select a signal from the third branching circuit and outputs the signal to the corresponding Ethernet terminating device.

Another Ethernet redundant system according to the present invention comprises: a plurality of paths formed in an Ethernet terminating device for connecting between Ethernet terminals in N-multiplex; and an N-multiplex switch provided between the both Ethernet terminals and a plurality of the paths for connecting the Ethernet terminals to the Ethernet terminating device forming a present system path, and connecting the Ethernet terminating device forming a standby system path in such a manner that the output to be an input, and for switching the present system path to the standby system path when there is a fault in the present system path. In this case, a relay is provided in the paths.

The N-multiplex switch may comprise a plurality of input terminals and output terminals to be capable of connecting each input terminal and output terminal at will.

Also, the N-multiplex switch may comprise: a branching circuit and a selection circuit provided for the Ethernet terminals; and a plurality of branching circuits and selection circuits provided, respectively, for each Ethernet terminating device forming a plurality of paths. The branching circuit provided for the Ethernet terminal may branch a signal from the Ethernet terminal and outputs the branched signals to a plurality of the selection circuits provided for each Ethernet terminating device; each of a plurality of the branching circuits provided for each Ethernet terminating device may branch a signal from the corresponding Ethernet terminating device and output the branched signals to the selection circuit provided for the Ethernet terminal and the selection circuit provided for the corresponding Ethernet terminating device; the selection circuit provided for the Ethernet terminal may select a signal from the branching circuit provided for the Ethernet terminating device forming a present system path and output the signal to the Ethernet terminal; the selection circuit provided for the Ethernet terminal forming the present system path may select a signal from the branching circuit provided for the Ethernet terminal and outputs the signal to the corresponding Ethernet terminating device; and the selection circuit provided for the Ethernet terminating device forming the standby system path may select a signal from the branching circuit provided for the corresponding Ethernet terminating device and outputs the signal to the corresponding Ethernet terminating device.

The Ethernet redundant system according to the present invention comprises: a plurality of paths formed in an Ethernet terminating device for connecting between Ethernet terminals in duplex; and a duplex switch provided between the both Ethernet terminals and a plurality of the paths for connecting the Ethernet terminals to the Ethernet terminating device forming a present system path, and connecting the Ethernet terminating device forming a standby system path in such a manner that the output to be an input, and for switching the present system path to the standby system path when there is a fault in the present system path.

In this case, a switch may be used as the duplex switch, comprising first to third input terminals and output terminals and capable of connecting each input terminal and output terminal at will.

Further, as the duplex switch, a switch may be used comprising: a first branching circuit and a first selection circuit provided for the Ethernet terminal; and a second and third branching circuits and a second and a third selection circuits provided, respectively, for each Ethernet terminating device forming the present system and the standby system paths, in which the first branching circuit branches a signal from the Ethernet terminal and output the branched signals to the second and third selection circuits; each of the second and third branching circuits branch a signal from the corresponding Ethernet terminating device and output the branched signals to the first selection circuit and the second and thirds selection circuits; the first selection circuit selects a signal from the branching circuit provided for the Ethernet terminating device forming a present path and output the signal to the Ethernet terminal; the second selection circuit selects a signal from the first branching circuit and outputs the signal to the corresponding Ethernet terminating device; and the third selection circuit selects a signal from the third branching circuit and outputs the signal to the corresponding Ethernet terminating device.

Another Ethernet redundant method according to the present invention comprises the steps of: providing a plurality of paths formed in an Ethernet terminating device for connecting in between Ethernet terminals in N-multiplex; and providing an N-multiplex switch provided between the both Ethernet terminals and a plurality of the paths for connecting the Ethernet terminals to the Ethernet terminating device forming a present system path, and connecting the Ethernet terminating device forming a standby system path in such a manner that the output to be an input, and for switching the present system path to the standby system path when there is a fault in the present system path.

In this case, as the N-multiplex switch, a switch comprising a plurality of input terminals and output terminals and capable of connecting each input terminal and output terminal at will may be used.

Further, as the N-multiplex switch, a switch may be used comprising: a branching circuit and a selection circuit provided for the Ethernet terminals; and a plurality of branching circuits and selection circuits provided for each Ethernet terminating device forming a plurality of paths, respectively, in which the branching circuit provided for the Ethernet terminating device branches a signal from the Ethernet terminals and outputs the branched signals to a plurality of the selection circuits provided for each Ethernet terminating device; each of a plurality of the branching circuit provided for each Ethernet terminating device branch a signal from the corresponding Ethernet terminating device and output the branched signals to the selection circuit provided for the Ethernet terminal and the selection circuits provided for the corresponding Ethernet terminating device; the selection circuit provided for the Ethernet terminal selects a signal from the branching circuit provided for the Ethernet terminating device forming a present system path and output the signal to the Ethernet terminal; the selection circuit provided for the Ethernet terminating device forming the present system path selects a signal from the branching circuit provided for the Ethernet terminal and outputs the signal to the corresponding Ethernet terminating device; and the selection circuit provided for the corresponding Ethernet terminating forming the standby system path device selects a signal from the branching circuit provided for the corresponding Ethernet terminating device and outputs the signal to the corresponding Ethernet terminating device.

In the present invention formed as described, in the. Ethernet terminating devices forming the standby system path, output and input are connected in return form. Therefore, it looks as if it is connected to the Ethernet terminals and the link is established. As a result, when switching the path from the present system to the standby system, the standby system path is judged as normal and the switching is performed.

Figure 32:
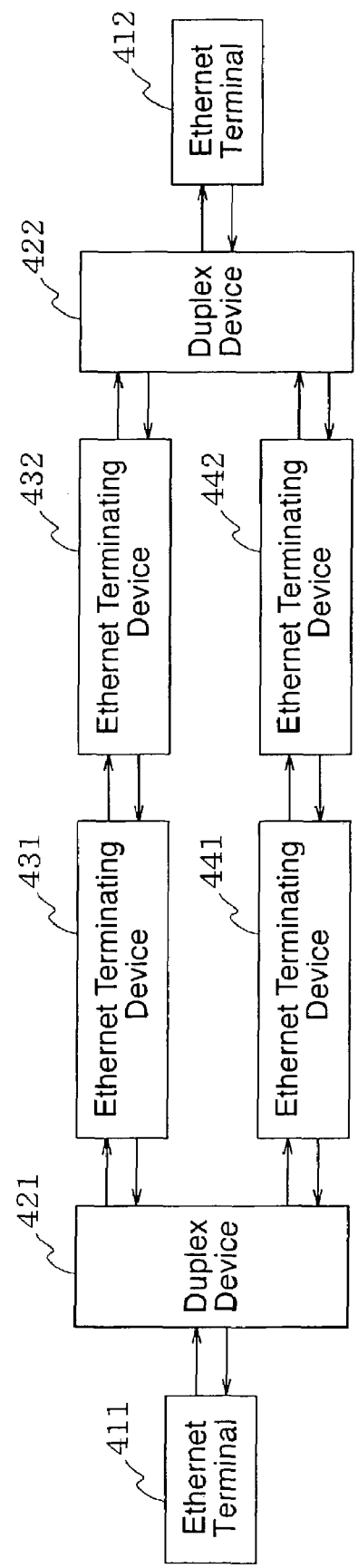
FIG. 32 is a block diagram showing the configuration of an Example of a communication system according to the present invention.

Next, an Example of the present invention will be described by referring to the drawings. The Example, as shown in FIG. 32, comprises Ethernet terminals 411, 412, duplex devices 421, 422, and Ethernet terminating terminals 431, 432, 441, 442.

The Ethernet terminals 411 and 412 are connected to the duplex 421, 422 which are connected each other via the Ethernet terminating device 431, 432, 441 and 442. The Ethernet terminating device 431 and the Ethernet terminating device 432 are positioned opposing to each other and the Ethernet terminal 441 and the Ethernet terminal 442 are positioned opposing to each other. The Ethernet terminal 411 and the Ethernet terminal 412 are connected via a first path going through the duplex devices 421, 422, the Ethernet terminating terminals 431, 432 and via a second path going through the duplex device 421, 422, Ethernet terminating terminals 441, 442.

Link establishing control in Ethernet is performed between the Ethernet terminals 411, 412 and the Ethernet terminating devices 431, 432, 441, 442. In between the Ethernet terminating devices 431, 432, 441, and 442, data is capsulized by GFP or the like to be transferred after terminating MAC (Media Access Control) layer of Ethernet.

The Ethernet terminating devices 431, 432, 441 and 442 perform alarm transfer to the opposing Ethernet terminating devices when a fault is generated. The Ethernet terminating devices, upon receiving the alarm notification, notifies the fault notification to the duplex devices 421 and 422 through interrupting the output signals to the duplex devices 421 and 422.

Figure 33:
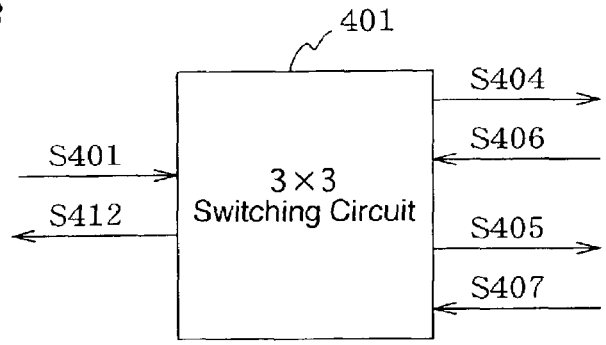
FIG. 33 is a block diagram showing the configuration of the duplex device shown in FIG. 32.

The duplex devices 421 and 422, as shown in FIG. 33, comprise a 3×3 switching circuit 401. With the 3×3 switching circuit 401, it becomes possible to output an input signal S401 as either an output signal S404 or an output signals 405 at will, or to output either an input signal S406 or an input signal S407 as an output signal S412 at will.

The switching operation of the 3×3 switching circuit 401 of the Example is performed by control devices (not shown) provided in the duplex devices 421 and 422. The control devices detect the signal state passing through the 3×3 switching circuit 401 and switches the 3×3 switching circuit 401 according to the state.

In the case of the Example as shown in FIG. 32, the duplex device 411 is connected to the Ethernet terminal 412 via the input signal S401 and the output signal S412. It is also connected to the Ethernet terminating device 431 via the input signal S406 and the output signal S404, and connected to the Ethernet terminating device 441 via the input signal S407 and the output signal S405. Further, the duplex device 422 is connected to the Ethernet terminal 412 via the input signal S401 and the output signal S412. It is also connected to the Ethernet terminating device 432 via the input signal S406 and the output signal S404, and connected to the Ethernet terminating device 442 via the input signal S407 and the output signal S405.

Next, operation of the Example will be described. When the path through the Ethernet terminating devices 431, 432 is used as the present system and the path through the Ethernet terminating devices 441, 442 is used as the standby system, in the duplex device 421, the input signal S401 from the Ethernet terminal 411 is switched in the 3×3 switching circuit 401 to the output signal S404 for the Ethernet terminating device 431, the input signal S406 from the Ethernet terminating device 431 to the output signal S412 for the Ethernet terminal 411, and the input signal S407 from the Ethernet terminating device 441 to the output signal S405 for the Ethernet terminating device 441.

In the same manner, in the duplex device 422, the input signal S401 from the Ethernet terminal 412 is switched in the 3×3 switching circuit 401 to the output signal S404 for the Ethernet terminating device 432, the input signal S406 from the Ethernet terminating device 432 to the output signal S412 for the Ethernet terminal 412, and the input signal S407 from the Ethernet terminating device 442 to the output signal S405 for the Ethernet terminating device 442.

By providing the above-described connection state, the link between the Ethernet terminal 411 and the Ethernet terminating device 431 is established, and the link between the Ethernet terminal 412 and the Ethernet terminating device 432 is also established. Also, it looks as if the Ethernet terminating devices 441, 442 are connected to the Ethernet terminals 411, 412 so that the link is established.

Now, operation of the case where a fault is generated in the present path going through the Ethernet terminating devices 431 and 432 will be described. It will be described by referring to a case, as an example, where a fault is generated in the transmission path connected from the duplex device 421 to the Ethernet terminating device 431.

Due to a generating of the fault, the Ethernet terminating device 431 becomes incommunicable of data transmission and the auto-negotiation function operates thereby downing the link between with the Ethernet terminal 411 as the link partner. Also, the Ethernet terminating device 431 performs the alarm transfer to the opposing Ethernet terminating device 432.

Upon detecting the alarm notification transmitted from the Ethernet terminating device 431, the Ethernet terminating device 432 interrupts the signal outputted to the duplex device 422. The duplex device 422, upon detecting the non-input signal state from the Ethernet terminating device 432, switches the connection of the 3×3 switching circuit 401 thereby to connect the standby system path going through the Ethernet terminating devices 441, 442 to the Ethernet terminal 412 after confirming that the input signal from the standby system Ethernet terminating device 442 is not interrupted. Specifically, the input signal S401 from the Ethernet terminal 412 is switched to the output signal S405 for the Ethernet terminating device 442, the input signal S407 from the Ethernet terminating device 442 to the output signal S412 for the Ethernet terminal 412, and the input signal S406 from the Ethernet terminating device 432 to the output signal S404 for the Ethernet terminating device 432.

Before the path switching is performed in the duplex device 422, the signal outputted from the Ethernet terminating circuit 432 to the duplex device 422 is interrupted so that the signal inputted to the Ethernet terminal 412 is also to be interrupted. Thus, the link of the Ethernet terminating device 412 is in a down-state. In the Ethernet terminating device 412, the auto-negotiation function operates when the link becomes down thereby to start the operation for establishing the link between the link partner. Until the switching is performed in the duplex device 422, the link partner is the Ethernet terminating device 432. Thus, the incommunicable state continues and the link is not established. When the switching of the path is performed in the duplex device 422, the link partner of the Ethernet terminal 412 changes to the Ethernet terminating device 442. Thereby, the signal is connected and, by the auto-negotiation function, the link is established therebetween.

The Ethernet terminating device 431 interrupts the signal outputted to the duplex device 421 upon detecting the transmission path fault. The duplex device 421, upon detecting the non-input signal state from the Ethernet terminating device 431, switches the connection of the 3×3 switching circuit 401 thereby to make the standby system of Ethernet terminating device 441 the link partner of the Ethernet terminal 411. At this time, the operation of the duplex circuit 421 and the Ethernet terminal 411 is the same as that of the duplex device 422 and the Ethernet terminal 412 described above.

When the fault continues even after the connection of the 3×3 switching circuit 401 in the duplex device 421, 422 is switched, the Ethernet terminating device 431 continues to detect the fault while continuing to interrupts the output signal to the duplex device 421 and to transmit the alarm transfer to the Ethernet terminating device 432. Thereby, the duplex device 421 continues to detect the non-input signal state from the Ethernet terminating device 431 and the duplex device 422 continues to detect the non-input signal state from the Ethernet terminating device 432.

When the fault is restored, the Ethernet terminating device 431 cancels the fault detection and cancels the interruption of the output signal to the duplex device 421. At the same time, it cancels the alarm transfer to the Ethernet terminating device 432. The Ethernet terminating device 432 cancels the interruption of the output signal to the duplex device 422 when the alarm notification is not detected.

The duplex devices 421 and 422 detect that the initial present system path going through the Ethernet terminating devices 431, 432 has restored to the normal state based on the fact that the output signal from the Ethernet terminating devices 431, 432 to the duplex devices 421, 422 has returned to be normal. Also, the Ethernet terminating device 431 continues the auto-negotiation while the link is down. However, when the fault is restored, it looks as if it is communicable between with the Ethernet terminating device 411 and the link is reestablished. It is the same in the Ethernet terminating device 432.

Although not shown in FIG. 32, a relay for performing a long-distance transmission may be provided between the Ethernet terminating devices 431, 441, and the Ethernet terminating devices 432, 442.

In the Example formed in the manner as described, even in the case where the link between the present system Ethernet terminal and the Ethernet terminating device is established, it is possible to establish the link between the standby system Ethernet terminating device. Thus, the duplex device performing the switching can judge whether or not the standby system path is in the normal state and switches the Ethernet path to the standby system in the normal state when there is a fault generated in the present system.

Next, another Example of the present invention will be described. In the Example, the configuration of the duplex devices 421, 422 is provided different from that of the duplex devices 421, 422 shown in FIG. 32. However, other configuration is the same as that shown in FIG. 32.

Figure 34:
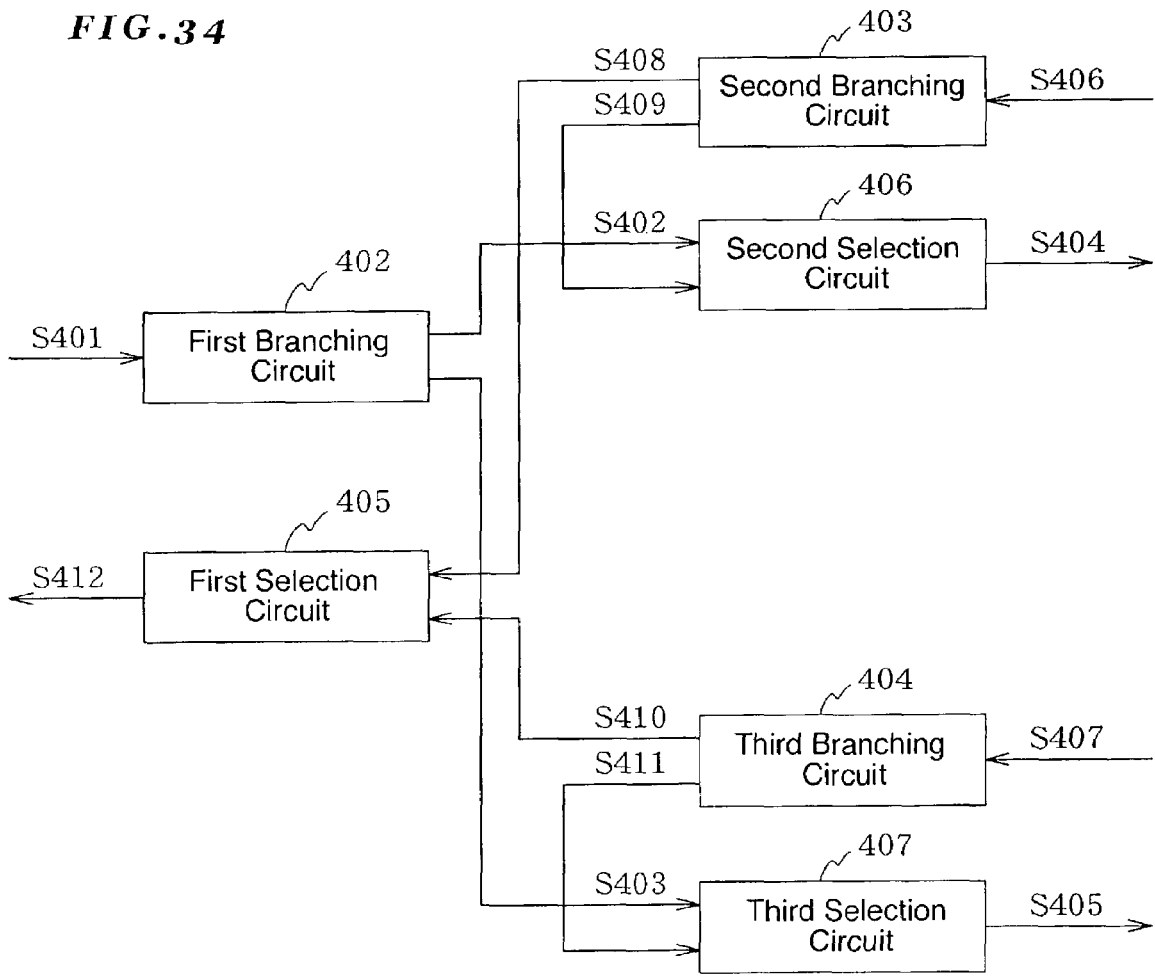
FIG. 34 is a block diagram showing the configuration of another Example of the duplex device shown in FIG. 32.

FIG. 34 is a block diagram showing the configuration of the duplex devices 421 and 422 of the Example. The duplex devices 421 and 422 of the Example comprise a first branching circuit 402, a second branching circuit 403, a third branching circuit 404, a first selection circuit 405, a second selection circuit 406 and a third selection circuit 407.

The first branching circuit 402 branches the input signal S401 into the signal S402 and the signal S403 and outputs the signals to the second selection circuit 406 and the third selection circuit 407, respectively. The second branching circuit 403 branches the input signal S406 into the signal S408 and the signal S409 and outputs the signals to the first selection circuit 405 and the second selection circuit 406, respectively. The third branching circuit 407 branches the input signal S407 into the signal S410 and the signal S411 and outputs the signals to the first selection circuit 405 and the third selection circuit 407, respectively. The first selection circuit 405 selects either one of the inputted signals S408 or S410 and output it as the signal S412. The second selection circuit 406 selects either one of the inputted signals S402 or S409 and output it as the signal S404. The third selection circuit 407 selects either one of the inputted signals S403 or S411 and output it as the signal S405.

The selection of the signals in the first to third selection circuits 405 to 407 of the Example is performed by control devices (not shown) provided in the duplex devices 421 and 422. The control device detects the state of the signals passing through the first to third selection circuits 405 to 407 and performs the switching of the first to third selection circuits 405 to 407 according to the state.

When the path through the Ethernet terminating devices 431, 432 is used as the present system and the path through the Ethernet terminating devices 441, 442 is used as the standby system, in the duplex device 421, the input signal S401 from the Ethernet terminal 411 is switched in the second selection circuit 406 to the output signal S404 for the Ethernet terminating device 431, the input signal S406 from the Ethernet terminating device 431 is switched in the first selection circuit 405 to the output signal S412 for the Ethernet terminal 411, and the input signal S407 from the Ethernet terminating device 441 is switched in the third selection circuit 407 to the output signal S405 for the Ethernet terminating device 441.

In the same manner, in the duplex device 422, the input signal S401 from the Ethernet terminal 412 is switched in the second selection circuit 406 to the output signal S404 for the Ethernet terminating device 432, the input signal S406 from the Ethernet terminating device 432 is switched in the first selection circuit 405 to the output signal S412 for the Ethernet terminal 412, and the input signal S407 from the Ethernet terminating device 442 is switched in the third selection circuit 407 to the output signal S405 for the Ethernet terminating device 442.

By providing the above-described connection state, the link between the Ethernet terminal 411 and the Ethernet terminating device 431 is established, and the link between the Ethernet terminal 412 and the Ethernet terminating device 432 is also established. Also, it looks as if the Ethernet terminating devices 441, 442 are connected to the Ethernet terminals 411, 412 so that the link is established.

Now, operation of the case where a fault is generated in the present system path through the Ethernet terminating devices 431 and 432 will be described. It will be described by referring to a case, as an example, where a fault is generated in the transmission path connected from the duplex device 421 to the Ethernet terminating device 431.

Due to a generation of the fault, the Ethernet terminating device 431 becomes incommunicable of data transmission and the auto-negotiation function operates thereby downing the link between with the Ethernet terminal 411 as the link partner. Also, the Ethernet terminating device 431 performs the alarm transfer to the opposing Ethernet terminating device 432.

Upon detecting the alarm notification transmitted from the Ethernet terminating device 431, the Ethernet terminating device 432 interrupts the signal outputted to the duplex device 422. The duplex device 422, upon detecting the non-input signal from the Ethernet terminating device 432, switches the connection thereby to connect the standby system path going through the Ethernet terminating devices 441, 442 to the Ethernet terminal 412 after confirming that the input signal from the standby system Ethernet terminating device 442 is not interrupted. Specifically, the input signal S401 from the Ethernet terminal 412 is switched in the third selection circuit 407 to the output signal S405 for the Ethernet terminating device 442, the input signal S407 from the Ethernet terminating device 442 is switched in the first selection circuit 405 to the output signal S412 for the Ethernet terminal 412, and the input signal S406 from the Ethernet terminating device 432 is switched in the second selection circuit 406 to the output signal S404 for the Ethernet terminating device 432.

Before the path switching is performed in the duplex device 422, the signal outputted from the Ethernet terminating circuit 432 to the duplex device 422 is interrupted so that the signal inputted to the Ethernet terminal 412 is also to be interrupted. Thus, the link of the Ethernet terminating device 412 is in the down-state. In the Ethernet terminating device 412, the auto-negotiation function operates when the link becomes down thereby to start the operation for establishing the link with the link partner. Until the switching is performed in the duplex device 422, the link partner is the Ethernet terminating device 432. Thus, the incommunicable state continues and the link is not established. When the switching of path is performed in the duplex device 422, the link partner of the Ethernet terminal 412 changes to the Ethernet terminating device 442. Thereby, the signal is connected and, by the auto-negotiation function, the link is established therebetween.

The Ethernet terminating device 431 interrupts the signal outputted to the duplex device 421 upon detecting the transmission path fault. The duplex device 421, upon detecting the non-input signal state from the Ethernet terminating device 431, switches the connection thereby to make the standby system Ethernet terminating device 441 the link partner of the Ethernet terminal 411. At this time, the operation of the duplex device 421 and the Ethernet terminal 411 is the same as that of the duplex device 422 and the Ethernet terminal 412 described above.

When the fault continues even after the connection in the duplex device 421, 422 is switched, the Ethernet terminating device 431 continues to detect the fault while continuing to interrupt the output signal to the duplex device 421 and to transmit the alarm transfer to the Ethernet terminating device 432. Thereby, the duplex device 421 continues to detect the non-input signal state from the Ethernet terminating device 431 and the duplex circuit 422 continues to detect the non-input signal state from the Ethernet terminating device 432.

When the fault is restored, the Ethernet terminating device 431 cancels the fault detection and cancels the interruption of the output signal to the duplex device 421. At the same time, it cancels the alarm transfer to the Ethernet terminating device 432. The Ethernet terminating device 432 cancels the interruption of the output signal to the duplex device 422 when the alarm notification is not detected.

The duplex devices 421 and 422 detect that the initial present system path going through the Ethernet terminating devices 431, 432 has restored to the normal state based on the fact that the output signal from the Ethernet terminating devices 431, 432 to the duplex devices 421, 422 has returned to be normal. Also, the Ethernet terminating device 431 continues the auto-negotiation while the link is down. However, when the fault is restored, it looks as if it is communicable between with the Ethernet terminal 411 and the link is reestablished. It is the same also in the Ethernet terminating device 432.

In the Examples described above, the paths between the Ethernet terminals are duplicated. However, it may have a configuration with the number of the standby systems being increased to be N-multiplexed (N is integer of 2 or larger), in which the N-multiplex switch connects the Ethernet terminal to the Ethernet terminating device for forming the present system path and connects the Ethernet terminating device for forming the standby system path in such a manner that the output is to be the input, and switches the path to the standby system when there is a fault generated in the present system path.

The N-multiplex switching, as in that of the Example shown in FIG. 32, may comprise a plurality of input and output terminals to be capable of connecting each input terminal and output terminal at will. Further, as the Example shown in FIG. 33, it may comprise a branching circuit and a selection circuit provided for the Ethernet terminal, and a plurality of branching circuits and selection circuits provided, respectively, for each Ethernet terminating device forming a plurality of paths, in which: the branching circuit provided for the Ethernet terminal branches the signal from the Ethernet terminal and outputs the signals to a plurality of the selection circuits provided for each Ethernet terminating device; each of a plurality of the branching circuit provided for each Ethernet terminating device branches the signal from the corresponding Ethernet terminating device and outputs the signals to the selection circuit provided for the Ethernet terminal and the selection circuit provided for the corresponding Ethernet terminating device; the selection circuit provided for the Ethernet terminal selects the signal from the branching circuit provided for the Ethernet terminating device forming the present path and outputs it to the Ethernet terminal; and the selection circuit provided for the Ethernet terminating device for forming the present system path selects the signal from the branching circuit provided for the Ethernet terminal and outputs it to the corresponding Ethernet terminating device and the selection circuit provided for the Ethernet terminating device for forming the standby system path selects the signal from the branching circuit provided for the corresponding Ethernet terminating device and outputs it to the corresponding Ethernet terminating device.

In the present invention formed in the manner as described, link between the Ethernet terminal and the Ethernet terminating device is established by the auto-negotiation function regardless of the systems (present or standby). Therefore, it is possible to judge whether or not the standby system path is in the normal state and when the standby system is confirmed to be normal, switching of the Ethernet path can be executed in the case of a fault generated in the present system.

What is claimed is:

1. A line switching system in a multiplex communication system, comprising a plurality of terminal devices and a plurality of line switching devices, wherein:
  at least one terminal device is connected to one line switching device and one line switching device is connected to another line switching device via a present line and a standby line;
  one terminal device is connected to another terminal device prescribed beforehand to be capable of communication via a line switching device and a present line so that communication is achieved using a protocol without a line switching function; and
  the standby line is a line replaceable with the present line, wherein:
  the line switching device comprises:
  a fault detection unit for detecting generation of a fault through checking whether or not a recognizable signal is detected from a line within a prescribed time;
  a fault notification unit for notifying generation of fault to another line switching device when the generation of fault is detected in the fault detection unit; and
  a line switching unit for, when the fault detection unit detects generation of a fault in the present line, switching the present line with the fault detected by the fault detection unit to the standby line which can be replaced with the present line thereby to perform communication between the terminal device and another terminal device prescribed beforehand, wherein the line switching unit switches the line after a switching protection time has passed from the detection of a fault by the fault detection unit, wherein the fault notification unit comprises a function of notifying a fault by periodically repeating interruption of signal output and transmission of a link down pattern for downing the link in a protocol, and wherein in a period in the periodical repeat, time for transmitting the link down pattern is set longer than time for interrupting output.

2. The line switching system as claimed in claim 1, wherein:

the lines used for connecting each device are full duplex lines composed of a transmission line and a reception line; and the fault notification unit comprises:

a function of, when a fault is detected in one of the lines out of the full duplex lines by the fault detection unit, notifying the fault using the other line of the full duplex lines.

3. The line switching system as claimed in claim 1, wherein: when the fault detection unit detects a fault generated in between a terminal device and a line switching device nearest to the terminal device, the fault notification unit transmits a link down pattern to a transmission line.

4. A line switching system in a multiplex communication system, comprising a plurality of terminal devices and a plurality of line switching devices, wherein:

at least one terminal device is connected to one line switching device and one line switching device is connected to another line switching device via a present line and a standby line;

at least one transmission device capable of achieving a long distance communication between a terminal device and another terminal device, which is provided in each of the present line and the standby line in a line switching device;

one terminal device is connected to another terminal device prescribed beforehand to be capable of communication via a line switching device and a present line so that communication is achieved using a protocol without a line switching function; and the standby line is a line replaceable with the present line, wherein:

the line switching device comprises:

a fault detection unit for detecting generation of a fault through checking whether or not a recognizable signal is detected from a line within a prescribed time;

wherein the transmission device comprises:

a transmission-side fault detection unit for detecting generation of a fault when a recognizable signal is not detected from the line within a prescribed time or by receiving notification of a fault generation; and a transmission-side fault notification unit for notifying the generation of fault when the transmission-side fault detection unit detects the generation of fault.

5. The line switching system as claimed in claim 4, wherein the transmission-side notification unit has a function of:

notifying the generation of fault to a line switching device by interrupting signal output; and notifying to a transmission device by periodically transmitting a reception fault notification packet and a link down notification packet; wherein in a period in the periodical transmission of the notification, time for transmitting the link down notification packet is set longer than time for transmitting the reception fault notification packet.

6. The line switching system as claimed in claim 5, wherein detection of a fault through receiving notification of the fault generation transmitted from the transmission-side fault detection unit is achieved by receiving the reception fault notification packet or/and receiving a link down notification packet.

7. A line switching method in a multiplex communication system, wherein:

at least one terminal device is connected to one line switching device and one line switching device is connected to another line switching device via a present line and a standby line;

one terminal device is connected to another terminal device prescribed beforehand to be capable of communication via a line switching device and a present line so that communication is achieved using a protocol without a line switching function; and the standby line is a line replaceable with the present line, comprising:

a fault detection step for detecting generation of a fault through checking whether or not a recognizable signal is detected from a connected line within a prescribed time;

a fault notification step for notifying generation of a fault to another line switching device when the generation of a fault is detected in the fault detection step; and a line switching step for, when the fault detection step detects generation of a fault in the present line, switching the present line with the fault detected by the fault detection unit to the standby line which can be replaced with the present line thereby to perform communication between the terminal device and another terminal device prescribed beforehand, wherein the line switching step, the line is switched after a switching protection time has passed from the detection of a fault in the fault detection step, wherein in the fault notification step, a fault is notified by periodically repeating interruption of signal output and transmission of a link down pattern for downing the link in a protocol; and in a period in the periodical repeat, time for transmitting the link down pattern is set longer than time for interrupting output.

8. The line switching method as claimed in claim 7, wherein: the lines used for connecting each device are full duplex lines composed of a transmission line and a reception line; and in the fault notification step:

when a fault is detected in one of the lines out of the full duplex lines by the fault detection step, the fault is notified using the other line of the full duplex lines.

9. The line switching method as claimed in claim 7, wherein, when a fault generated in between a terminal device and a line switching device nearest to the terminal device is detected in the fault detection step, a link down pattern is transmitted to a transmission line in the fault notification step.

10. A line switching method in a multiplex communication system, wherein:

at least one terminal device is connected to one line switching device and one line switching device is connected to another line switching device via a present line and a standby line;
one terminal device is connected to another terminal device prescribed beforehand to be capable of communication via a line switching device and a present line so that communication is achieved using a protocol without a line switching function; and
the standby line is a line replaceable with the present line, comprising:
a fault detection step for detecting generation of a fault through checking whether or not a recognizable signal is detected from a connected line within a prescribed time; and
a line switching step for, when the fault detection step detects generation of a fault in the present line, switching the present line with the fault detected by the fault detection unit to the standby line which can be replaced with the present line thereby to perform communication between the terminal device and another terminal device prescribed beforehand,
wherein at least one transmission device capable of achieving a long distance communication between a terminal device and another terminal device is further provided in each of the present line and the standby line in a line switching device; comprising:
a transmission-side fault detection step for detecting generation of a fault by the transmission device when a recognizable signal is not detected from the line within a prescribed time or by receiving a notification of a fault generation; and
a transmission-side fault notification step for notifying the generation of fault when the generation of fault is detected in the transmission-side fault detection step.

11. The line switching method as claimed in claim 10, wherein: in the transmission-side fault notification step,
a line switching device is notified by interruption of signal output;
a transmission device is notified by periodical transmission of a reception fault notification packet and a link down notification packet; wherein
in a period in the periodical transmission of notification, time for transmitting the link down notification packet is set longer than time for transmitting the reception fault notification packet.

12. The line switching method as claimed in claim 11, wherein detection of a fault through receiving notification of the fault generation in the transmission-side fault detection step is achieved by receiving the reception fault notification packet or/and receiving a link down notification packet.

13. A multiplex communication system, comprising
a switching device for duplicating data on a plurality of transmission paths thereby to distribute the data to an active system transmission path and a standby system transmission path; and a multiplex device provided on each of the active system transmission path and the standby system transmission path for multiplexing data which are distributed by the switching device and transmitted via the transmission paths, wherein
a control part is provided in each of the switching device and the multiplex device, and each of the control part together switches the transmission path from the active system to the standby system upon detecting a fault in the transmission path based on a state that no data signal is transmitted via each transmission path, wherein the multiplex device comprises: a plurality of low-speed transmission/reception parts connected to a switching device; a multiplex part for multiplexing data received in the low-speed transmission/reception part; a high-speed transmission/reception part for outputting multiplex data multiplexed by the multiplex part to another opposing multiplex device; a separation part for separating the multiplex data from the opposing multiplex device received in the high-speed transmission/reception part and outputting the separated data to a plurality of the low-speed transmission/reception parts; and a control part for controlling operation of each part, wherein
each of the low-speed transmission/reception parts and the high-speed transmission/reception part notify an input fault to the control part and interrupt output of signal when input of signal from the transmission path connected to the switching device and the opposing multiplex device is interrupted for a prescribed time or longer; and the control part, upon receiving the notification, interrupts the output signal of the slow-speed transmission/reception parts or the high-speed transmission/reception part to which the fault has not been notified.

14. The multiplex communication system as claimed in claim 13, wherein
the switching device comprises: a plurality of first low-speed transmission/reception parts connected to a plurality of transmission paths, respectively; a plurality of second and third low-speed transmission/reception parts connected to the multiplex device provided on the active system and standby system transmission paths, respectively, corresponding to a plurality of the low-speed transmission/reception parts; a copy/selection part provided in between the first low-speed transmission/reception parts and the second and third low-speed transmission/reception parts, for copying data from the first low-speed transmission/reception parts and outputting the data to the second and third low-speed transmission/reception parts, and for selecting data either from the second or third low-speed transmission/reception part and outputting it to the first low-speed transmission/reception parts; and a control part for controlling operation of each part, wherein
each of the second and third low-speed transmission/reception part notifies an input fault to the control part when input of signal from the transmission path connected to the multiplex device is interrupted for a prescribed time or longer; and the control part, upon receiving the notification, makes the copy/selection part select the data from the second low-speed transmission/reception part in a normal state and, when notified of an input fault from the second low-speed transmission/reception part, makes the copy/selection part select the data from the third low-speed transmission/reception part after confirming that there is no notification about an input fault from the third low-speed transmission/reception part for a prescribed time or longer.

15. The multiplex communication system as claimed in claim 14, wherein the copy/selection part comprises: a copy part for copying data from the first low-speed transmission/reception parts to output the data to the second and third low-speed transmission/reception parts; and a selection part for selecting the data either from the second or third low-speed transmission/reception part to output it to the first low-speed transmission/reception parts.

16. The multiplex communication system as claimed in claim 14, wherein the copy/selection part is a switch with a plurality of input/output ports.

17. An Ethernet redundant system, comprising:
a plurality of paths formed by Ethernet terminating device for connecting between Ethernet terminals in duplex; and
a duplex switch provided between the both Ethernet terminals and a plurality of the paths for connecting the Ethernet terminals to the Ethernet terminating device forming a present system path, and connecting the Ethernet terminating device forming a standby system path in such a manner that the output of the Ethernet terminating device is connected to an input of the both Ethernet terminals and the input of the Ethernet terminating device is connected to an output of the both Ethernet terminals, and for switching the present system path to the standby system path when there is a fault in the present system path,
wherein the duplex switch comprises: a first branching circuit and a first selection circuit provided for the Ethernet terminals; and a second and a third branching circuits and a second and a third selection circuits provided, respectively, for each Ethernet terminating device forming the present system and the standby system paths, wherein
the first branching circuit branches a signal from the Ethernet terminals and output the branched signals to the second and third selection circuits; each of the second and third branching circuits branches a signal from the corresponding Ethernet terminating device and output the branched signals to the first, the second and the third selection circuits; the first selection circuit selects a signal from the branching circuit provided for the Ethernet terminating device forming a present system path and output the signal to the Ethernet terminal; the second selection circuit selects a signal from the first branching circuit and outputs the signal to the corresponding Ethernet terminating device; and the third selection circuit selects a signal from the third branching circuit and outputs the signal to the corresponding Ethernet terminating device.

18. The Ethernet redundant system as claimed in claim 17, wherein the paths are provided with a relay.

19. The Ethernet redundant system as claimed in claim 17, wherein: the duplex switch comprises first to third input terminals and output terminals, and is capable of connecting each input terminal and output terminal optionally.

20. An Ethernet redundant system comprising:
a plurality of paths formed in an Ethernet terminating device for connecting between Ethernet terminals in N-multiplex; and
an N-multiplex switch provided between the both Ethernet terminals and a plurality of the paths, for connecting the Ethernet terminals to the Ethernet terminating device forming a present system path, and connecting the Ethernet terminating device forming a standby system path in such a manner that the output of the Ethernet terminating device is connected to an input of the both Ethernet terminals and the input of the Ethernet terminating device is connected to an output of the both Ethernet terminals, and for switching the present system path to the standby system path when there is a fault in the present system path,
wherein the N-multiplex switch comprises: a branching circuit and a selection circuit provided for the Ethernet terminals; and a plurality of branching circuits and selection circuits provided, respectively, for each Ethernet terminating device forming a plurality of paths, wherein
the branching circuit provided for the Ethernet terminal branches a signal from the Ethernet terminal and outputs the branched signals to a plurality of the selection circuits provided for each Ethernet terminating device; each of a plurality of the branching circuits provided for each Ethernet terminating device branch a signal from the corresponding Ethernet terminating device and output the branched signals to the selection circuit provided for the Ethernet terminal and the selection circuit provided for the corresponding Ethernet terminating device; the selection circuit provided for the Ethernet terminal selects a signal from the branching circuit provided for the Ethernet terminating device forming a present system path and output the signal to the Ethernet terminal; the selection circuit provided for the Ethernet terminal forming the present system path selects a signal from the branching circuit provided for the Ethernet terminal and outputs the signal to the corresponding Ethernet terminating device; and the selection circuit provided for the Ethernet terminating device forming the standby system path selects a signal from the branching circuit provided for the corresponding Ethernet terminating device and outputs the signal to the corresponding Ethernet terminating device.

21. The Ethernet redundant system as claimed in claim 20, wherein the paths are provided with a relay.

22. The Ethernet redundant system as claimed in claim 20, wherein: the N-multiplex switch comprises a plurality of input terminals and output terminals, and is capable of connecting each input terminal and output terminal optionally.

23. An Ethernet redundant method comprising steps of:
forming a plurality of paths in an Ethernet terminating device for connecting between Ethernet terminals in duplex; and
providing a duplex switch between the both Ethernet terminals and a plurality of the paths, for connecting the Ethernet terminals to the Ethernet terminating device forming a present system path, and connecting the Ethernet terminating device forming a standby system path in such a manner that the output of the Ethernet terminating device is connected to an input of the both Ethernet terminals and the input of the Ethernet terminating device is connected to an output of the both Ethernet terminals, and for switching the present system path to the standby system path when there is a fault in the present system path,
wherein, the method uses a duplex switch comprising: a first branching circuit and a first selection circuit provided for the Ethernet terminal; and a second and third branching circuits and a second and a third selection circuits provided, respectively, for each Ethernet terminating device forming the present system and the standby system paths, wherein
the first branching circuit branches a signal from the Ethernet terminal and output the branched signals to the second and third selection circuits; each of the second and third branching circuits branch a signal from the corresponding Ethernet terminating device and output the branched signals to the first selection circuit and the second and thirds selection circuits; the first selection circuit selects a signal from the branching circuit provided for the Ethernet terminating device forming a present path and output the signal to the Ethernet terminal; the second selection circuit selects a signal from the first branching circuit and outputs the signal to the corresponding Ethernet terminating device; and the third selection circuit selects a signal from the third branching circuit and outputs the signal to the corresponding Ethernet terminating device.

24. The Ethernet redundant method as claimed in claim 23, wherein: as the duplex switch, a switch, comprising first to third input terminals and output terminals and capable of connecting each input terminal and output terminal optionally, is used.

25. An Ethernet redundant method comprising the steps of:
providing a plurality of paths formed by Ethernet terminating device for connecting in between Ethernet terminals in N-multiplex; and
providing an N-multiplex switch between the both Ethernet terminals and a plurality of the paths, for connecting the Ethernet terminals to the Ethernet terminating device forming a present system path, and connecting the Ethernet terminating device forming a standby system path in such a manner that the output of the Ethernet terminating device is connected to an input of the both Ethernet terminals and the input of the Ethernet terminating device is connected to an output of the both Ethernet terminals, and for switching the present system path to the standby system path when there is a fault in the present system path,
wherein, the method uses an N-multiplex switch comprising: a branching circuit and a selection circuit provided for the Ethernet terminals; and a plurality of branching circuits and selection circuits provided for each Ethernet terminating device forming a plurality of paths, respectively, wherein
the branching circuit provided for the Ethernet terminal branches a signal from the Ethernet terminals and outputs the branched signals to a plurality of the selection circuits provided for each Ethernet terminating device; each of a plurality of the branching circuit provided for each Ethernet terminating device branch a signal from the corresponding Ethernet terminating device and output the branched signals to the selection circuit provided for the Ethernet terminal and the selection circuits provided for the corresponding Ethernet terminating device; the selection circuit provided for the Ethernet terminal selects a signal from the branching circuit provided for the Ethernet terminating device forming a present system path and output the signal to the Ethernet terminal; the selection circuit provided for the Ethernet terminal forming the present system path selects a signal from the branching circuit provided for the Ethernet terminal and outputs the signal to the corresponding Ethernet terminating device; and the selection circuit provided for the corresponding Ethernet terminating device selects a signal from the branching circuit provided for the corresponding Ethernet terminating device and outputs the signal to the corresponding Ethernet terminating device.

26. The Ethernet redundant method as claimed in claim 25, wherein: as the N-multiplex switch, a switch, comprising a plurality of input terminals and output terminals and capable of connecting each input terminal and output terminal optimally, is used.

* * * * *